US009380490B2

(12) United States Patent
Akkarakaran et al.

(10) Patent No.: US 9,380,490 B2
(45) Date of Patent: *Jun. 28, 2016

(54) SYSTEM AND METHOD FOR UPLINK MULTIPLE INPUT MULTIPLE OUTPUT TRANSMISSION

(71) Applicant: QUALCOMM Incorporated, San Diego, CA (US)

(72) Inventors: Sony J Akkarakaran, Poway, CA (US); Sharad Deepak Sambhwani, San Diego, CA (US); Arjun Bharadwaj, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 336 days.

This patent is subject to a terminal disclaimer.

(21) Appl. No.: 13/843,451

(22) Filed: Mar. 15, 2013

(65) Prior Publication Data
US 2013/0229906 A1 Sep. 5, 2013

Related U.S. Application Data

(63) Continuation-in-part of application No. 13/760,252, filed on Feb. 6, 2013, now Pat. No. 8,842,542, which is a continuation-in-part of application No. 13/760,275, filed on Feb. 6, 2013, now Pat. No. 9,055,604, and a (Continued)

(51) Int. Cl.
*G01R 31/08* (2006.01)
*H04W 28/04* (2009.01)
(Continued)

(52) U.S. Cl.
CPC .............. *H04W 28/04* (2013.01); *H04L 1/0001* (2013.01); *H04L 1/1812* (2013.01);
(Continued)

(58) Field of Classification Search
USPC .............. 370/329, 216, 252, 311; 75/E1.002; 375/141, 260, 299
See application file for complete search history.

(56) References Cited

U.S. PATENT DOCUMENTS 6,683,916 B1 1/2004 Sartori et al.
7,006,464 B1 2/2006 Gopalakrishnan et al.
(Continued)

FOREIGN PATENT DOCUMENTS

CN 101340724 A 1/2009
CN 101682462 A 3/2010
(Continued)

OTHER PUBLICATIONS

U.S. Appl. No. 13/291,063 claims 1-44, pp. 2-14.*
(Continued)

*Primary Examiner* — Phuongchau Ba Nguyen
(74) *Attorney, Agent, or Firm* — Charles Chesney

(57) ABSTRACT

Methods and apparatuses are provided for uplink MIMO transmissions in a wireless communication system. In some particular aspects, scheduling of the uplink MIMO transmissions may make a determination between single stream, rank=1 transmissions and dual stream, rank=2 transmissions based on various factors. Further, when switching between single and dual stream transmissions in the presence of HARQ retransmissions of failed packets, the scheduling function may determine to transmit the HARQ retransmissions on a single stream transmission or to transmit the HARQ retransmissions on one stream while transmitting new packets on the other stream.

29 Claims, 22 Drawing Sheets

Related U.S. Application Data continuation-in-part of application No. 13/760,561, filed on Feb. 6, 2013, and a continuation-in-part of application No. 13/291,040, filed on Nov. 7, 2011, and a continuation-in-part of application No. 13/291,045, filed on Nov. 7, 2011, now Pat. No. 8,953,713, and a continuation-in-part of application No. 13/291,051, filed on Nov. 7, 2011, now Pat. No. 9,084,207, and a continuation-in-part of application No. 13/291,056, filed on Nov. 7, 2011, and a continuation-in-part of application No. 13/291,063, filed on Nov. 7, 2011, now Pat. No. 9,007,888.

(60) Provisional application No. 61/646,240, filed on May 11, 2012, provisional application No. 61/646,241, filed on May 11, 2012, provisional application No. 61/612,541, filed on Mar. 19, 2012, provisional application No. 61/596,682, filed on Feb. 8, 2012, provisional application No. 61/411,454, filed on Nov. 8, 2010.

(51) Int. Cl.
*H04L 5/00* (2006.01)
*H04L 1/00* (2006.01)
*H04L 1/18* (2006.01)
*H04W 52/14* (2009.01)
*H04W 72/12* (2009.01)
*H04B 7/04* (2006.01)
*H04B 7/06* (2006.01)
*H04W 52/16* (2009.01)
*H04W 52/36* (2009.01)
*H04W 52/48* (2009.01)

(52) U.S. Cl.
CPC ........... *H04L 5/0044* (2013.01); *H04L 5/0064* (2013.01); *H04B 7/0404* (2013.01); *H04B 7/0465* (2013.01); *H04B 7/0689* (2013.01); *H04W 52/146* (2013.01); *H04W 52/16* (2013.01); *H04W 52/367* (2013.01); *H04W 52/48* (2013.01); *H04W 72/12* (2013.01)

(56) References Cited

U.S. PATENT DOCUMENTS

| | | |
|---|---|---|
| 7,447,516 B2 | 11/2008 | Heo et al. |
| 7,454,181 B2 | 11/2008 | Banister et al. |
| 7,715,430 B2 | 5/2010 | Ranta-Aho et al. |
| 7,924,949 B2 | 4/2011 | Larsson |
| 7,990,905 B2 | 8/2011 | Lappetelainen et al. |
| 8,208,447 B2 | 6/2012 | Qian et al. |
| 8,355,424 B2 | 1/2013 | Xi et al. |
| 8,416,873 B2 | 4/2013 | Lincoln et al. |
| 8,521,209 B2 | 8/2013 | Kim et al. |
| 8,665,990 B2 | 3/2014 | Xi et al. |
| 8,687,541 B2 * | 4/2014 | Lohr et al. ............ 455/522 |
| 8,830,904 B2 | 9/2014 | Kim et al. |
| 8,842,542 B2 | 9/2014 | Zhang et al. |
| 9,055,604 B2 | 6/2015 | Zhang et al. |
| 2005/0047344 A1 | 3/2005 | Seol |
| 2006/0105798 A1 | 5/2006 | Ghosh et al. |
| 2006/0255989 A1 | 11/2006 | Kim et al. |
| 2006/0280145 A1 | 12/2006 | Revel et al. |
| 2007/0041342 A1 | 2/2007 | Usuda et al. |
| 2007/0066339 A1 | 3/2007 | Usuda et al. |
| 2007/0073895 A1 | 3/2007 | Sebire et al. |
| 2007/0173275 A1 * | 7/2007 | Das et al. ............ 455/522 |
| 2007/0242773 A1 | 10/2007 | Li et al. |
| 2007/0268869 A1 | 11/2007 | Lundby et al. |
| 2008/0144541 A1 | 6/2008 | Somasundaram et al. |
| 2008/0159234 A1 | 7/2008 | Prakash et al. |
| 2008/0186944 A1 | 8/2008 | Suzuki et al. |
| 2008/0247375 A1 | 10/2008 | Muharemovic et al. |
| 2008/0254819 A1 | 10/2008 | Niwano et al. |
| 2008/0273517 A1 | 11/2008 | Nishio et al. |
| 2008/0298224 A1 | 12/2008 | Pi et al. |
| 2008/0303699 A1 | 12/2008 | Zhang et al. |
| 2009/0034487 A1 | 2/2009 | Lohr et al. |
| 2009/0154403 A1 | 6/2009 | Niwano |
| 2009/0213765 A1 | 8/2009 | Rinne et al. |
| 2009/0245209 A1 | 10/2009 | Cho et al. |
| 2009/0323842 A1 | 12/2009 | Zhang et al. |
| 2009/0327828 A1 | 12/2009 | Ojala et al. |
| 2010/0046481 A1 | 2/2010 | Chen et al. |
| 2010/0067435 A1 | 3/2010 | Balachandran et al. |
| 2010/0067459 A1 | 3/2010 | Goransson et al. |
| 2010/0074229 A1 | 3/2010 | Seki |
| 2010/0074316 A1 | 3/2010 | Kim et al. |
| 2010/0087202 A1 | 4/2010 | Ventola et al. |
| 2010/0098005 A1 | 4/2010 | Lee et al. |
| 2010/0103901 A1 | 4/2010 | Miki et al. |
| 2010/0111023 A1 | 5/2010 | Pelletier et al. |
| 2010/0111226 A1 | 5/2010 | Ko et al. |
| 2010/0113004 A1 | 5/2010 | Cave et al. |
| 2010/0130219 A1 | 5/2010 | Cave et al. |
| 2010/0150000 A1 | 6/2010 | Sakata |
| 2010/0157895 A1 | 6/2010 | Pani et al. |
| 2010/0158151 A1 | 6/2010 | Krauss et al. |
| 2010/0189075 A1 | 7/2010 | Iwamura et al. |
| 2010/0202392 A1 | 8/2010 | Zhang et al. |
| 2010/0218065 A1 | 8/2010 | Balachandran et al. |
| 2010/0238825 A1 | 9/2010 | Zhang et al. |
| 2010/0238904 A1 | 9/2010 | Zhang et al. |
| 2010/0246516 A1 | 9/2010 | Pelletier et al. |
| 2010/0246520 A1 | 9/2010 | Andersson |
| 2010/0246705 A1 | 9/2010 | Shin et al. |
| 2010/0260284 A1 | 10/2010 | Yoshii et al. |
| 2010/0271939 A1 | 10/2010 | Gholmieh et al. |
| 2010/0273515 A1 | 10/2010 | Fabien et al. |
| 2010/0285830 A1 | 11/2010 | Englund et al. |
| 2010/0290389 A1 | 11/2010 | Hou et al. |
| 2010/0291917 A1 | 11/2010 | Wang et al. |
| 2010/0296422 A1 | 11/2010 | Ericson et al. |
| 2010/0298021 A1 | 11/2010 | Bergman et al. |
| 2010/0311433 A1 | 12/2010 | Lindskog et al. |
| 2010/0316156 A1 | 12/2010 | Higuchi et al. |
| 2010/0329136 A1 | 12/2010 | Murata et al. |
| 2011/0013615 A1 | 1/2011 | Lee et al. |
| 2011/0019625 A1 | 1/2011 | Zhang et al. |
| 2011/0021239 A1 | 1/2011 | Wakabayashi et al. |
| 2011/0026419 A1 | 2/2011 | Kim et al. |
| 2011/0028141 A1 | 2/2011 | Yang et al. |
| 2011/0032885 A1 | 2/2011 | Wang et al. |
| 2011/0053631 A1 | 3/2011 | Bottomley et al. |
| 2011/0064159 A1 | 3/2011 | Ko et al. |
| 2011/0075651 A1 | 3/2011 | Jia et al. |
| 2011/0081935 A1 | 4/2011 | Yeon et al. |
| 2011/0081936 A1 | 4/2011 | Haim et al. |
| 2011/0085516 A1 | 4/2011 | Pajukoski et al. |
| 2011/0128926 A1 | 6/2011 | Nama et al. |
| 2011/0150004 A1 | 6/2011 | Denteneer et al. |
| 2011/0150059 A1 * | 6/2011 | Cedergren et al. ............ 375/224 |
| 2011/0263281 A1 | 10/2011 | Cai et al. |
| 2011/0300854 A1 | 12/2011 | Shan et al. |
| 2011/0305262 A1 | 12/2011 | Medles |
| 2012/0008490 A1 | 1/2012 | Zhu |
| 2012/0044798 A1 * | 2/2012 | Yan et al. ............ 370/216 |
| 2012/0044898 A1 | 2/2012 | Ishii |
| 2012/0082192 A1 | 4/2012 | Pelletier et al. |
| 2012/0083264 A1 | 4/2012 | Ramasamy et al. |
| 2012/0099548 A1 | 4/2012 | Yan et al. |
| 2012/0106504 A1 | 5/2012 | Klatt et al. |
| 2012/0127869 A1 * | 5/2012 | Yin et al. ............ 370/252 |
| 2012/0147830 A1 | 6/2012 | Loehr et al. |
| 2012/0177011 A1 | 7/2012 | Xi et al. |
| 2012/0177089 A1 * | 7/2012 | Pelletier et al. ............ 375/219 |
| 2012/0220324 A1 | 8/2012 | Sambhwani et al. |
| 2012/0224552 A1 | 9/2012 | Feuersanger et al. |
| 2012/0275403 A1 | 11/2012 | Zhang et al. |
| 2012/0281642 A1 | 11/2012 | Sambhwani et al. |
| 2012/0287798 A1 | 11/2012 | Sambhwani et al. |

(56) References Cited

U.S. PATENT DOCUMENTS

| | | | |
|---|---|---|---|
| 2012/0287867 A1 | 11/2012 | Sambhwani et al. | |
| 2012/0287868 A1 | 11/2012 | Sambhwani et al. | |
| 2012/0287965 A1 | 11/2012 | Sambhwani et al. | |
| 2012/0294254 A1 | 11/2012 | Behravan et al. | |
| 2012/0314640 A1 | 12/2012 | Kim et al. | |
| 2013/0279459 A1* | 10/2013 | Lee et al. | 370/329 |
| 2014/0056236 A1 | 2/2014 | Bergman et al. | |
| 2015/0055606 A1* | 2/2015 | Yang et al. | 370/329 |

FOREIGN PATENT DOCUMENTS

| | | |
|---|---|---|
| CN | 101874363 A | 10/2010 |
| EP | 1684454 A1 | 7/2006 |
| EP | 1788742 A1 | 5/2007 |
| EP | 1788748 A1 | 5/2007 |
| EP | 1863248 A1 | 12/2007 |
| EP | 2141935 A1 | 1/2010 |
| EP | 2306659 A2 | 4/2011 |
| EP | 2437565 A1 | 4/2012 |
| JP | 2003086233 A | 3/2003 |
| JP | 2003348011 A | 12/2003 |
| JP | 2006295834 A | 10/2006 |
| JP | 2007505589 A | 3/2007 |
| JP | 2008011522 A | 1/2008 |
| JP | 2009525699 A | 7/2009 |
| JP | 2010523042 A | 7/2010 |
| JP | 2010531615 A | 9/2010 |
| JP | 2011507330 A | 3/2011 |
| JP | 2011517203 A | 5/2011 |
| JP | 2011530952 A | 12/2011 |
| JP | 2012507961 A | 3/2012 |
| JP | 2013511168 A | 3/2013 |
| JP | 2013526109 A | 6/2013 |
| JP | 2013530560 A | 7/2013 |
| KR | 20080011822 A | 2/2008 |
| KR | 20090063085 A | 6/2009 |
| RU | 2005129080 A | 1/2006 |
| WO | 02087108 A1 | 10/2002 |
| WO | 2005050885 A1 | 6/2005 |
| WO | 2005088864 | 9/2005 |
| WO | 2006030478 A1 | 3/2006 |
| WO | 2006116704 A2 | 11/2006 |
| WO | WO-2007024853 A2 | 3/2007 |
| WO | 2007092258 A1 | 8/2007 |
| WO | 2008118081 A2 | 10/2008 |
| WO | 2008123148 A1 | 10/2008 |
| WO | 2008131902 A1 | 11/2008 |
| WO | 2009002251 A2 | 12/2008 |
| WO | 2009068078 A1 | 6/2009 |
| WO | WO-2009149561 A1 | 12/2009 |
| WO | 2010011083 A2 | 1/2010 |
| WO | 2010019091 A1 | 2/2010 |
| WO | 2010039561 A2 | 4/2010 |
| WO | 2010051513 A2 | 5/2010 |
| WO | 2010051520 A1 | 5/2010 |
| WO | 2010068487 A1 | 6/2010 |
| WO | 2010091417 A1 | 8/2010 |
| WO | 2010091423 A2 | 8/2010 |
| WO | 2010091425 A2 | 8/2010 |
| WO | 2010107699 A2 | 9/2010 |
| WO | 2010117981 A2 | 10/2010 |
| WO | 2010124470 A1 | 11/2010 |
| WO | 2011000320 A1 | 1/2011 |
| WO | 2011041492 A2 | 4/2011 |
| WO | 2011041719 A2 | 4/2011 |
| WO | 2011122835 A2 | 10/2011 |
| WO | 2011127358 A1 | 10/2011 |
| WO | 2011136528 A2 | 11/2011 |
| WO | 2012087222 A2 | 6/2012 |

OTHER PUBLICATIONS

Co-Pending U.S. Appl. No. 13/760,525, filed Feb. 6, 2013.
Co-Pending U.S. Appl. No. 13/760,275, filed Feb. 6, 2013.
Co-Pending U.S. Appl. No. 13/760,561, filed Feb. 6, 2013.

Ericsson et al: "Initial considerations on the design for UL MIMO for HSUPA", 3GPP Draft; R1-110496 Initial Considerations on the Design for Uplink MIMO, 3rd Generation Partnership Project (3GPP), Mobile Competence Centre ; 650, Route Des Lucioles ; F-06921 Sophia-Antipolis Cedex ; France, vol. Ran WG1, no./ Dublin, Ireland; Jan. 17, 2011, Jan. 11, 2011, XP050490303, [retrieved on Jan. 11, 2011] pp. 10,11,14.
International Search Report and Written Opinion—PCT/US2013/ 040567—ISA/EPO—Aug. 14, 2013.
Nokia Siemens Networks et al: "Uplink MIMO link level evaluation", 3GPP Draft; R1-112632, 3rd Generation Partnership Project (3GPP), Mobile Competence Centre; 650, Route Des Lucioles; F-06921 Sophia-Antipolis Cedex; France, vol. RAN WG1, no. Athens, Greece; Aug. 22, 2011, Aug. 19, 2011, XP050537848, [retrieved on Aug. 19, 2011] pp. 1,5,19.
3GPP: "3rd Generation Partnership Project; Technical Specification Group Radio Access Network; Medium Access Control (MAC) protocol specification (Release 11)", 3GPP Draft; 25321-B00, 3rd Generation Partnership Project (3GPP), Mobile Competence Centre; 650, Route Des Lucioles; F-06921 Sophia-Antipolis Cedex; France, Dec. 20, 2011, XP050563752, [retrieved on Dec. 20, 2011] p. 151- pp. 152,165.
3GPP TR 25.871: "3rd Generation Partnership Project; Technical Specification Group Radio Access Network; Uplink MIMO for HSPA", Version 2.0.0, Release 11, Sep. 8, 2011, pp. 42.
3GPP TS 25.214, 3rd Generation Partnership Project; Technical Specification Group Radio Access Network; Physical layer prodedures, FDD, V7.16.0, Release 7, Sep. 2010, pp. 1-88.
3GPP TS 36.213, "LTE; Evolved Universal Terrestrial Raido Access (E-UTRA); Physical layer Procedures (3GPP TS 36.213 version 9.3.0 Release 9)", Technical Specification, European Telecommunications Standards Institute (ETSI), Version 9.3.0, 650, Route Des Lucioles; F-06921 Sophia-Antipolis; France, Oct. 1, 2010, XP014061703, abstract.
"3rd Generation Partnership Project; Technical Specification group Radio Access Network; Uplink Multiple Input Mutliple Output (MIMO) for High Speen Packet Access (HSPA) (Release 11)", 3GPP TR 25.871, 3rd Generation Partnership Project (3GPP), Mobile Competence Centre; 650, Route Des Lucioles; F-06921 Sophia-Antipolis Cedex; France, vol. RAN WG1, No. V11.0.0, Sep. 27, 2011, pp. 1-42, XP050554073.
CATT: "Discussion on outer loop power control of E-AGCH in MC-HSUPA", 3GPP Draft; R1-104363, 3rd Generation Partnershi P Project (3GPP) , Mobi Le Competence Centre ; 650, Route Des Lucioles ; F-06921 Sophia-Anti Polis Cedex; France, vol. RAN WG1, no. Madrid, Spain; Aug. 23, 2010, Aug. 17, 2010, XP050449717, [retrieved on Aug. 17, 2010] p. 1, lines 1-10 section 2.1.
Co-pending U.S. Appl. No. 13/843,451, filed Mar. 15, 2013.
Ericsson et al: "Closed loop transmit diversity for HSUPA", 3GPP Draft; R1-105475 Closed Loop Transmit Divesity for HSUPA, 3rd Generation Partnership Project (3GPP), Mobile Competence Centre ; 650, Route Des Lucioles ; F-06921 Sophia-Anti Polis Cedex; France, vol. RAN WG1, No. X i 'an; Oct. 11, 2010, Oct. 6, 2010, XP050450743, [ retrieved on Oct. 6, 2010].
Ericsson et al: "DC-HSUPA—Power scaling at UE power limitation", 3GPP Draft; R1-092763 DC-HSUPA Power Scaling at UE Power Limitation, 3rd Generation Partnership Project (3GPP), Mobile Competence Centre ; 650, Route Des Lucioles ; F-06921 Sophia-Antipolis Cedex; France, no. Los Angeles, USA; Jun. 24, 2009, XP050351219, [retrieved on Jun. 24, 2009] the whole document.
Ericsson et al., "E-TFC selection for DC-HSUPA", 3GPP Draft; R2-100190, 3rd Generation Partnership Project (3GPP), Mobile Competence Centre ; 650, Route Des Lucioles; F-06921 Sophia-Antipolis Cedex; France, vol. Ran WG2, no. Valencia, Spain; Jan. 18, 2010,Jan. 10, 2010, XP050420746.
Ericsson et al: "Quality Control of the Secondary Stream for Uplink MIMO with 64QAM", 3GPP Draft; R1-120344, 3rd Generation Partnership Project (3GPP), Mobile Competence Centr ; 650, Route Des Lucioles; F-06921 Sophia-Antipolis Cedex; France, vol. RAN WG1, no. Dresden, Germany; Feb. 6, 2012-Feb. 10, 2012, Feb. 1, 2012, XP050563198, [retrieved on Feb. 1, 2012] pp. 1-3.

(56) References Cited

OTHER PUBLICATIONS

Ericsson, ST-Ericsson, "Uplink pilot design for UL CLTD and UL MIMO", 3GPP TSG RAN WG1 Meeting #63bis, R1-110484, Dublin, Ireland, Jan. 17-21, 2011.
Hayashi T., "Absolutely easy-to-understand", Super Introduction of Mobile Broad Band, the first printing, Nikkei Business Publications, 1st edition,Sep. 19, 2009, pp. 56.
High Speed Uplink Packet Access (HSUPA) White Paper, 3GPP Release 6, Rohde&Schwarz Products:FSP,FSQ, FSU,FS-K72,FS-K73,FS-K74, SMU200A,SMATE200A,SMJ100A,CRTU-M,CRTU-WA01.
Huawei, HiSilicon, "Simulation assumptions for UL MIMO", 3GPP TSG-RAN WG1 Meeting #64, R1-100998, Taipei, Feb. 21-25, 2011, pp. 1-3.
Inoue M., et al., "A Study of MIMO-OFDM with Error Detection Code System", IEICE Technical Report CAS2003-124, Mar. 8, 2004, vol. 103, No. 720, pp. 105-110.
Interdigital: "Dual-Cell HSUPA Considerations", 3GPP Draft, R2-092449, 3rd Generation Partnership Project (3GPP), Mobile Competence Centre, 650, Route Des Lucioles, F-06921 Sophia-Antipolis Cedex, France, no. Seoul, Korea, Mar. 17, 2009, XP050340155, [retrieved on Mar. 17, 2009].
International Preliminary Report on Patentability—PCT/US2013/025327—The International Bureau of WIPO—Geneva, Switzerland, May 28, 2014.
International Preliminary Report on Patentability—PCT/US2013/025332—The International Bureau of WIPO Geneva, Switzerland, May 21, 2014.
International Search Report and Written Opinion—PCT/US2011/059826—ISA/EPO—Jan. 23, 2012.
International Search Report and Written Opinion—PCT/US2011/059827—ISA/EPO—Jan. 23, 2012.
International Search Report and Written Opinion—PCT/US2011/059828—ISA/EPO—Jan. 23, 2012.
International Search Report and Written Opinion—PCT/US2011/059830—ISA/EPO—Mar. 14, 2012.
International Search Report and Written Opinion—PCT/US2011/059833—ISA/EPO—May 29, 2012.
International Search Report and Written Opinion—PCT/US2013/025327—ISA/EPO—Jun. 5, 2013.
International Search Report and Written Opinion—PCT/US2013/025332—ISA/EPO—Jul. 3, 2013.
LG Electronics: "Enhancements of HARQ scheme for HSDPA", 3GPP R1-01-0620, May 25, 2001, pp. 1-2.
LG Electronics Inc: "Uplink Signalling With Happy Bit", 3GPP Draft; R2-051422 Uplink Signalling With Happy Bit, 3rd Generation Partnership Project (3GPP), Mobile Competence Centre; 650, Route Des Lucioles; F-06921 Sophia-Antipolis Cedex; France, vol. RAN WG2, no. Athens; May 9, 2005-May 13, 2005, May 5, 2005, XP050602543.
NEC Group: "PDCCH Structure for LTE-Advanced System", 3GPP Draft; R1-091692 PDCCH Structure for LTE-Advanced System, 3rd Generation Partnership Project (3GPP), Mobile Competence Centre; 650, Route Des Lucioles; F-06921 Sophia-Antipolis Cedex; France, no. San Francisco, USA; Apr. 28, 2009, XP050339231, [retrieved on Apr. 28, 2009].
Nokia Siemens Networks et al., "Options for uplink closed loop TX diversity & beamforming", 3GPP Draft; R1-104914, 3rd Generation Partnership Project (3GPP), Mobile Competence Centre ; 650, Route Des Lucioles ; F-06921 Sophia-Antipolis Cedex ; France, vol. RAN WG1, no. Madrid, Spain; Aug. 23, 2010, Aug. 17, 2010, XP050450060, [retrieved on Aug. 17, 2010].
Notification of transmittal of the International Preliminary Report on Patentability; Apr. 29, 2014, PCT/US2013/025327.
Partial International Search Report—PCT/US2011/059830—ISA/EPO—Jan. 23, 2012.
Partial International Search Report—PCT/US2013/025332—ISA/EPO—May 6, 2013.
QUALCOMM Incorporated: "Remaining details for UL MIMO scheme for retransmissions triggered by PHICH", 3GPP R1-106370, Nov. 19, 2010, pp. 1-5.
QUALCOMM Europe: "E-TFC Selection in DC-HSUPA—The Last Open Issues", 3GPP Draft; R2-096838 ETFC Selection DCHSUPA Last Open Issues, 3rd Generation Partnership Project (3GPP), Mobile Competence Centre ; 650, Route Des Lucioles ; F-06921 Sophia-Antipolis Cedex ; France, no. Jeju; Nov. 9, 2009, Nov. 1, 2009, XP050391273.
QUALCOMM Europe: "Remaining Issues in E-TFC Selection in DC-HSUPA", 3GPP Draft, R2-095957, 3rd Generation Partnership Project (3GPP), Mobile Competence Centre, 650, Route Des Lucioles, F-06921 Sophia-Antipolis Cedex, France, no. Miyazaki, Oct. 12, 2009, Oct. 16, 2009, XP050390391, [retrieved on Oct. 6, 2009].
QUALCOMM Incorporated, "Introduction to UL MIMO in HSPA", 3GPP TSG RAN WG1 Meeting #63, R1-106336, Jacksonville, USA, Nov. 15-19, 2010.
QUALCOMM Incorporated, "On the benefits of Uplink Closed Loop Transmit Diversity", 3GPP R1-104737, Aug. 27, 2010.
QUALCOMM Incorporated, "Physical Channels for UL MIMO operation," 3GPP R1-110131, Jan. 21, 2011.
QUALCOMM Incorporated, "Uplink Power Control Design for UL MIMO", 3GPP TSG RAN WG1 Meeting #63bis, R1-110133, Dublin, Ireland, Jan. 17-21, 2011, pp. 1-4.
Response to Consultation; Apr. 8, 2014, PCT/US2013/025327.
Response to Second Written Opinion; Mar. 18, 2014; PCT/US2013/025327.
Simens: "Performance of the HARQ Retransmission Power Offset Scheme for 10ms TTI", 3GPP R1-040446, May 14, 2004, pp. 1-6.
Tiirola E et al., "Performance of a UMTS uplink MIMO scheme", Vehicular Technology Conference, 2003. VTC 2003-Fall. 2003 IEEE 58th Orlando, FL, USA Oct. 6-9, 2003; [IEEE Vehicular-Technolgy Conference], Piscataway, NJ, USA,IEEE, US, Oct. 6, 2003, pp. 657-661 vol. 1, XP010700961, DOI: 10.1109/VETECF.2003.1285099 ISBN: 978-0-7803-7954-1.
Written Opinion of The International Preliminary Examing Authority; PCT/IPEA/408; Jan. 20, 2014; PCT/US2013/025327.
ZTE: "Remaining issues for UL SU-MIMMO in PHICH-triggered retransmission", 3GPP R1-105964, Nov. 19, 2010, pp. 1-3.

* cited by examiner

Boosting a Secondary Pilot

Inner Loop Power Control: Node B

Inner Loop Power Control: UE

Inner Loop Power Control: UE

Outer Loop Power Control: RNC

Uplink Scheduling - UE

Uplink Scheduling - UE

Uplink Scheduling - UE

Uplink Scheduling - UE

Uplink Scheduling - UE

Uplink Scheduling - UE

SYSTEM AND METHOD FOR UPLINK MULTIPLE INPUT MULTIPLE OUTPUT TRANSMISSION

CLAIM OF PRIORITY UNDER 35 U.S.C. §119

The present application for patent claims priority to:
Provisional Application No. 61/646,240 entitled "HARQ RETRANSMISSION OPERATION FOR UPLINK (UL) MULTIPLE INPUT MULTIPLE-OUTPUT (MIMO)" filed May 11, 2012;
Provisional Application No. 61/646,241 entitled "E-TFC SELECTION AND SERVING GRANT INTERPRETATION FOR UL MULTIPLE-INPUT MULTIPLE-OUTPUT (MIMO)" filed May 11, 2012; and
Provisional Application No. 61/612,541 entitled "SIGNALING GRANTS, E-TFC SELECTION AND POWER SCALING FOR UL MIMO" filed Mar. 19, 2012;
each assigned to the assignee hereof and hereby expressly incorporated by reference herein.

CLAIM OF PRIORITY UNDER 35 U.S.C. §120

The present application for patent is a continuation-in-part of:
patent application Ser. No. 13/760,252 entitled "METHOD AND APPARATUS FOR SCHEDULING RESOURCES FOR UPLINK MIMO COMMUNICATION" filed Feb. 6, 2013;
patent application Ser. No. 13/760,275 entitled "METHOD AND APPARATUS FOR E-TFC SELECTION FOR UPLINK MIMO COMMUNICATION" filed Feb. 6, 2013; and
patent application Ser. No. 13/760,561 entitled "METHOD AND APPARATUS FOR ENHANCING RESOURCE ALLOCATION FOR UPLINK MIMO COMMUNICATION" filed Feb. 6, 2013;
each claiming priority to: 61/596,682 entitled "Method and Apparatus for Managing Uplink Multiple-Input Multiple-Output at a Media Access Control Layer" filed Feb. 8, 2012; Provisional Application No. 61/612,541 entitled "Signaling Grants, E-TFC Selection and Power Scaling for UL MIMO" filed Mar. 19, 2012; and Provisional Application No. 61/646,241 entitled "E-TFC Selection and Serving Grant Interpretation for UL Multiple-Input Multiple-Output (MIMO)" filed May 11, 2012; and each assigned to the assignee hereof and hereby expressly incorporated by reference herein; and
patent application Ser. No. 13/291,040 entitled "SYSTEM AND METHOD FOR UPLINK MULTIPLE INPUT MULTIPLE OUTPUT TRANSMISSION" filed Nov. 7, 2011;
patent application Ser. No. 13/291,045 entitled "SYSTEM AND METHOD FOR UPLINK MULTIPLE INPUT MULTIPLE OUTPUT TRANSMISSION" filed Nov. 7, 2011,
patent application Ser. No. 13/291,051 entitled "SYSTEM AND METHOD FOR UPLINK MULTIPLE INPUT MULTIPLE OUTPUT TRANSMISSION" filed Nov. 7, 2011;
patent application Ser. No. 13/291,056 entitled "SYSTEM AND METHOD FOR UPLINK MULTIPLE INPUT MULTIPLE OUTPUT TRANSMISSION" filed Nov. 7, 2011; and
patent application Ser. No. 13/291,063 entitled "SYSTEM AND METHOD FOR UPLINK MULTIPLE INPUT MULTIPLE OUTPUT TRANSMISSION" filed Nov. 7, 2011;
each claiming priority to Provisional Application No. 61/411,454, filed Nov. 8, 2010, and each assigned to the assignee hereof and hereby expressly incorporated by reference herein.

BACKGROUND

1. Field

Aspects of the present disclosure relate generally to wireless communication systems, and more particularly, to scheduling of uplink transmissions in the presence of HARQ retransmissions in an uplink MIMO system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

For example, recent releases of 3GPP standards for UMTS technologies have included multiple input multiple output (MIMO) for downlink transmissions. MIMO can enable increased throughput in a transmission without requiring a commensurate increase in spectrum use, since two streams can be transmitted in the same carrier frequency, where they are separated by the spatial dimension by being transmitted from spatially separate antennas. In this way, an effective doubling of spectral efficiency can be achieved by transmitting dual transport blocks per transmission time interval.

Further, recent attention within the 3GPP standards body has been directed to a particular uplink beamforming transmit diversity (BFTD) scheme for high speed packet access (HSPA) networks within the UMTS standards, where a mobile terminal utilizes two transmit antennas and two power amplifiers for uplink transmissions. This scheme, when implemented in a closed loop mode under network control, has shown significant improvement in cell edge user experience, as well as overall improvements in system performance. However, in schemes that have been investigated, the mobile terminal has been limited to single stream transmissions across the two antennas.

Therefore, to increase the throughput and spectral efficiency for uplink transmissions, there is a desire to implement MIMO for uplink transmissions such that dual transport blocks can be transmitted in the same carrier frequency during the same transmission time interval.

SUMMARY

Various aspects of the present disclosure provide for uplink MIMO transmissions in a wireless communication system. In some particular aspects, scheduling of the uplink MIMO transmissions may make a determination between single stream, rank=1 transmissions and dual stream, rank=2 transmissions based on various factors. Further, when switching between single and dual stream transmissions in the presence of HARQ retransmissions of failed packets, the scheduling function may determine to transmit the HARQ retransmissions on a single stream transmission or to transmit the HARQ retransmissions on one stream while transmitting new packets on the other stream.

In an aspect, for example, a method of wireless communication includes transmitting a MIMO uplink utilizing a first stream and a second stream, and receiving HARQ feedback indicating a decoding failure of a packet on the second stream and a decoding success of a packet on the first stream. Further, the method includes receiving a command to transmit a single stream only. Additionally, the method includes transmitting a HARQ retransmission corresponding to the decoding failure of the packet on the second stream, on the first stream.

In another aspect, for example, a computer program product for wireless communication includes a computer-readable medium comprising instructions for causing a computer to transmit a MIMO uplink utilizing a first stream and a second stream, and to receive HARQ feedback indicating a decoding failure of a packet on the second stream and a decoding success of a packet on the first stream. Further, the computer-readable medium comprises instructions for causing the computer to receive a command to transmit a single stream only. Additionally, the computer-readable medium comprises instructions for causing the computer to transmit a HARQ retransmission corresponding to the decoding failure of the packet on the second stream, on the first stream.

In another aspect, for example, an apparatus for wireless communication includes means for transmitting a MIMO uplink utilizing a first stream and a second stream, means for receiving HARQ feedback indicating a decoding failure of a packet on the second stream and a decoding success of a packet on the first stream, means for receiving a command to transmit a single stream only, and means for transmitting a HARQ retransmission corresponding to the decoding failure of the packet on the second stream, on the first stream.

In another aspect, for example, wireless user equipment includes a transmitter for transmitting a primary virtual antenna and a secondary virtual antenna, at least one processor for controlling the transmitter, and a memory coupled to the at least one processor. Further, the at least one processor is configured to transmit a MIMO uplink utilizing a first stream and a second stream, receive HARQ feedback indicating a decoding failure of a packet on the second stream and a decoding success of a packet on the first stream, receive a command to transmit a single stream only, and transmit a HARQ retransmission corresponding to the decoding failure of the packet on the second stream, on the first stream.

In another aspect, for example, a method of wireless communication includes transmitting a MIMO uplink utilizing a first stream and a second stream, receiving HARQ feedback indicating a decoding failure of a packet on the first stream and a decoding success of a packet on the second stream, receiving a command to transmit a single stream only, and transmitting a HARQ retransmission corresponding to the decoding failure of the packet on the first stream, on the first stream.

In another aspect, for example, a computer program product for wireless communication includes a computer-readable medium comprising instructions for causing a computer to transmit a MIMO uplink utilizing a first stream and a second stream, receive HARQ feedback indicating a decoding failure of a packet on the first stream and a decoding success of a packet on the second stream, receive a command to transmit a single stream only, and transmit a HARQ retransmission corresponding to the decoding failure of the packet on the first stream, on the first stream.

In another aspect, for example, an apparatus for wireless communication includes means for transmitting a MIMO uplink utilizing a first stream and a second stream, means for receiving HARQ feedback indicating a decoding failure of a packet on the first stream and a decoding success of a packet on the second stream, means for receiving a command to transmit a single stream only, and means for transmitting a HARQ retransmission corresponding to the decoding failure of the packet on the first stream, on the first stream.

In another aspect, for example, wireless user equipment includes a transmitter for transmitting a primary virtual antenna and a secondary virtual antenna, at least one processor for controlling the transmitter, and a memory coupled to the at least one processor. Further, the at least one processor is configured to transmit a MIMO uplink utilizing a first stream and a second stream, receive HARQ feedback indicating a decoding failure of a packet on the first stream and a decoding success of a packet on the second stream, receive a command to transmit a single stream only, and transmit a HARQ retransmission corresponding to the decoding failure of the packet on the first stream, on the first stream.

In another aspect, for example, a method of wireless communication, includes transmitting a MIMO uplink utilizing a first stream and a second stream, receiving HARQ feedback indicating a decoding failure of a packet on the second stream and a decoding success of a packet on the first stream, receiving one of a first command to transmit a single stream or a second command to transmit dual streams, and transmitting, upon reception of the first command, a HARQ retransmission corresponding to the decoding failure of the packet on the second stream, on the first stream.

In another aspect, for example, a computer program product for wireless communication includes a computer-readable medium comprising instructions for causing a computer to transmit a MIMO uplink utilizing a first stream and a second stream, receive HARQ feedback indicating a decoding failure of a packet on the second stream and a decoding success of a packet on the first stream, receive one of a first command to transmit a single stream or a second command to transmit dual streams, and transmit, upon reception of the first command, a HARQ retransmission corresponding to the decoding failure of the packet on the second stream, on the first stream.

In another aspect, for example, an apparatus for wireless communication includes means for transmitting a MIMO uplink utilizing a first stream and a second stream, means for receiving HARQ feedback indicating a decoding failure of a packet on the second stream and a decoding success of a packet on the first stream, means for receiving one of a first command to transmit a single stream or a second command to transmit dual streams, and means for transmitting, upon reception of the first command, a HARQ retransmission corresponding to the decoding failure of the packet on the second stream, on the first stream.

In another aspect, for example, wireless user equipment includes a transmitter for transmitting a primary virtual antenna and a secondary virtual antenna, at least one processor for controlling the transmitter, and a memory coupled to the at least one processor. Further, the at least one processor is configured to transmit a MIMO uplink utilizing a first stream and a second stream, receive HARQ feedback indicating a decoding failure of a packet on the second stream and a decoding success of a packet on the first stream, receive one of a first command to transmit a single stream or a second command to transmit dual streams, and transmit, upon reception of the first command, a HARQ retransmission corresponding to the decoding failure of the packet on the second stream, on the first stream.

In another aspect, for example, a method of wireless communication includes transmitting a MIMO uplink utilizing a first stream and a second stream, receiving HARQ feedback indicating a decoding failure of a packet on the first stream and a decoding success of a packet on the second stream, receiving one of a first command to transmit a single stream or a second command to transmit dual streams, and transmitting, upon reception of the first command, a HARQ retransmission corresponding to the decoding failure of the packet on the first stream, on the first stream.

In another aspect, for example, a computer program product for wireless communication includes a computer-readable medium comprising instructions for causing a computer to transmit a MIMO uplink utilizing a first stream and a second stream, receive HARQ feedback indicating a decoding failure of a packet on the first stream and a decoding success of a packet on the second stream, receive one of a first command to transmit a single stream or a second command to transmit dual streams, and transmit, upon reception of the first command, a HARQ retransmission corresponding to the decoding failure of the packet on the first stream, on the first stream.

In another aspect, for example, an apparatus for wireless communication includes means for transmitting a MIMO uplink utilizing a first stream and a second stream, means for receiving HARQ feedback indicating a decoding failure of a packet on the first stream and a decoding success of a packet on the second stream, means for receiving one of a first command to transmit a single stream or a second command to transmit dual streams, and means for transmitting, upon reception of the first command, a HARQ retransmission corresponding to the decoding failure of the packet on the first stream, on the first stream.

In another aspect, for example, wireless user equipment includes a transmitter for transmitting a primary virtual antenna and a secondary virtual antenna, at least one processor for controlling the transmitter, and a memory coupled to the at least one processor. Further, the at least one processor is configured to transmit a MIMO uplink utilizing a first stream and a second stream, receive HARQ feedback indicating a decoding failure of a packet on the first stream and a decoding success of a packet on the second stream, receive one of a first command to transmit a single stream or a second command to transmit dual streams, and transmit, upon reception of the first command, a HARQ retransmission corresponding to the decoding failure of the packet on the first stream, on the first stream.

These and other aspects will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
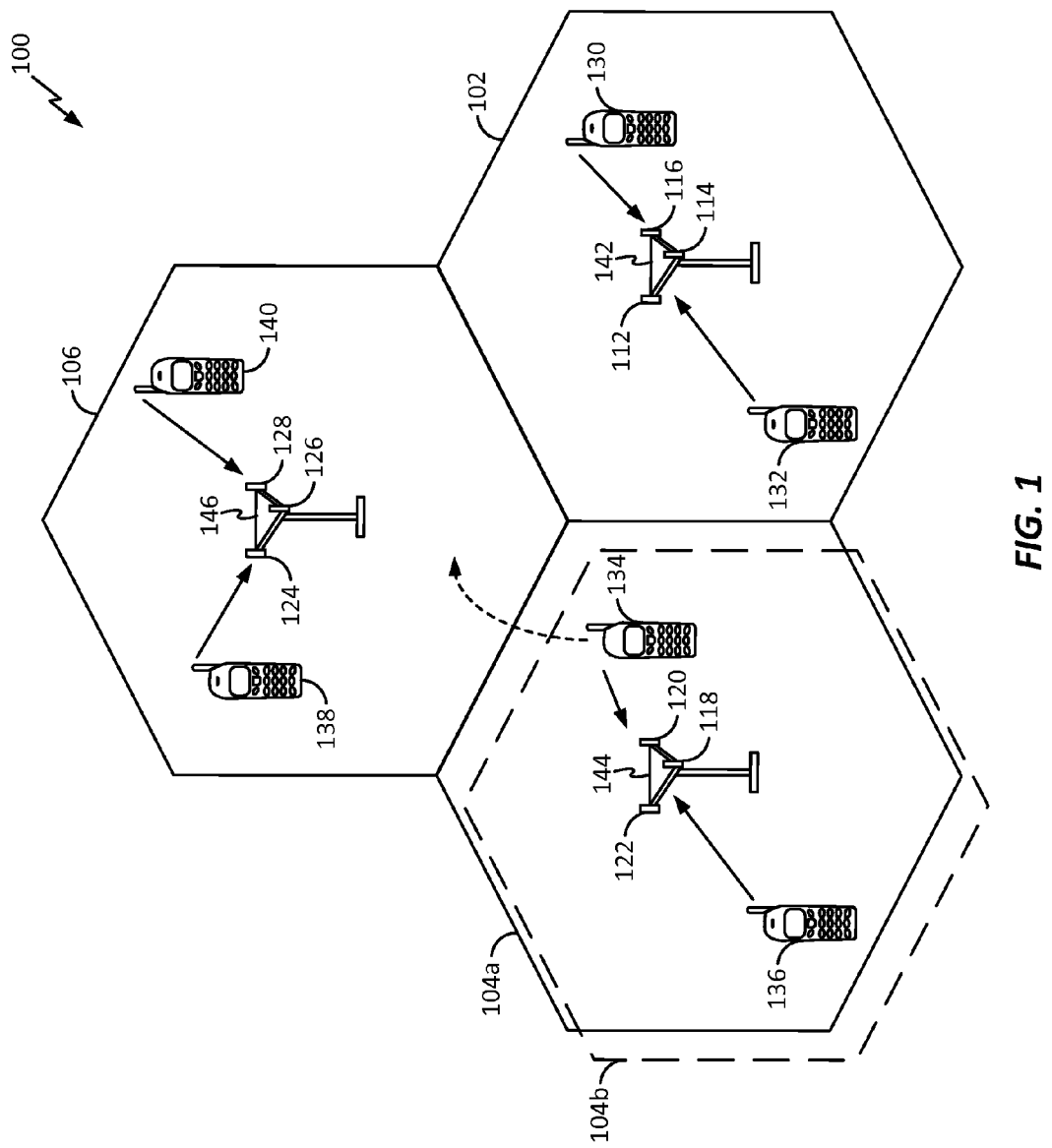
FIG. 1 is a conceptual diagram illustrating an example of an access network.

The various concepts presented throughout this disclosure may be implemented across a broad variety of telecommunication systems, network architectures, and communication standards. Referring to FIG. 1, by way of example and without limitation, a simplified access network 100 in a UMTS Terrestrial Radio Access Network (UTRAN) architecture, which may utilize High-Speed Packet Access (HSPA), is illustrated. The system includes multiple cellular regions (cells), including cells 102, 104, and 106, each of which may include one or more sectors. Cells may be defined geographically, e.g., by coverage area, and/or may be defined in accordance with a frequency, scrambling code, etc. That is, the illustrated geographically-defined cells 102, 104, and 106 may each be further divided into a plurality of cells, e.g., by utilizing different frequencies or scrambling codes. For example, cell 104a may utilize a first frequency or scrambling code, and cell 104b, while in the same geographic region and served by the same Node B 144, may be distinguished by utilizing a second frequency or scrambling code.

In a cell that is divided into sectors, the multiple sectors within a cell can be formed by groups of antennas with each antenna responsible for communication with UEs in a portion of the cell. For example, in cell 102, antenna groups 112, 114, and 116 may each correspond to a different sector. In cell 104, antenna groups 118, 120, and 122 each correspond to a different sector. In cell 106, antenna groups 124, 126, and 128 each correspond to a different sector.

The cells 102, 104 and 106 may include several UEs that may be in communication with one or more sectors of each cell 102, 104 or 106. For example, UEs 130 and 132 may be in communication with Node B 142, UEs 134 and 136 may be in communication with Node B 144, and UEs 138 and 140 may be in communication with Node B 146. Here, each Node B 142, 144, 146 is configured to provide an access point to a core network 204 (see FIG. 2) for all the UEs 130, 132, 134, 136, 138, 140 in the respective cells 102, 104, and 106.

Figure 2:
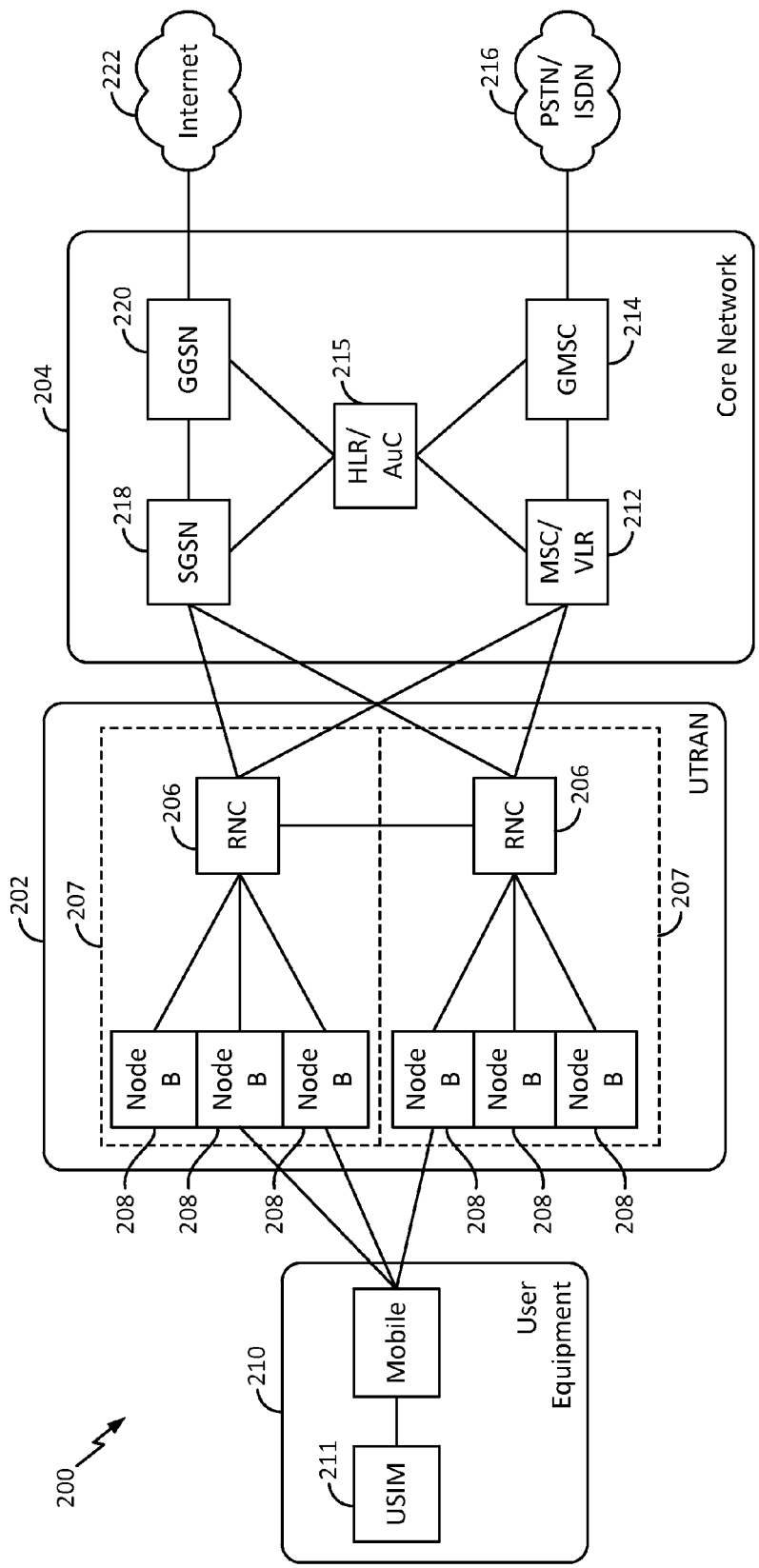
FIG. 2 is a block diagram conceptually illustrating an example of a telecommunications system.

Referring now to FIG. 2, by way of example and without limitation, various aspects of the present disclosure are illustrated with reference to a Universal Mobile Telecommunications System (UMTS) system 200 employing a wideband code division multiple access (W-CDMA) air interface. A UMTS network includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as the illustrated RNSs 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

Figure 3:
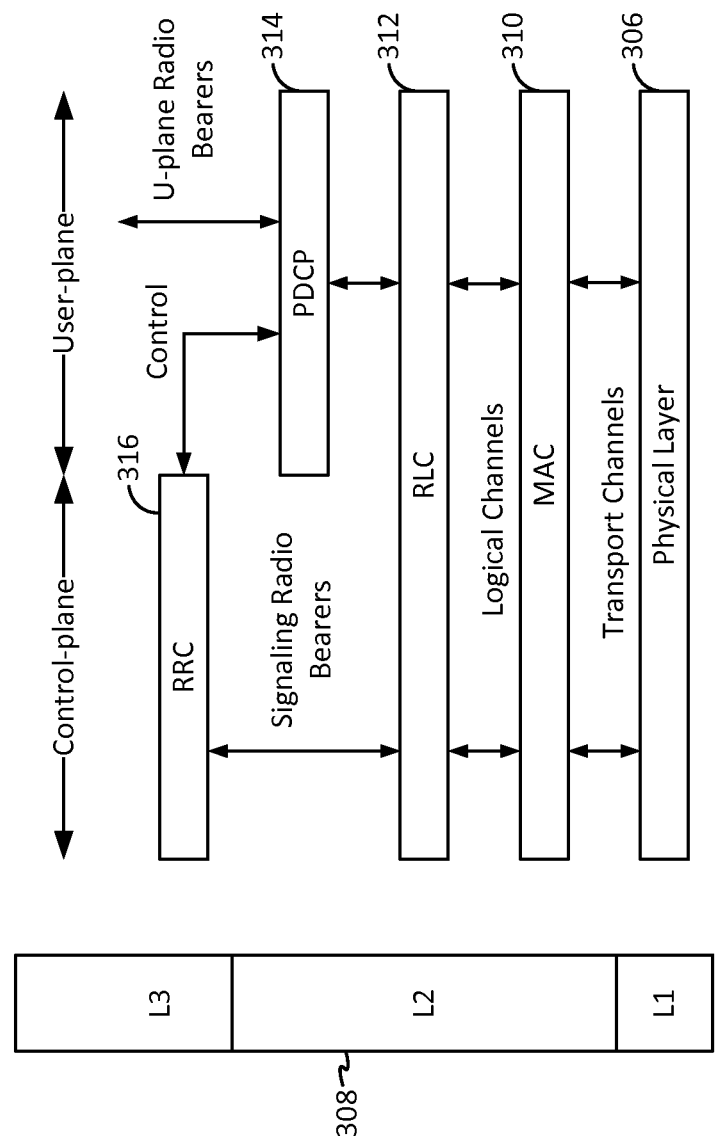
FIG. 3 is a conceptual diagram illustrating an example of a radio protocol architecture for the user and control plane.

In a wireless telecommunication system, the radio protocol architecture between a mobile device and a cellular network may take on various forms depending on the particular application. An example for a 3GPP high-speed packet access (HSPA) system will now be presented with reference to FIG. 3, illustrating an example of the radio protocol architecture for the user and control planes between the UE 210 and the Node B 208. Here, the user plane or data plane carries user traffic, while the control plane carries control information, i.e., signaling.

Turning to FIG. 3, the radio protocol architecture for the UE 210 and Node B 208 is shown with three layers: Layer 1, Layer 2, and Layer 3. Although not shown, the UE 210 may have several upper layers above the L3 layer including a network layer (e.g., IP layer) that is terminated at a PDN gateway on the network side, and an application layer that is terminated at the other end of the connection (e.g., far end UE, server, etc.).

At Layer 3, the RRC layer 316 handles control plane signaling between the UE 210 and the Node B 208. RRC layer 316 includes a number of functional entities for routing higher layer messages, handling broadcast and paging functions, establishing and configuring radio bearers, etc.

The data link layer, called Layer 2 (L2 layer) 308 is between Layer 3 and the physical layer 306, and is responsible for the link between the UE 210 and Node B 208. In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Of course, those of ordinary skill in the art will comprehend that additional or different sublayers may be utilized in a particular implementation of the L2 layer 308, still within the scope of the present disclosure.

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 provides segmentation and reassembly of upper layer data packets, retransmission of lost data packets, and reordering of data packets to compensate for out-of-order reception due to a hybrid automatic repeat request (HARQ).

The MAC sublayer 310 provides multiplexing between logical channels and transport channels. The MAC sublayer 310 is also responsible for allocating the various radio resources (e.g., resource blocks) in one cell among the UEs. The MAC sublayer 310 is also responsible for HARQ operations.

Layer 1 is the lowest layer and implements various physical layer signal processing functions. Layer 1 will be referred to herein as the physical layer (PHY) 306. At the PHY layer 306, the transport channels are mapped to different physical channels.

Data generated at higher layers, all the way down to the MAC layer 310, are carried over the air through transport channels. 3GPP Release 5 specifications introduced downlink enhancements referred to as HSDPA. HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries HARQ ACK/NACK signaling on the uplink to indicate whether a corresponding packet transmission was decoded successfully. That is, with respect to the downlink, the UE 210 provides feedback to the Node B 208 over the HS-DPCCH to indicate whether it correctly decoded a packet on the downlink.

HS-DPCCH further includes feedback signaling from the UE 210 to assist the Node B 208 in taking the right decision in terms of modulation and coding scheme and precoding weight selection, this feedback signaling including the channel quality indicator (CQI) and precoding control information (PCI).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel) or a pilot channel (e.g., a primary pilot channel) in accordance with whether reference is being made to the channel's control aspects or its pilot aspects.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH). Further, in accordance with aspects of the present disclosure, for HSUPA with MIMO utilizing two transmit antennas, the physical channels include a Secondary E-DPDCH (S-E-DPDCH), a Secondary E-DPCCH (S-E-DPCCH), and a Secondary DPCCH (S-DPCCH). Additional information about these channels is provided below.

That is, part of the ongoing development of HSPA standards (including HSDPA and EUL) includes the addition of multiple-input, multiple-output (MIMO) communication. MIMO generally refers to the use of multiple antennas at the transmitter (multiple inputs to the channel) and the receiver (multiple outputs from the channel) to implement spatial multiplexing, that is, the transmission and/or reception of different streams of information from spatially separated antennas, utilizing the same carrier frequency for each stream. Such a scheme can increase throughput, that is, can achieve higher data rates without necessarily expanding the channel bandwidth, thus improving spectral efficiency. That is, in an aspect of the disclosure, the Node B 208 and/or the UE 210 may have multiple antennas supporting MIMO technology.

MIMO for increased downlink performance was implemented in Release 7 of the 3GPP UMTS standards for HSDPA, and Release 9 included DC-HSDPA+MIMO for further increased downlink performance. In HSDPA MIMO the Node B 208 and the UE 210 each utilize two antennas, and a closed loop feedback from the UE 210 (Precoding Control Information, PCI) is utilized to dynamically adjust the Node B's transmit antenna weighting. When channel conditions are favorable, MIMO can allow a doubling of the data rate by transmitting two data streams, utilizing spatial multiplexing. When channel conditions are less favorable, a single stream transmission over the two antennas can be utilized, providing some benefit from transmit diversity.

While MIMO in the uplink would be desirable for essentially the same reasons it has been implemented for the downlink, it has been considered somewhat more challenging, in part because the battery power-constrained UE may need to include two power amplifiers. Nonetheless, more recently an uplink beamforming transmit diversity (BFTD) scheme for HSPA that utilizes 2 transmit antennas and 2 power amplifiers at the UE 210 has garnered substantial interest, and studies have been directed to both open loop and closed loop modes of operation. These studies have shown improvements in cell edge user experience and overall system performance. However, these uplink transmit diversity schemes have generally been limited to single code word or single transport block transmissions utilizing dual transmit antennas.

Thus, various aspects of the present disclosure provide for uplink MIMO transmissions. For clarity by providing explicit details, the present description utilizes HSUPA terminology and generally assumes a 3GPP implementation in accordance with UMTS standards. However, those of ordinary skill in the art will understand that many if not all these features are not specific to a particular standard or technology, and may be implemented in any suitable technology for MIMO transmissions.

In an HSUPA system, data transmitted on a transport channel such as the E-DCH is generally organized into transport blocks. During each transmission time interval (TTI), without the benefits of spatial multiplexing, at most one transport block of a certain size (the transport block size or TBS) can be transmitted per carrier on the uplink from the UE 210. However, with MIMO using spatial multiplexing, multiple transport blocks can be transmitted per TTI in the same carrier, where each transport block corresponds to one code word. In a conventional HSUPA transmission, or even in more recent advancements relating to uplink CLTD, both of which are configured for single stream rank=1 transmissions, both 2 ms and 10 ms TTIs may generally be configured, since the longer 10 ms TTI can provide improved performance at the cell edge. However, in a UE 210 configured for dual stream transmissions, a primary motivation may be to increase the data rate. Here, since the 10 ms TTI generally has a limited data rate compared to that available with a 2 ms TTI, in accordance with some aspects of the present disclosure, to ensure an improvement in the data rate, rank=2 transmissions might be limited to the utilization of the 2 ms TTI.

Figure 4:
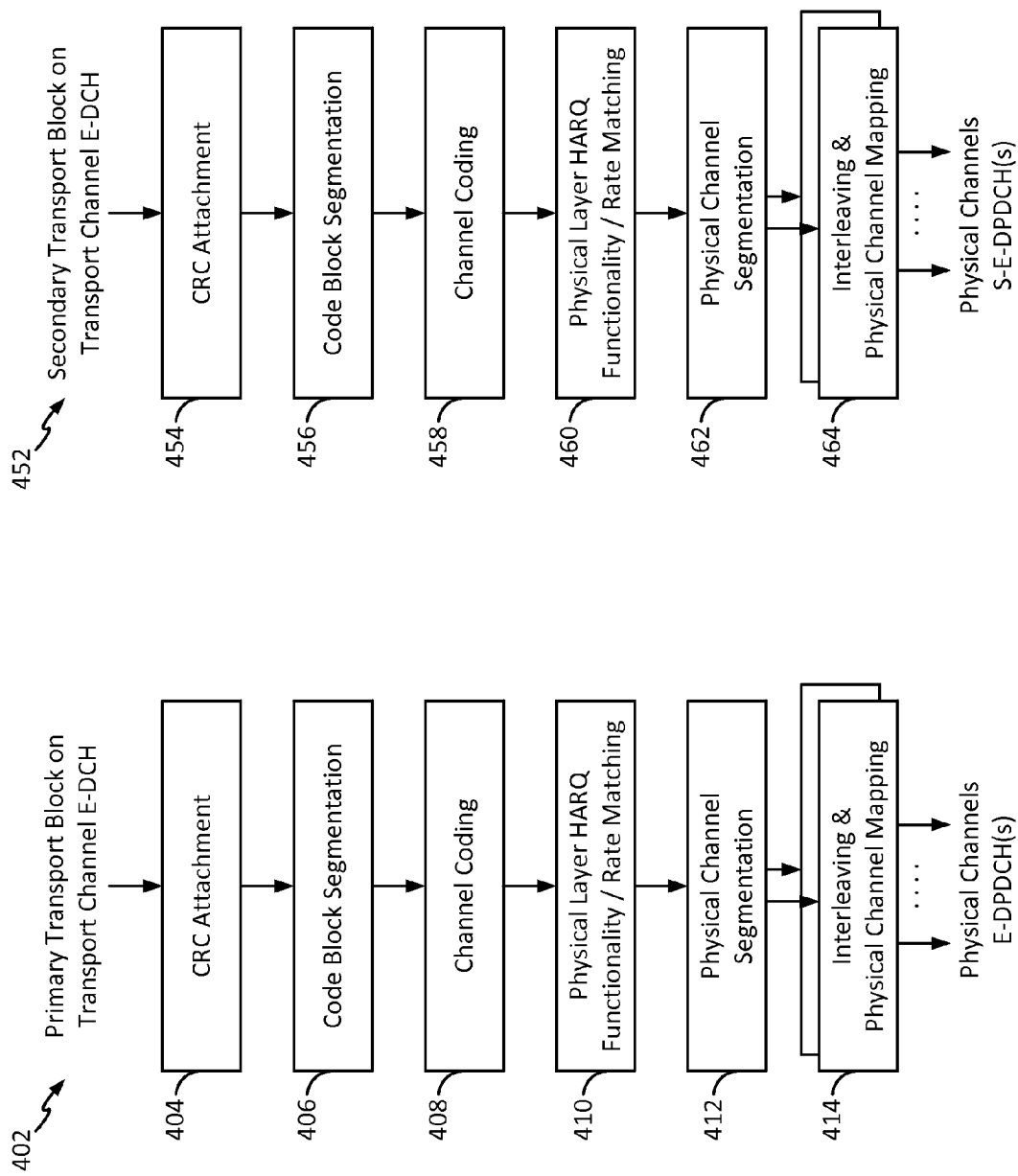
FIG. 4 is a block diagram illustrating a portion of a MAC layer implementing dual HARQ processes.

As illustrated in FIG. 4, in an aspect of the present disclosure, the transmission of dual transport blocks on the two precoding vectors may be implemented across dual HARQ processes during the same TTI. Here, the dual transport blocks are provided on one E-DCH transport channel. In each HARQ process, when a transport block on the E-DCH is received from higher layers, the process for mapping that transport block to the physical channels E-DPDCH (or, when utilizing the secondary transport block, the S-E-DPDCH) may include several operations such as CRC attachment 404, 454; code block segmentation 406, 456; channel coding 408, 458; rate matching 410, 460; physical channel segmentation 412, 462; and interleaving/physical channel mapping 414, 464. Details of these blocks are largely known to those of ordinary skill in the art, and are therefore omitted from the present disclosure. FIG. 4 illustrates this process for the generation of an UL MIMO transmission using dual transport blocks 402, 452. This scheme is frequently referred to as a multiple code word scheme, since each of the transmitted streams may be precoded utilizing separate codewords. In some aspects of the disclosure, the E-DCH processing structure is essentially identical for each of the two transport blocks. Additionally, this scheme is frequently referred to as a dual stream scheme, where the primary transport bock is provided on the primary stream, and the secondary transport block is provided on the secondary stream.

Figure 5:
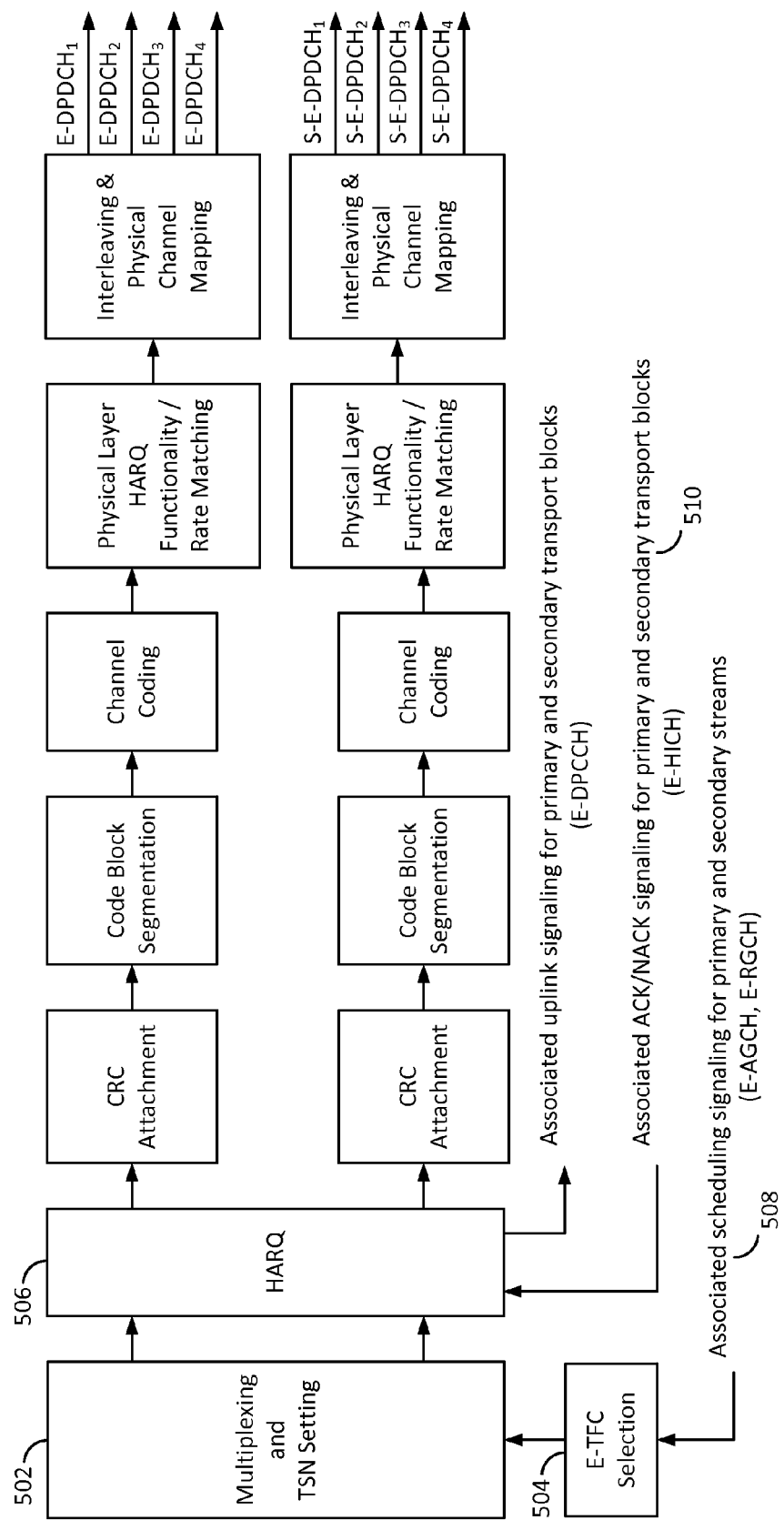
FIG. 5 is a block diagram illustrating additional portions of the MAC layer illustrated in FIG. 4.

FIG. 5 provides another example in accordance with the present disclosure, including circuitry additional to that illustrated in FIG. 4, showing operation of a Multiplexing and Transmission Sequence Number (TSN) setting entity 502, an E-DCH Transport Format Combination (E-TFC) selection entity 504, and a Hybrid Automatic Repeat Request (HARQ) entity 506 within a UE such as the UE 210.

Figure 20:
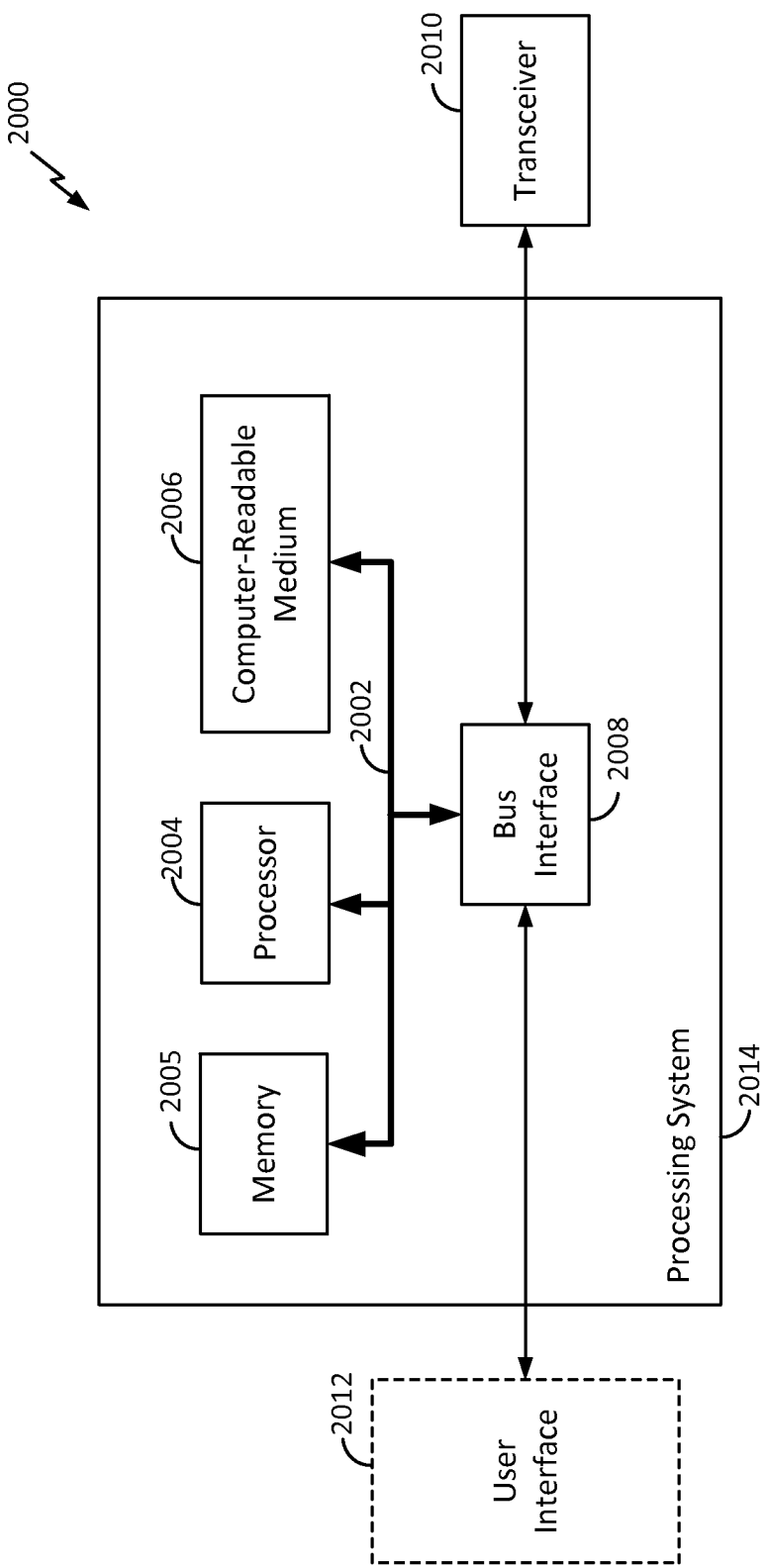
FIG. 20 is an example of a hardware implementation for an apparatus employing a processing system.

Each of the E-TFC selection entity 504, the multiplexing and TSN setting entity 502, and the HARQ entity 506 may include a processing system 2014 as illustrated in FIG. 20, described below, for performing processing functions such as making determinations relating to the E-DCH transport format combination, handling MAC protocol data units, and performing HARQ functions, respectively. Of course, some or all of the respective entities may be combined into a single processor or processing system 114. Here, the processing system 2014 may control aspects of the transmission of the primary and secondary streams as described below.

In some aspects of the present disclosure, in accordance with received grant information 508 on the E-AGCH and E-RGCH, and based in part on a determination of which configuration results in better data throughput, the E-TFC selection entity 504 may determine either to transmit a single transport or dual transport blocks, and may accordingly determine the transport block size(s) and power levels to utilize on the stream or streams. For example, the E-TFC selection entity 504 may determine whether to transmit a single transport block (e.g., utilizing uplink beamforming transmit diversity), or dual transmit blocks (e.g., utilizing spatial multiplexing). In this example, the multiplexing and TSN setting entity 502 may concatenate multiple MAC-d Protocol Data Units (PDUs) or segments of MAC-d PDUs into MAC-is PDUs, and may further multiplex one or more MAC-is PDUs into a single MAC-i PDU to be transmitted in the following TTI, as instructed by the E-TFC selection entity 504. The MAC-i PDU may correspond to the transport block provided on a corresponding stream. That is, in some aspects of the disclosure, if the E-TFC selection entity determines to transmit two transport blocks, then two MAC-i PDUs may be generated by the Multiplexing and TSN Setting entity 502 and delivered to the HARQ entity 506.

Scheduling Grants

In some aspects of the disclosure, a scheduler at the Node B 208 may provide scheduling information 508 to the UE 210 on a per-stream basis. The scheduling of a UE 210 may be made in accordance with various measurements made by the Node B 208 such as the noise level at the Node B receiver, with various feedback information transmitted on the uplink by UEs such as a "happy bit," buffer status, and transmission power availability, and with priorities or other control information provided by the network. That is, when MIMO is selected, the scheduler at the Node B 208 may generate and transmit two grants, e.g., one for each stream during each TTI.

For example, the E-DCH Absolute Grant Channel (E-AGCH) is a physical channel that may be utilized to carry information from the Node B 208 to the E-TFC selection entity 504 of the UE 210 for controlling the power and transmission rate of uplink transmissions by the UE 210 on the E-DCH. In some examples, the E-AGCH can be a common channel that masks the 16 CRC bits with the UE's primary E-RNTI.

In addition to the scheduling grant information provided on the E-AGCH, further scheduling grant information may also be conveyed from the Node B 208 to the E-TFC selection entity 504 of the UE 210 over the E-DCH Relative Grant Channel (E-RGCH). Here, the E-RGCH may be utilized for small adjustments during ongoing data transmissions. In an aspect of the present disclosure, in uplink MIMO, the UE 210 may be allocated two resources on the E-RGCH to carry relative scheduling grants for the primary and secondary HARQ processes, e.g., corresponding to the primary and secondary precoding vectors.

The grant provided on the E-AGCH can change over time for a particular UE, so grants may be periodically or intermittently transmitted by the Node B 208. The absolute grant value carried on the E-AGCH may indicate the maximum E-DCH traffic to pilot power ratio (T/P) that the UE 210 is allowed to use in its next transmission.

In some examples, the Node B 208 may transmit two E-AGCH channels to the UE 210, wherein each E-AGCH is configured in the same way as Release-7 E-AGCH. Here, the UE 210 may be configured to monitor both E-AGCH channels each TTI. In another example in accordance with various aspects of the present disclosure, a new type of E-AGCH physical channel may be utilized, wherein Release-7 E-AGCH channel coding is utilized independently to encode the absolute grant information bits for each stream, and wherein the spreading factor is reduced by 2, i.e., to SF=128 to accommodate more bits of information. Here, joint encoding of the absolute grant information for both streams may utilize the primary E-RNTI of the UE 210.

In yet another example in accordance with various aspects of the present disclosure, a new type of E-AGCH channel coding may be utilized, wherein the absolute grant information bits are jointly encoded. Here, the legacy Release-7 E-AGCH physical channel, with the spreading factor SF=256 may be utilized. This example may be the most attractive for both the UE 210 as well as the Node B 208, considering UE implementation and Node B code resources.

Here, the absolute grant provided on the E-AGCH may be used by the UE 210 in UL MIMO to determine (1) transport block sizes (TBS) for the primary and secondary transport blocks to be transmitted in the next uplink transmission; (2) the transmit power on the E-DPDCH(s) and on the S-E-DPDCH(s); and (3) the rank of the transmission. As described above, the TBS is the size of a block of information transmitted on a transport channel (e.g., the E-DCH) during a TTI. The transmit "power" may be provided to the UE 210 in units of dB, and may be interpreted by the UE 210 as a relative power, e.g., relative to the power level of the DPCCH, referred to herein as a traffic to pilot power ratio. Further, if the rank of the transmission is rank=1, then only the E-DPDCH(s) are transmitted on a primary precoding vector. If the rank of the transmission is rank=2, then both the E-DPDCHs and the S-E-DPDCHs are transmitted, i.e., on the primary precoding vector and the secondary precoding vector, respectively.

For example, in an aspect of the present disclosure, the scheduling signaling 508 may indicate that the rank of the transmission is rank=1 corresponding to a single stream, by including in the E-AGCH a single scheduling grant $(T/P)_{SS}$. Here, the single-stream scheduling grant $(T/P)_{SS}$ may be utilized by the E-TFC selection entity 504 to determine the power and the transport block size to utilize on the single stream transmission.

Further, in this example, the scheduling signaling 508 may indicate that the rank of the transmission is rank=2 corresponding to dual streams, by including in the E-AGCH a primary scheduling grant $(T/P)_1$ and a secondary scheduling grant $(T/P)_2$. Here, the primary scheduling grant $(T/P)_1$ may be utilized to determine the transport block size for the primary stream, while the secondary scheduling grant $(T/P)_2$ may be utilized to determine the transport block size for the secondary stream. Further, the primary scheduling grant $(T/P)_1$ may be utilized to determine the total amount of power for the primary stream, and the total amount of power for the secondary stream may be set to be equal to that of the primary stream. Table 1 below illustrates the relationship described here, wherein the primary scheduling grant $(T/P)_1$ is utilized to determine the power level of the primary stream, the power level of the secondary stream, and the transport block size of the primary stream; while the secondary scheduling grant $(T/P)_2$ is utilized to determine the transport block size of the secondary stream.

TABLE 1

| Primary Scheduling Grant $(T/P)_1$ | Secondary Scheduling Grant $(T/P)_2$ |
|---|---|
| Power Level of Primary Stream<br>Power Level of Secondary Stream<br>Transport Block Size of Primary Stream | Transport Block Size of Secondary Stream |

E-TFC Selection, Power of Data Channels

Figure 6:
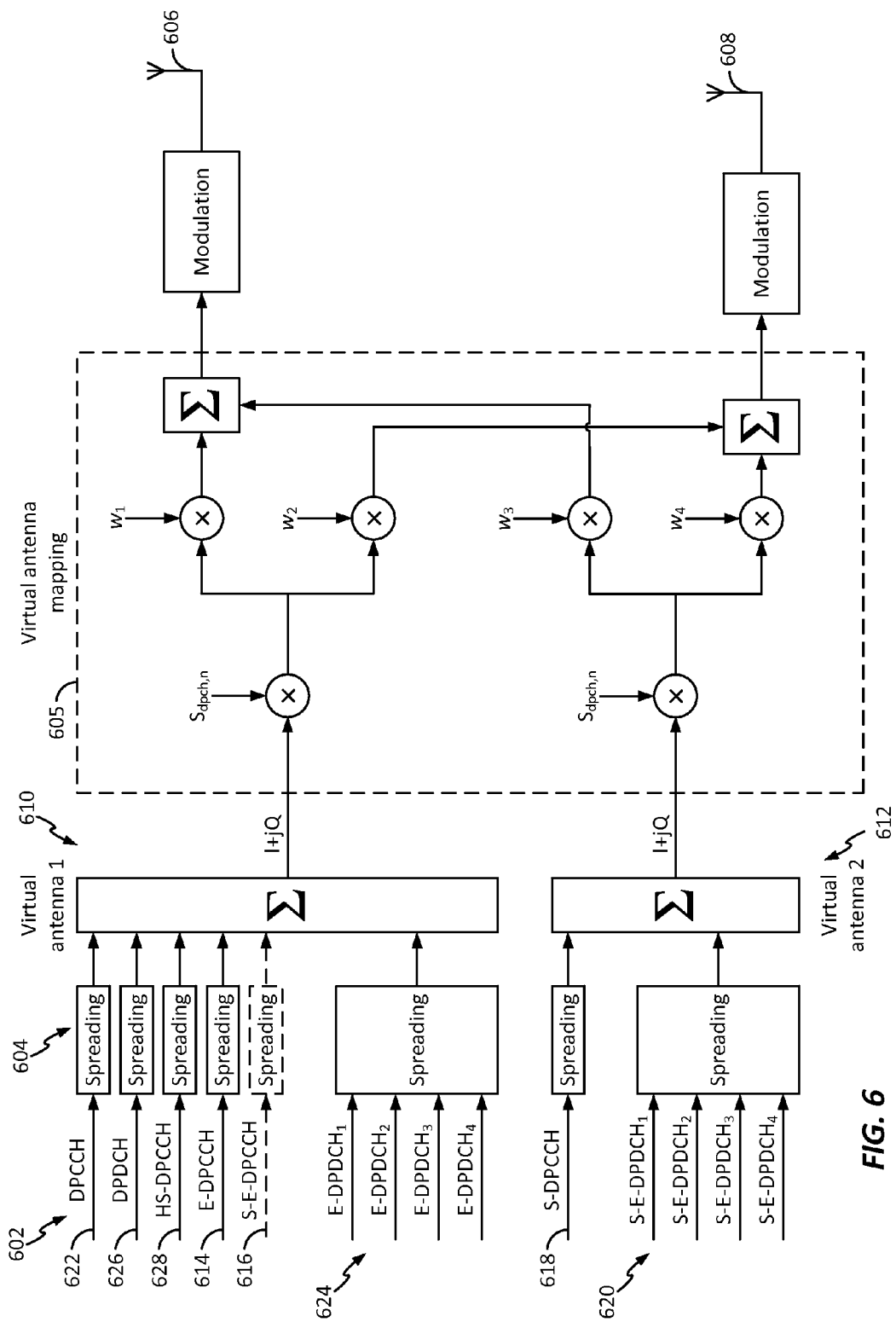
FIG. 6 is a block diagram illustrating a portion of a transmitter configured for uplink MIMO transmissions.
Figure 7:
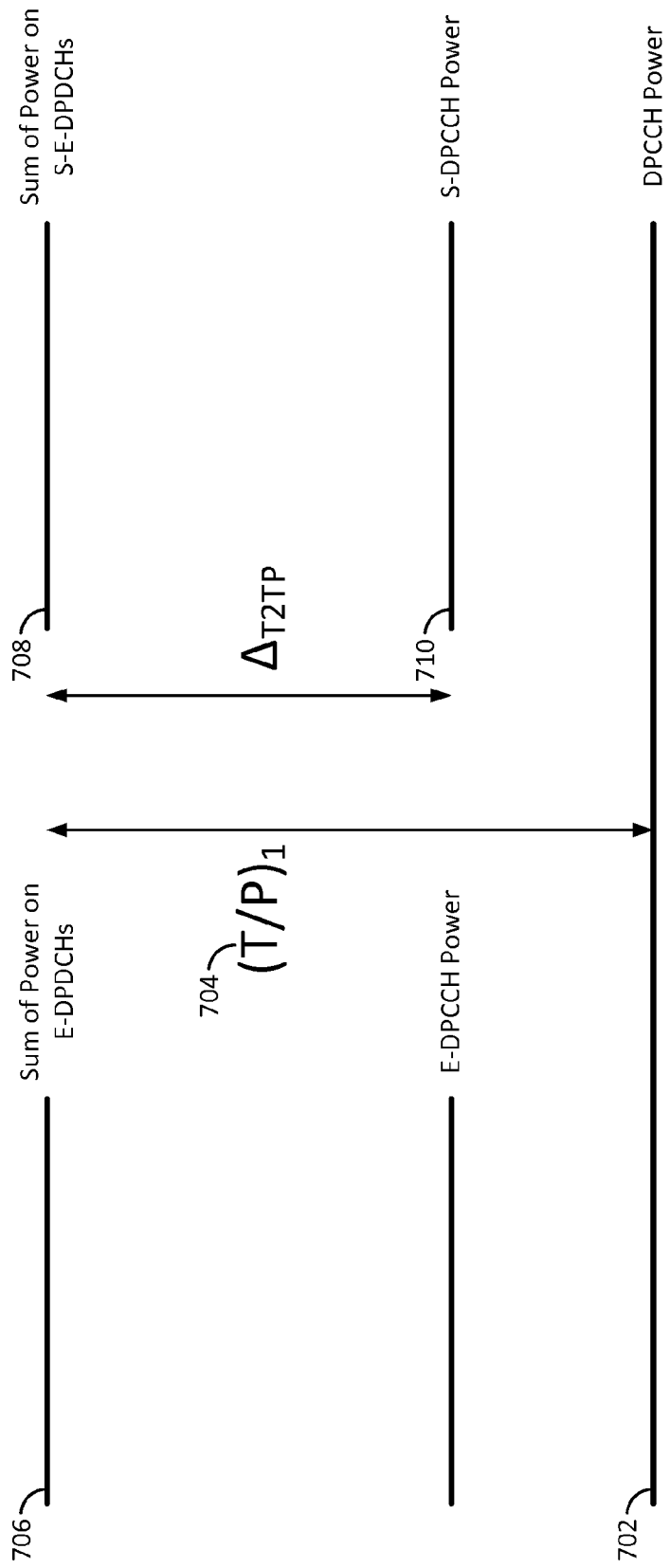
FIG. 7 is a graph showing relative power levels of certain physical channels in uplink MIMO transmissions.

FIG. 6 is a block diagram further illustrating a portion of a transmitter in a UE 210 configured for MIMO operation at the PHY layer 306 in accordance with some aspects of the disclosure. In an aspect of the present disclosure as illustrated in FIG. 7, when the rank of the transmission is rank=2, the power of the S-E-DPDCH(s) 620, corresponding to the secondary transport block, may be set to be equal to the power of the E-DPDCH(s) 624, corresponding to the primary transport block. That is, while some examples may utilize an asymmetric allocation of total available power on the E-DCH between the first stream 610 and the second stream 612, in those examples there may be some difficulty accurately estimating the powers of the eigenvalues and sufficiently quickly adapting the power allocation. Further, dynamic and asymmetric power allocation between the streams may lead to an increase in Node B scheduler complexity, in that it may be required to evaluate different combinations of transport block sizes across the two streams such that the throughput can be maximized. Thus, in aspects of the present disclosure, as illustrated in FIG. 7, the sum total power on the first stream 610 may be equal to the sum total power on the second stream 612. Such an equal distribution of power amongst the streams may not be intuitive, since each stream is generally independently controllable due to the utilization of separate power amplifiers corresponding to each of the streams. However, utilization of the equal distribution as described in this aspect of the present disclosure can simplify the scheduling grant signaling and enable improved transmission performance.

For example, in an aspect of the present disclosure, scheduling signaling 508 received at the UE 210 and carried by the E-AGCH may be provided to the E-TFC selection entity 504 in the form of a primary scheduling grant and a secondary scheduling grant. Here, each of the primary and the secondary scheduling grants may be provided in the form of traffic to pilot power ratios, or $(T/P)_1$ and $(T/P)_2$, respectively. Here, the E-TFC selection entity 504 may utilize the primary scheduling grant $T/P_1$ to determine the total amount of power to transmit on the E-DPDCH(s), relative to the current transmit power on the DPCCH. That is, the E-TFC selection entity 504 may utilize the primary scheduling grant $(T/P)_1$ to compute the power of the E-DPDCH(s), and may further set the power of the S-E-DPDCH(s) to the same value as that set for the E-DPDCH(s). In this fashion, symmetric power allocation among the primary stream on the E-DPDCH(s) and the secondary stream on the S-E-DPDCH(s) may be achieved based on the primary scheduling grant $(T/P)_1$. Importantly, in this example, the secondary scheduling grant $(T/P)_2$ is not utilized to determine the power of the secondary stream.

Figure 8:
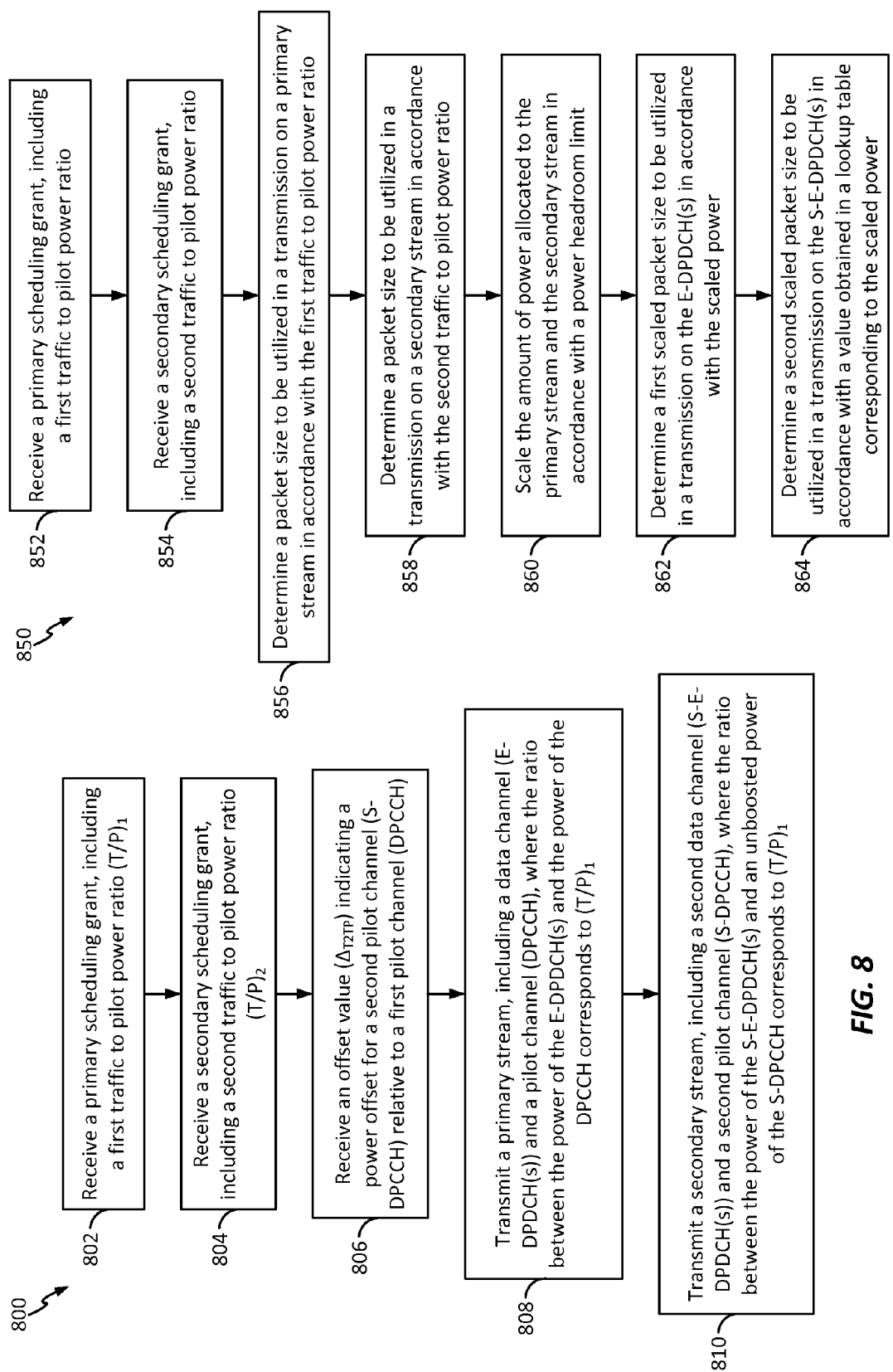
FIG. 8 is a flow chart illustrating a process for setting power levels and transport block sizes in accordance with a scheduling grant.

FIG. 7 is a graph schematically illustrating power levels for certain channels in accordance with some aspects of the present disclosure. FIG. 8 includes a corresponding flow chart 800 illustrating an exemplary process for setting the power levels. In this example, a first pilot channel 622 (DPCCH) is configured to have a certain power level, illustrated as first pilot power 702. That is, while the DPCCH 622 carries some control information, it may also act as a pilot, for channel estimation purposes at the receiver. Similarly, in an uplink MIMO configuration in accordance with an aspect of the present disclosure, the S-DPCCH 618 may carry certain control information and may additionally act as a pilot for additional channel estimation purposes at the receiver. In the present disclosure, the S-DPCCH may be referred to variously as a secondary pilot channel or a secondary control channel, in accordance with whether reference is being made to the channel's control aspects or its pilot aspects.

Here, according to the process 800, in block 802 the UE 210 may receive scheduling signaling 508, e.g., including a primary scheduling grant carried on the E-AGCH, where the primary scheduling grant includes a first traffic to pilot power ratio $(T/P)_1$ 704. Further, in block 804 the UE 210 may receive scheduling signaling 508 including a secondary scheduling grant, which includes a second traffic to pilot power ratio $(T/P)_2$. As described above, the respective first and second scheduling grants may be jointly encoded on the E-AGCH, or in other aspects, any suitable scheduling grant signaling may be utilized for carrying the respective traffic to pilot power ratios.

In block 806, the UE 210 may receive an offset value $\Delta_{T2TP}$, for indicating an power offset for a reference power level 710 relative to the power of the first pilot channel 622 (DPCCH). In some examples, the offset value $\Delta_{T2TP}$ may be provided by a network node such as the RNC 206 utilizing Layer 3 RRC signaling. Here, the $\Delta_{T2TP}$ value may be adapted to enable the UE 210 to determine the reference power level 710, at which level the second pilot channel 618 (S-DPCCH) may be set when boosted as described below. That is, an unboosted power level 702 for the pilot channel of the secondary stream S-DPCCH 618 may be configured to take the same power level as that of the first pilot channel DPCCH 622 by default. Of course, within the scope of the present disclosure, the unboosted power level for the second pilot S-DPCCH 618 need not be the same as the power level of the first pilot channel DPCCH 622. Further, the second pilot S-DPCCH 618 need not be at the unboosted power level; that is, in an aspect of the present disclosure, the unboosted power level for the second pilot S-DPCCH is a reference level for determining the power level of the second data channel S-E-DPDCH 620. Further, the power level of the S-DPCCH 618 may be boosted to the reference power level 710 in accordance with the offset value $\Delta_{T2TP}$. Additional information regarding the boosting of the power level of the S-DPCCH 618 is provided elsewhere in the present disclosure.

As illustrated, the first traffic to pilot power ratio $(T/P)_1$ 704 may be utilized by the E-TFC selection entity 504 to determine the power level corresponding to the sum of the powers on the first data channel, e.g., the E-DPDCH(s) 624. That is, the first traffic to pilot power ratio $(T/P)_1$ 704 may provide a ratio, e.g., in decibels, which may be applied to set the power level 706 corresponding to the sum of the powers on the first data channel(s) E-DPDCH(s) 624 relative to the power level 702 of the first pilot channel DPCCH 622.

Thus, in block 808, a transmitter in the UE 210 may transmit a primary stream 610, which may include the first data channel E-DPDCH(s) 624 and the first pilot channel DPCCH 622, wherein the ratio between the power level 706 of the first data channel E-DPDCH(s) 624 and the power level 702 of the first pilot channel DPCCH 622 corresponds to the first traffic to pilot power ratio $(T/P)_1$ 704.

In the illustration of FIG. 7, the power level 708 corresponding to the sum of the power on the S-E-DPDCH(s) 620 is configured to be equal to the power level 706 corresponding to the sum of the power on the E-DPDCH(s) 624. That is, the power of the first data channel E-DPDCH(s) 624 and the power of the second data channel S-E-DPDCH(s) 620 may be equal to one another. Thus, in block 810, a transmitter in the UE 210 may transmit a secondary stream 612, including a second data channel S-E-DPDCH(s) 620, such that a ratio between the power level 708 of the second data channel S-E-DPDCH(s) 620 and an unboosted power level 702 of the pilot channel of the secondary stream S-DPCCH 710 corresponds to the same first traffic to pilot power ratio $(T/P)_1$ 704.

Here, in an aspect of the present disclosure, the first stream 610 and the secondary stream 612 may be spatially separated streams of an uplink MIMO transmission, which share the same carrier frequency.

E-TFC Selection, TBS

In a further aspect of the present disclosure, as described above, the primary scheduling grant $(T/P)_1$ may be utilized to determine a packet size (e.g., the primary transport block size) to be utilized on the primary stream 610, and the secondary scheduling grant $(T/P)_2$ may be utilized to determine a packet size (e.g., the secondary transport block size) to be utilized on the secondary stream 612. Here, the determination of the corresponding packet sizes may be accomplished by the E-TFC selection entity 504, for example, by utilizing a suitable lookup table to find a corresponding transport block size and transport format combination in accordance with the signaled traffic to pilot power ratio.

FIG. 8 includes a second flow chart 850 illustrating a process for setting transport block sizes corresponding to the respective scheduling grants in accordance with an aspect of the present disclosure. While the process 850 is illustrated as a separate process, aspects of the present disclosure may include a combination of the illustrated process steps, e.g., utilizing the power setting shown in process 800 in combination with the transport block size setting shown in process 850.

In blocks 852 and 854, in substantially the same fashion as described above in relation to process 800 blocks 802 and 804, the UE 210 may receive a primary scheduling grant and a secondary scheduling grant including a first traffic to pilot power ratio $(T/P)_1$ and a second traffic to pilot power ratio $(T/P)_2$, respectively. In block 856, the E-TFC selection entity 504 may determine a packet size to be utilized in a transmission on the primary stream 610 in accordance with the first traffic to pilot power ratio $(T/P)_1$. As described above, the determination of the packet size may be made by looking up a transport block size that corresponds to the first traffic to pilot power ratio $(T/P)_1$ by utilizing, for example, a lookup table. Of course, any suitable determination of the corresponding transport block size may be utilized in accordance with the present disclosure, such as applying a suitable equation, querying another entity for the transport block size, etc. In block 858, the E-TFC selection entity 504 may similarly determine a packet size to be utilized in a transmission on the secondary stream in accordance with the second traffic to pilot power ratio $(T/P)_2$.

E-TFC Selection, Scaling

In a further aspect of the disclosure, the UE 210 may have a limit on its available transmit power for uplink transmissions. That is, if the received scheduling grants configure the UE 210 to transmit below its maximum output power, the E-TFC selection algorithm may be relatively easy, such that the EUL transport format combination for each MIMO stream can simply be selected based on the serving grant for that stream. However, there is a possibility that the UE 210 is power headroom limited. That is, the power levels for uplink transmissions determined by the E-TFC selection entity 504 may configure the UE 210 to transmit at or above its maximum output power. Here, if the UE 210 is power headroom limited, then in accordance with an aspect of the present disclosure, power and rate scaling may be utilized to accommodate both of the streams.

That is, when the UE 210 is configured to select a MIMO transmission, the primary serving grant $(T/P)_1$ may be scaled by a constant ($\alpha$) such that the UE's transmit power does not exceed the maximum transmit power. As described above, the primary serving grant $(T/P)_1$ may be utilized for selecting the power level of both the primary stream and the secondary stream; thus, scaling the primary serving grant $(T/P)_1$ in accordance with the scaling constant $\alpha$ may accomplish power scaling of both the data channels E-DPDCH and S-E-DPDCH. In turn, the scaling of the primary serving grant $(T/P)_1$ additionally determines the power levels of the E-DPCCH and S-DPCCH, as well as the transport block size on the primary stream.

Further, the secondary serving grant $(T/P)_2$ may be scaled by the same scaling constant $\alpha$. Here, the scaling of the secondary serving grant $(T/P)_2$ may determine the transport block size for the secondary stream. In this way, the E-TFC selection entity 504 can scale the transport block size of the secondary stream by the same amount as the scaling of the transport block size of the primary stream. Thus, with the scaling of the power and transport block size of both streams, a symmetric reduction in accordance with the power headroom limit may be achieved.

Returning now to the process 850 illustrated in FIG. 8, the process of transmitting the streams may include steps for scaling the power and/or transport block size(s) as described above. That is, in block 860, the E-TFC selection entity 504 may scale the amount of power allocated to the primary stream 610 and the secondary stream 612 in accordance with a power headroom limit. That is, in some examples where the scheduled power is greater than or equal to the uplink power headroom limit, the power for each of the primary and secondary streams may be scaled by the scaling constant $\alpha$ to reduce the power to below the power headroom limit.

In block 862, the process may determine a first scaled packet size, to be utilized in a transmission on the primary stream 610 in accordance with the scaled power. That is, in some examples the E-TFC selection entity 504 may scale the transport block size for the primary stream 610 in accordance with the scaled power. For example, the primary serving grant $(T/P)_1$ may be multiplied by the scaling constant $\alpha$, such that the looking up of the transport block size for the primary stream may result in an accordingly smaller transport block size. In another example, the transport block size selected by the E-TFC selection entity 504 may simply be scaled by the scaling constant $\alpha$. Of course, any suitable scaling of the transport block size for the primary stream 610 in accordance with the scaled power may be utilized.

In block 864, the process may determine a second scaled packet size, to be utilized in a transmission on the secondary stream 612. Here, the size of the second scaled packet may be determined in accordance with a value obtained in a lookup table corresponding to the scaled power. That is, the scaling constant $\alpha$ may be utilized to scale the power, as described above; and this scaled power may be utilized to determine a corresponding scaled packet size.

HARQ

Returning now to FIG. 5, in some aspects of the disclosure, a single HARQ entity 506 may handle the MAC functions relating to the HARQ protocol for each of the plurality of streams in a MIMO transmission. For example, the HARQ entity 506 may store the MAC-i PDUs for retransmission if needed. That is, the HARQ entity 506 may include a processing system 2014 including a memory 2005 storing packets as needed for HARQ retransmissions of packets the receiver was unable to decode. Further, the HARQ entity 506 may provide the E-TFC, the retransmission sequence number (RSN), and the power offset to be used by Layer 1 (PHY) 306 for the transport blocks transmitted in a particular TTI. The HARQ entity 506 may execute one HARQ process per E-DCH per TTI for single stream transmissions, and may execute two HARQ processes per E-DCH per TTI for dual stream transmissions.

HARQ information transmitted from the Node B 208, such as ACK/NACK signaling 510 for the primary and secondary transport blocks, may be provided to the HARQ entity 506 over the E-DCH HARQ Indicator Channel (E-HICH). Here, the HARQ information 510 may include the HARQ feedback corresponding to the primary and secondary transport blocks from the Node B 208 to the UE 210. That is, the UE 210 may be allocated two resources on the E-HICH such that the E-HICH can carry HARQ feedback for each of the transport blocks transmitted in a primary and a secondary HARQ process. For example, a secondary E-HICH ACK indicator may be allocated on the channelization code on which the primary E-HICH ACK indicator is allocated. In this example, the UE 210 de-spreads a single SF=128 channelization code as in conventional HSUPA without uplink MIMO, however, the UE 210 monitors another orthogonal signature sequence index in order to process the secondary E-HICH ACK indicator.

Physical Channels

Returning again to FIG. 6, the physical channels 602 may be combined with suitable channelization codes, weighted with suitable gain factors, mapped to a suitable I or Q branch at spreading blocks 604, and grouped by summing blocks 604 into virtual antennas 610, 612. In various aspects of the present disclosure, the primary virtual antenna 610 may be referred to as a primary spatial stream, and the secondary virtual antenna 610 may be referred to as a secondary spatial stream. In the illustrated example, the streams 610 and 612 are fed into a virtual antenna mapping entity 605. Here, the virtual antenna mapping entity 605 is configured to map the first stream 610 and the second stream 612 to spatially separated physical antennas 606 and 608, utilizing a configuration that may be adapted for power balancing between the respective physical antennas 606 and 608.

In the illustrated example, one or more precoding vectors may be expressed utilizing precoding weights, e.g., $w_1$, $w_2$, $w_3$, and $w_4$. Here, the spread complex valued signals from the virtual antennas 610, 612 may be weighted utilizing a primary precoding vector $[w_1, w_2]$ and a secondary precoding vector $[w_3, w_4]$, respectively, as illustrated in FIG. 6. Here, if the UE 210 is configured to transmit a single transport block in a particular TTI, it may utilize the primary precoding vector $[w_1, w_2]$ for weighting the signal; and if the UE 210 is configured to transmit dual transport blocks in a particular TTI, the UE may utilize the primary precoding vector $[w_1, w_2]$ for virtual antenna 1, 610, and the secondary precoding vector $[w_3, w_4]$ for virtual antenna 2, 612. In this way, when the UE 210 transmits a single stream only, it may easily fall back to closed loop beamforming transmit diversity, which may be based on maximum ratio transmission, wherein the single stream is transmitted on the strong eigenmode or singular value. On the other hand, the UE 210 may easily utilize both precoding vectors for MIMO transmissions.

That is, in an aspect of the disclosure, the primary stream including the E-DPDCH(s) 624 may be precoded utilizing the primary precoding vector $[w_1, w_2]$ while the secondary stream including the S-E-DPDCH(s) 620 may be precoded utilizing the secondary precoding vector $[w_3, w_4]$.

Further, allocation of the various physical channels 602 other than the E-DPDCH(s) 624 and the S-E-DPDCH(s) 620 between the primary stream 610 and the secondary stream 612 can determine various characteristics and effectiveness of the MIMO transmission. In accordance with one aspect of the disclosure, a primary pilot channel DPCCH 622 may be precoded utilizing the primary precoding vector, and a secondary pilot channel S-DPCCH 618 may be precoded along with the S-E-DPDCH(s) 620 utilizing the secondary precoding vector, which may be orthogonal to the primary precoding vector. In some aspects of the present disclosure, the S-DPCCH 618 may be transmitted on a different channelization code than that utilized for the DPCCH 622; or the S-DPCCH 618 may be transmitted on the same channelization code than that utilized for the DPCCH 622, by utilizing an orthogonal pilot pattern.

Here, the S-DPCCH 618 may be utilized as a reference, along with the DPCCH 622, to help sound the channel between the two UE transmit antennas 606, 608, and the Node B receiver antennas. By estimating the MIMO channel matrix between the UE 210 and the Node B 208 in accordance with these reference signals, the Node B 208 may derive one or more suitable precoding vectors that may accordingly be sent back to the UE 210. For example, feedback from the Node B 208 that includes uplink precoding information may be 1-2 bits per slot (or any other suitable bit length) carried on the F-DPCH or the E-F-DPCH. Here, the precoding information may be provided alongside, or in the place of, the transmit power control (TPC) bits conventionally carried on these channels.

Further, when the second stream is transmitted, the secondary pilot S-DPCCH 618 may serve as a phase reference for data demodulation of the second stream.

When utilizing precoded pilots 622 and 618, the Node B 208 may require knowledge of the applied precoding vectors in order to compute new precoding vectors. This is because the Node B 208 may need to undo the effect of the applied precoding vectors in order to estimate the raw channel estimates, based upon which the new precoding vectors are derived. However, knowledge at the Node B 208 of the precoding vectors is generally not required for data demodulation, because the pilots, which serve as a reference to their respective data channels, see the same channel as the data, since both the pilot and the data channels (primary and secondary) are precoded utilizing the same precoding vector. Further, applying precoding to the pilot channels 622 and 618 can simplify soft handover. That is, it is relatively difficult for non-serving cells to know the precoding vectors, while the serving cell knows the precoding vectors because it is the node that computes the precoding vectors and sends them to the transmitter.

In a further aspect of the present disclosure, the primary virtual antenna 610, to which the primary precoding vector $[w_1, w_2]$ is applied, may be utilized for transmitting the DPDCH 626, HS-DPCCH 628, and E-DPCCH 614, since the primary precoding vector $[w_1, w_2]$ represents the stronger eigenmode. That is, transmitting these channels utilizing virtual antenna 1 can improve the reliability of reception of these channels. Further, in some aspects of the disclosure, the power of the control channel E-DPCCH 614 may be boosted, and may be utilized as a phase reference for data demodulation of the E-DPDCH(s) 624.

In some examples, an S-E-DPCCH 616 may be provided on the primary virtual antenna 610 as well. That is, in an aspect of the disclosure, control information for decoding the primary transport block carried on the E-DPDCH(s) 624 may be encoded onto the E-DPCCH 614 utilizing a conventional E-DPCCH channel coding scheme, essentially according to legacy EUL specifications for non-MIMO transmissions. Further, control information for the secondary transport block may be encoded onto the S-E-DPCCH 616 utilizing a conventional E-DPCCH channel coding scheme according to the legacy EUL specifications for non-MIMO transmissions. Here, the E-DPCCH 614 and the S-E-DPCCH 616 may both be transmitted over the first virtual antenna 610 and precoded utilizing the primary precoding vector $[w_1, w_2]$. In another example within the scope of the present disclosure, the S-E-DPCCH 616 may be transmitted on the second virtual antenna 612 and precoded utilizing the secondary precoding vector [$w_3$, $w_4$]; however, because the primary precoding vector represents the stronger eigenmode, in order to improve the reliability of the reception of the S-E-DPCCH, its transmission over the primary precoding vector may be preferable.

In accordance with another aspect of the disclosure, as indicated by the dashed lines in FIG. 6, a separate S-E-DPCCH 616 is optional, and some aspects of the present disclosure omit the transmission of an S-E-DPCCH 616 separate from the E-DPCCH 614. That is, the E-DPCCH control information associated with the secondary transport block (S-E-DPCCH) may be provided on the E-DPCCH 614. Here, the number of channel bits carried on the E-DPCCH 614 may be doubled from 30 bits, as utilized in 3GPP Release-7 to 60 bits. To accommodate the additional control information carried on the E-DPCCH 614, certain options may be utilized in accordance with various aspects of the present disclosure. In one example, I/Q multiplexing of the E-DPCCH information for both of the transport blocks may be used to enable transmission of the E-DPCCH information for both transport blocks on the same channelization code. In another example, the channel coding utilized for encoding the E-DPCCH may utilize a reduced spreading factor, i.e., SF=128, to accommodate the doubling of the channel bits. In still another example, a suitable channelization code may be utilized to enable the encoding of the information onto the channel while maintaining the spreading factor SF=256.

Figure 9:
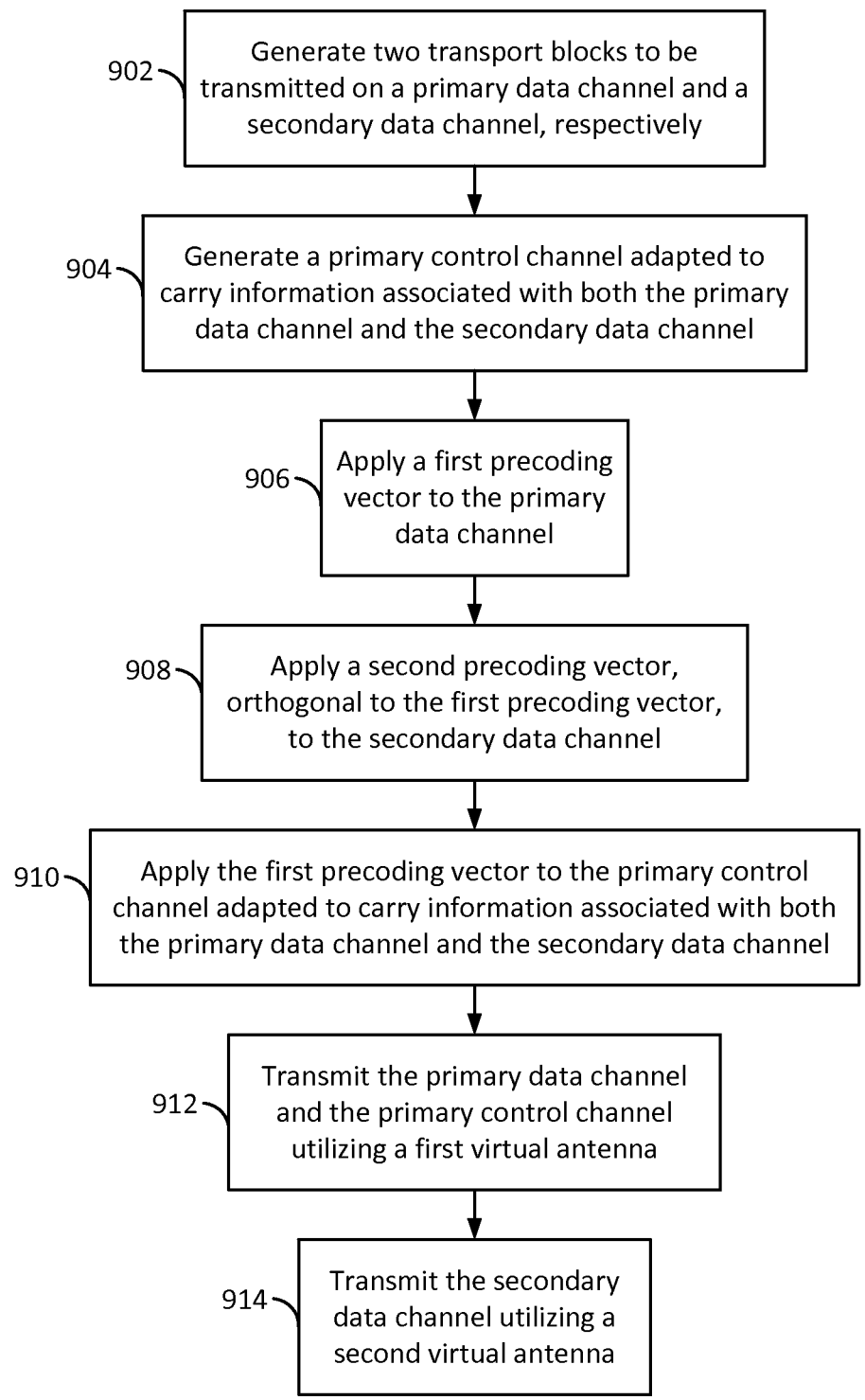
FIG. 9 is a flow chart illustrating a process for generating data information and its associated control information and providing this information on respective physical channels.

FIG. 9 is a flow chart illustrating the generation of data information and its associated control information in accordance with some aspects of the present disclosure. In block 902, as illustrated in FIG. 4, the process may generate two transport blocks 402 and 452 to be transmitted on a primary data channel, e.g., the E-DPDCH(s) 624, and a secondary data channel, e.g., the S-E-DPDCH(s) 620, respectively, during a particular TTI. In block 904, the process may generate a primary control channel adapted to carry information associated with both the primary data channel and the secondary data channel. For example, the UE 210 may include a processing system 2014 configured to generate an E-DPCCH 614 adapted to carry control information for both the E-DPDCH(s) 624 and the S-E-DPDCH(s) 620.

In one example, the generation of the primary control channel E-DPCCH 614 in block 904 may include encoding 10 bits (or any suitable number of control bits) of control information for each data channel, utilizing two independent channel coding schemes. For example, legacy E-DPCCH channel coding as utilized in Release-7 3GPP HSUPA specifications may be utilized, for control information corresponding to the E-DPDCH(s) 624 and independently, for control information corresponding to the S-E-DPDCH(s) 620. As described above, to accommodate the additional information to be carried on the primary control channel E-DPCCH 614, the spreading factor may be reduced to SF=128, I/O multiplexing may be utilized, or a suitable channelization code may be chosen to enable an encoding of the additional information utilizing the conventional spreading factor SF=256.

In block 906, the process may apply the first precoding vector to the primary data channel. For example, as illustrated in FIG. 6, the primary data channel, i.e., E-DPDCH(s) 624, is sent into the first virtual antenna 610, and is precoded utilizing the primary precoding vector [$w_1$, $w_2$]. In block 908, the process may apply the secondary precoding vector [$w_3$, $w_4$], which is adapted to be orthogonal to the first precoding vector, to the secondary data channel. For example, the secondary data channel, i.e., S-E-DPDCH(s) 620, is sent into the second virtual antenna 612, and is precoded utilizing the secondary precoding vector [$w_3$, $w_4$]. Here, the secondary precoding vector [$w_3$, $w_4$] may be adapted to be orthogonal to the primary precoding vector [$w_1$, $w_2$].

In block 910, the process may apply the first precoding vector to the primary control channel, which is adapted to carry the information associated with both the primary data channel and the secondary data channel. That is, in an aspect of the present disclosure, the second transport block, which is sent over the second virtual antenna 612, is precoded utilizing a different precoding vector than the one utilized for precoding the control information associated with the second transport block. Here, the control information for both the transport blocks may be transmitted utilizing the primary precoding vector, since the primary precoding vector provides the stronger eigenmode of the MIMO channel.

In block 912, the process may transmit the primary data channel and the primary control channel utilizing the first virtual antenna 610; and in block 914, the process may transmit the secondary data channel utilizing the second virtual antenna 612.

Uplink Control Channel Boosting

Returning now to FIG. 5, as discussed above, when rank=2 is selected indicating a MIMO transmission, the HARQ entity 506 may provide a power offset for each of the primary and secondary transport blocks. That is, when transmitting the dual streams, the power utilized for the data and control channels may be boosted in accordance with a suitable offset.

For example, the range of power offsets for the secondary stream on the secondary virtual antenna 612 might be expected to be similar to the range of power offsets for the primary stream on the primary virtual antenna 610. As a result, in some aspects of the present disclosure, existing methods defined in the 3GPP specifications for HSUPA for computing a power offset for the E-DPDCH(s) 624 can be re-used to compute the power offset for the S-E-DPDCH(s) 620. Alternatively, in another aspect of the disclosure, rather than re-using the same computational method for each virtual antenna the same reference gain factor may be applied to both the primary data channel E-DPDCH(s) 624 and the secondary data channel S-E-DPDCH(s) 620. Here, there may be no need to signal a separate set of reference gain factors for the secondary stream on the secondary virtual antenna 612. In this way, the power of the secondary data channel S-E-DPDCH(s) 620 may take a fixed offset relative to the power of the primary data channel E-DPDCH(s) 624. Here, the offset can be zero, i.e., setting the same power for the respective data channels, or nonzero, indicating different power levels for the respective data channels. Selection of the same power level for each of the primary data channel E-DPDCH(s) 624 and the secondary data channel S-E-DPDCH(s) 620 can ensure that the power across the two streams is equally distributed.

As discussed above, uplink MIMO in accordance with various aspects of the present disclosure may introduce two new control channels: a secondary control channel (the S-DPCCH 618) and a secondary enhanced control channel (the S-E-DPCCH 616). Among these channels, in an aspect of the disclosure the secondary control channel S-DPCCH 618 may be provided on the secondary virtual antenna 612, as discussed above. Here, the secondary control channel S-DPCCH 618 can be utilized in coordination with the primary control channel DPCCH 622 for channel estimation of the MIMO channel at the receiver, e.g., the Node B 208.

In 3GPP Release-7 specifications, with the introduction of HSUPA, boosting of the enhanced control channel E-DPCCH was introduced to support the high data rates on the uplink. That is, in HSUPA, the pilot set point, that is, the Ecp/Nt could be varied by as much as 21.4 dB in accordance with variations in the data rate. The boosted power level of the E-DPCCH serves as an enhanced pilot reference when high data rates are used.

In a further aspect of the present disclosure, when rank=2 is selected such that the secondary stream is transmitted over the secondary virtual antenna 612, the secondary control channel S-DPCCH 618 may serve as a phase reference for data demodulation of the S-E-DPDCH(s) 620. Because the secondary control channel S-DPCCH 618 may serve as the phase reference, as the data rate or the transport block size of the secondary transport block carried on the secondary data channel S-E-DPDCH(s) 620 increases, the power for the secondary control channel S-DPCCH 618 may accordingly be boosted. That is, in a similar fashion to the boosting of the enhanced control channel E-DPCCH 614 as utilized in Release-7 HSUPA, known to those skilled in the art, in some aspects of the present disclosure boosting of the secondary control channel S-DPCCH 618 may be utilized to support high data rate transmission on the secondary stream utilizing the secondary virtual antenna 612.

More specifically, one aspect of the disclosure boosts the S-DPCCH based on the same parameters utilized for the boosting of the E-DPCCH. That is, an offset value $\beta_{s-c}$ for boosting the power for the secondary control channel S-DPCCH 618 in a particular TTI may correspond to a packet size of a packet transmitted on the enhanced primary data channel E-DPDCH(s) during that TTI. Here, the offset for boosting the power of the secondary control channel S-DPCCH may correspond to the packet size of the primary transport block sent over the E-DPDCH(s) 624.

Such a relationship between the boosting of a pilot on the secondary virtual antenna and a packet size sent on the primary virtual antenna may be counter-intuitive, since it may seem more natural to boost the secondary control channel S-DPCCH 618 in accordance with the packet size of the secondary transport block sent over the secondary data channel S-E-DPDCH(s) 620. However, in accordance with an aspect of the present disclosure, to simplify the signaling the boost may be determined with a packet size on the other stream.

Here, the term "offset" may correspond to a scaling factor, which may be multiplied with an unboosted value of the power. Here, in a decibel scale, the offset may be a decibel value to be added to the unboosted value of the power in dBm.

In one aspect of the present disclosure, the offset for the S-DPCCH may be in accordance with the equation:

$$\beta_{s-c,i,uq} = \beta_c \cdot \sqrt{\max\left(A_{ec}^2, \frac{\sum_{k=1}^{k_{max,i}} \left(\frac{\beta_{ed,i,k}}{\beta_c}\right)^2}{10^{\frac{\Delta_{T2TP}}{10}}} - 1\right)},$$

wherein:

$\beta_{s-c,i,uq}$ is the unquantized S-DPCCH power offset, in dB, for the i$^{th}$ E-TFC;

$\beta_c$ is an additional gain factor for the DPCCH for a particular TFC, as described in 3GPP TS 25.214 v10.3;

$A_{ec}$ is a quantized amplitude ratio defined in 3GPP TS 25.213 v10.0 subclause 4.2.1.3;

$k_{max,i}$ is the number of physical channels used for the i$^{th}$ E-TFC;

$\beta_{ed,i,k}$ is an E-DPDCH gain factor for the i$^{th}$ E-TFC on the k$^{th}$ physical channel; and $\Delta_{T2TP}$ is a traffic to total pilot power offset configured by higher layers, defined in 3GPP TS 25.213 v10.0 subclause 4.2.1.3.

In a further aspect of the present disclosure, when rank=1 is selected such that a single stream is transmitted, the S-DPCCH 618 may be transmitted utilizing a single stream offset $\Delta_{sc}$ relative to the DPCCH 622. In this manner, if the UE 210 were configured for single stream transmissions, as it would be for uplink CLTD transmissions, or if the UE 210 were primarily transmitting a single stream, the additional pilot overhead due to the S-DPCCH 618 can be reduced.

Figure 10:
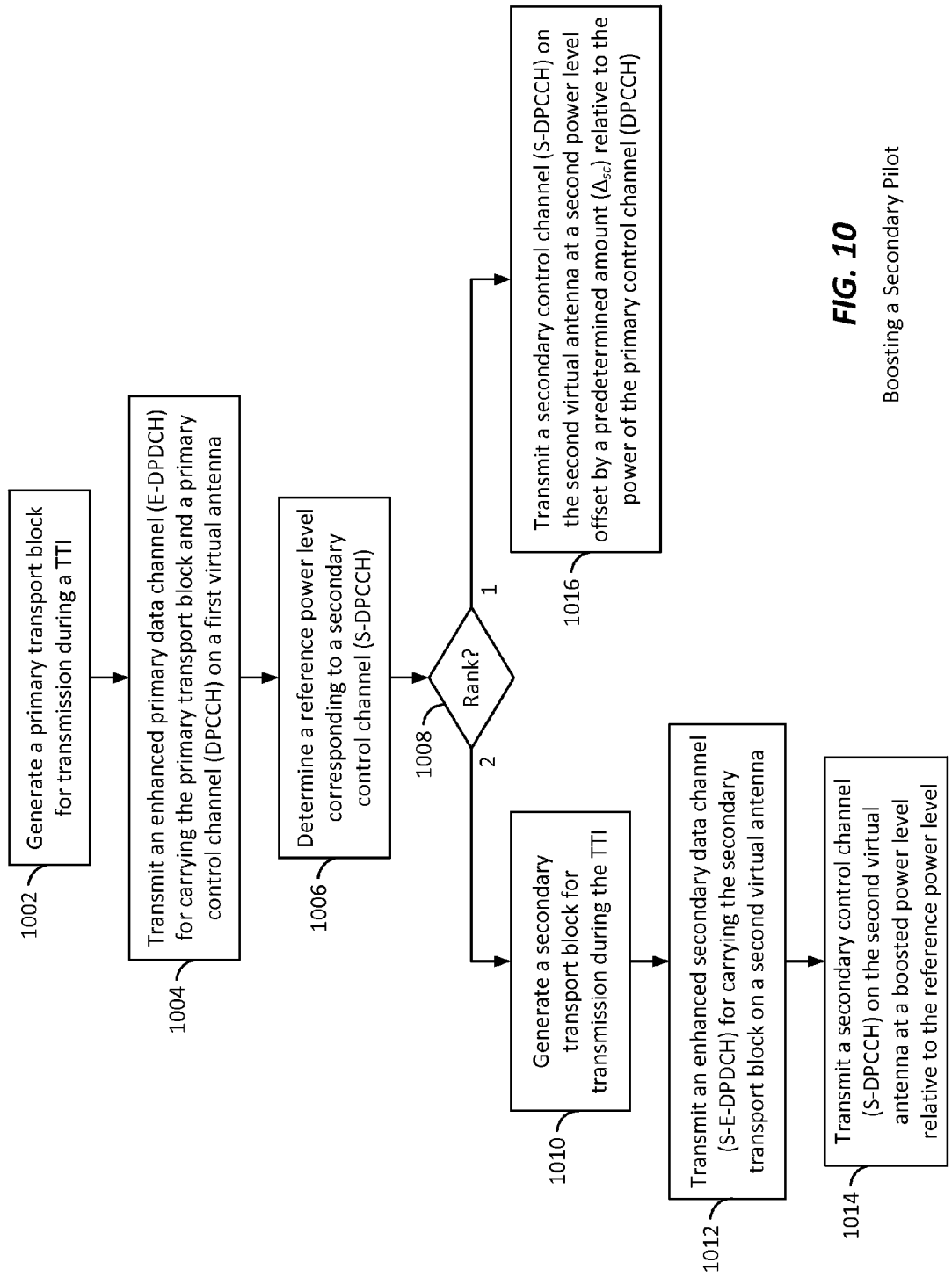
FIG. 10 is a flow chart illustrating a process for boosting a power of a secondary pilot channel.

FIG. 10 is a flow chart illustrating an exemplary process for wireless communication by a UE 210 in accordance with an aspect of the disclosure utilizing boosting of the secondary pilot channel.

In block 1002, the process generates a primary transport block 402 for transmission during a particular TTI. In block 1004, the process transmits an enhanced primary data channel E-DPDCH 624 for carrying the primary transport block 402, and transmits a primary control channel DPCCH 622, each on the first virtual antenna 610. In block 1006, the process determines a reference power level corresponding to the secondary control channel S-DPCCH 618. In some examples, the reference power level may be the same power level as the power level 702 of the primary control channel DPCCH 622. In some other examples, the reference power level may be offset relative to the power level 702 of the primary control channel.

In block 1008, the process determines the rank of the transmission. Here, the rank may be determined in accordance with the grant received on the E-AGCH, as described above. If the rank is rank=2, then in block 1010, the process generates a secondary transport block 452 for transmission during the same TTI as that of the primary transport block 402. In block 1012, the process transmits an enhanced secondary data channel S-E-DPDCH 620 for carrying the secondary transport block 452 on the second virtual antenna 612. Here, the enhanced secondary data channel S-E-DPDCH 620 carries the secondary transport block 452 during the same TTI as that for the transmission of the primary transport block 402 on the first virtual antenna 610. In block 1014, the process transmits the secondary control channel S-DPCCH on the second virtual antenna 612 at a boosted power level relative to the reference power level determined in block 1006. In some aspects of the disclosure, the difference between the reference power level and the boosted power level may be determined in accordance with a size of the primary transport block 402 transmitted on the enhanced primary data channel E-DPDCH 624. For example, the boosted power level may be determined by determining the product of the reference power level and the offset value $\beta_{s-c}$ as described above.

On the other hand, if the process determines in block 1008 that the rank is rank=1, then in block 1016 the process may transmit the secondary control channel S-DPCCH 618 on the second virtual antenna 612 at a second power level, which is offset by a certain amount (e.g., a predetermined amount) such as the single stream offset $\Delta_{sc}$ relative to the power of the primary control channel DPCCH 622. Here, because the rank is rank=1, the process may cease transmitting the enhanced secondary data channel S-E-DPDECH 620. Here, the secondary control channel S-DPCCH 618 may be easily determined and may be available for single stream transmissions such as uplink closed loop transmit diversity. In this manner, with a suitable selection of the single stream offset $\Delta_{sc}$, the additional pilot overhead due to the secondary control channel S-DPCCH 618 can be reduced.

Uplink Inner Loop Power Control

In HSUPA, active uplink power control is utilized to improve reception of transmissions from mobile stations at the Node B. That is, the nature of the WCDMA multiple access air interface, wherein multiple UEs simultaneously operate within the same frequency separated only by their spreading codes, can be highly susceptible to interference problems. For example, a single UE transmitting at a very high power can block the Node B from receiving transmissions from other UEs.

To address this issue, conventional HSUPA systems generally implement a fast closed-loop power control procedure, typically referred to as inner loop power control. With inner loop power control, the Node B 208 estimates the Signal-to-Interference Ratio (SIR) of received uplink transmissions from a particular UE 210 and compares the estimated SIR to a target SIR. Based on this comparison with the target SIR, the Node B 208 can transmit feedback to the UE 210 instructing the UE 210 to increase or decrease its transmission power. The transmissions occur once per slot, resulting in 1500 transmissions per second. For additional control, as described further below, the target SIR can be varied by utilizing outer loop power control based on whether transmissions meet a Block Error Rate (BLER) target.

With uplink MIMO in accordance with an aspect of the present disclosure, uplink inner loop power control may be improved by taking into account additional considerations. For example, due to the nonlinear processing of the MIMO receiver at the Node B 208, it may be desired that the power per code remains substantially constant during the entire TTI. That is, variation in the power on the EUL traffic channels (i.e., the E-DPDCH(s) 624 and the S-E-DPDCH(s) 620) across a TTI can affect scheduling decisions at the Node B 208 in terms of the serving grants, as well as data demodulation performance. However, since a TTI lasts three slots, adjustment of the power control every slot may not be desired. Thus, in accordance with some aspects of the present disclosure, when uplink MIMO is configured, the power control may be performed once every three slots, resulting in 500 transmissions per second (500 Hz) while still enabling a constant transmit power on the traffic channels during the TTI on both of the streams.

On the other hand, additional channels transmitted on the uplink, such as the DPDCH 626, E-DPCCH 614, and HS-DPCCH 628 can benefit from the faster power control, i.e., with power control transmissions once per slot at 1500 Hz. Thus, in accordance with a further aspect of the present disclosure, the power control of the pilot channels and that the traffic channels may be de-coupled. That is, a two-dimensional power control loop may be implemented wherein the available traffic power and pilot powers are independently power controlled. In this manner, the pilot powers may be adjusted to ensure that overhead and DCH performance is maintained, while the traffic power (E-DPDCH(s) 624 and S-E-DPDCH(s) 620) may be adjusted separately, all the while ensuring that the E-DPCCH 614 and S-DPCCH 618 are maintained at a fixed power offset below the traffic powers, since the E-DPCCH 614 and S-DPCCH 618 serve as phase references to the traffic power.

A further consideration regarding power control when uplink MIMO is configured relates to whether the two streams should be independently controlled by way of dual inner loop power control, or whether the power control for each of the streams should be linked by utilizing a single inner loop power control. Those of ordinary skill in the art familiar with MIMO theory will understand that, assuming a 2×2 Rayleigh fading MIMO channel matrix, the weaker singular value has a much higher chance of a deep fade, when compared with the stronger singular value. Here, the singular value corresponds to the power of the signal component when the SINR measurements at the receiver are performed on the precoded channel (i.e., the virtual channel). In this case, substantial transmit power may be wasted on the secondary pilot S-DPCCH 618 if an attempt is made to invert the weaker eigenmode.

Therefore, assuming that each of the E-DPCCH 614 and the S-DPCCH 618 are boosted as described above, in order to ensure a high enough phase reference for the E-DPDCH(s) 624 and the S-E-DPDCH(s) 620, then a single inner loop power control based on a measurement of the received power of the primary control channel DPCCH 622 may be sufficient.

That is, in accordance with an aspect of the present disclosure, single inner loop power control may be utilized at the Node B 208 for controlling the power corresponding to both of the two transport blocks when the UE 210 is configured for MIMO transmissions. Here, the power control may be based on an SINR measurement corresponding to the primary control channel DPCCH 622, which is transmitted on the primary stream 610.

Figure 11:
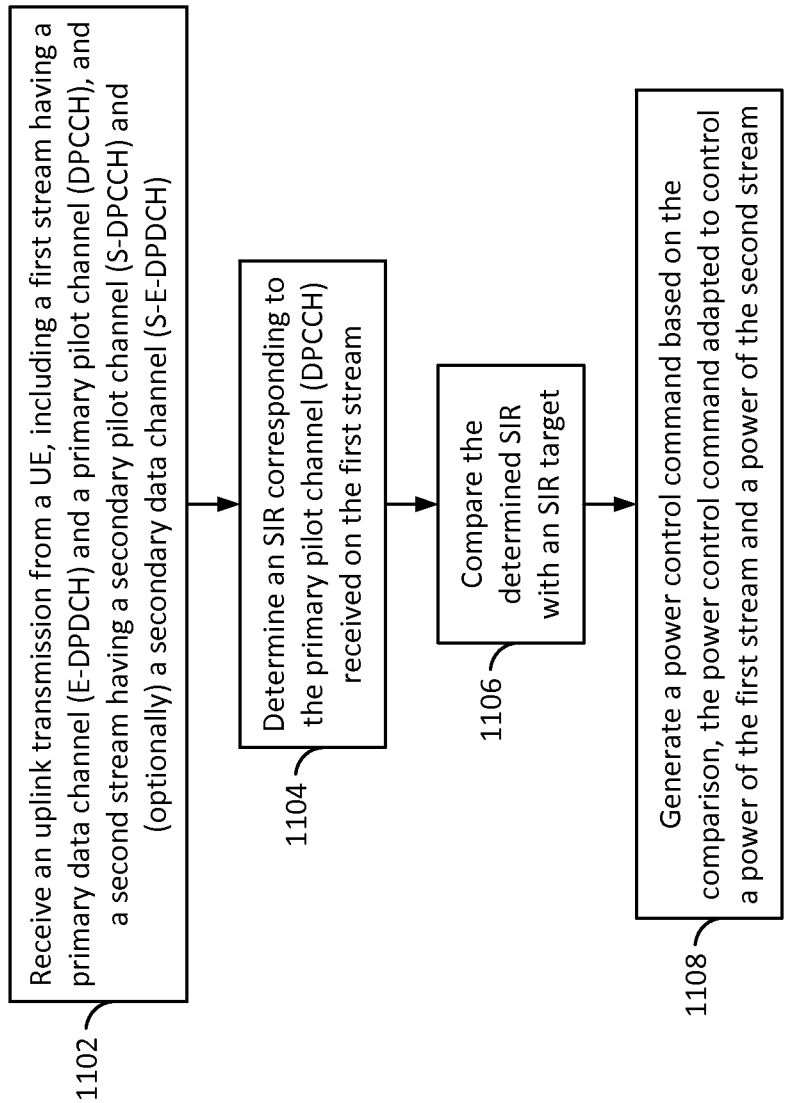
FIG. 11 is a flow chart illustrating a process operable at a network node for inner loop power control of uplink MIMO transmissions.

For example, FIG. 11 illustrates an exemplary process for a network node, such as Node B 208 or potentially an RNC 206, to implement single inner loop power control for an uplink MIMO stream in accordance with some aspects of the present disclosure. Here, the process 1100 may be implemented by a processing system 2014, e.g., configured for executing instructions stored in a computer-readable medium 106. In another example, the process 1100 may be implemented by the Node B 2110 illustrated in FIG. 21. Of course, any suitable network node capable of implementing the described functions may be utilized within the scope of the present disclosure.

In the process 1100, in block 1102, the Node B 208 may receive an uplink transmission from a UE 208, the transmission including a first stream 610 having a primary data channel E-DPDCH 624 and a primary pilot channel DPCCH 622, and second stream 612 having a secondary pilot channel S-DPCCH 618 and optionally a secondary data channel S-E-DPDCH 620. That is, the received uplink transmission may be a rank=1 transmission that does not include the secondary data channel S-E-DPDCH 620 or a rank=2 transmission including the secondary data channel S-E-DPDCH 620. In block 1104, the Node B 208 may determine an SIR corresponding to the primary pilot channel DPCCH 622, received on the first stream. In block 1106, the Node B 208 may compare the SIR determined in block 1104 with an SIR target. For example, the SIR target may be a predetermined value stored in a memory. Further, the SIR target may be a variable controllable by the outer loop power control module or procedure.

In block 1108, the Node B 208 may generate a suitable power control command based on the comparison made in block 1106. Here, the generated power control command may be adapted to control a power of the first stream and a power of the second stream. For example, the power control command may directly correspond to the primary pilot channel DPCCH 622, and may directly instruct a change in power of the primary stream. However, with a knowledge that the power of the second stream is linked to the power of the primary stream, e.g., by being related by a fixed offset, the power control command may control a respective power of both streams.

Here, a power level of the primary stream may include one or more of a power level of the dedicated physical control channel DPCCH 622, a power level of the enhanced dedicated physical control channel E-DPCCH 624, a power level of the enhanced dedicated physical data channel E-DPDCH 624, or a sum of any or all of these channels. Similarly, a power level of the secondary stream may include one or more of a power level of the secondary dedicated physical control channel S-DPCCH 618, a power level of the secondary enhanced dedicated physical data channel S-E-DPDCH 620, or a sum of any or all of these channels.

Figure 12:
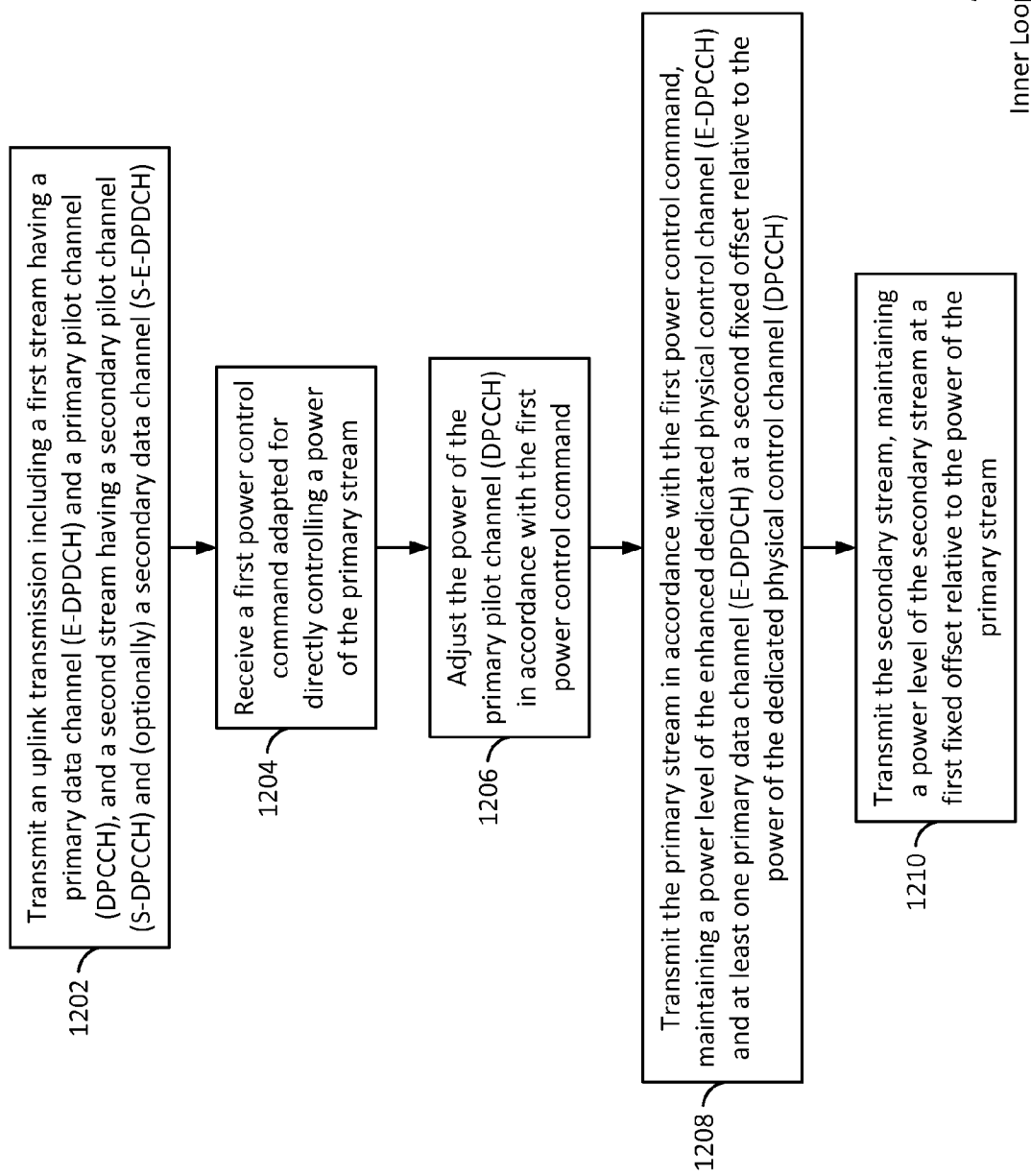
FIG. 12 is a flow chart illustrating a process operable at a user equipment for inner loop power control of uplink MIMO transmissions.

FIG. 12 illustrates a process 1200 for inner loop power control in accordance with some aspects of the present disclosure that may be implemented by a UE 210. In some examples, the process 1200 may be implemented by a processing system 2014, e.g., configured for executing instructions stored in a computer-readable medium 106.

Figure 21:
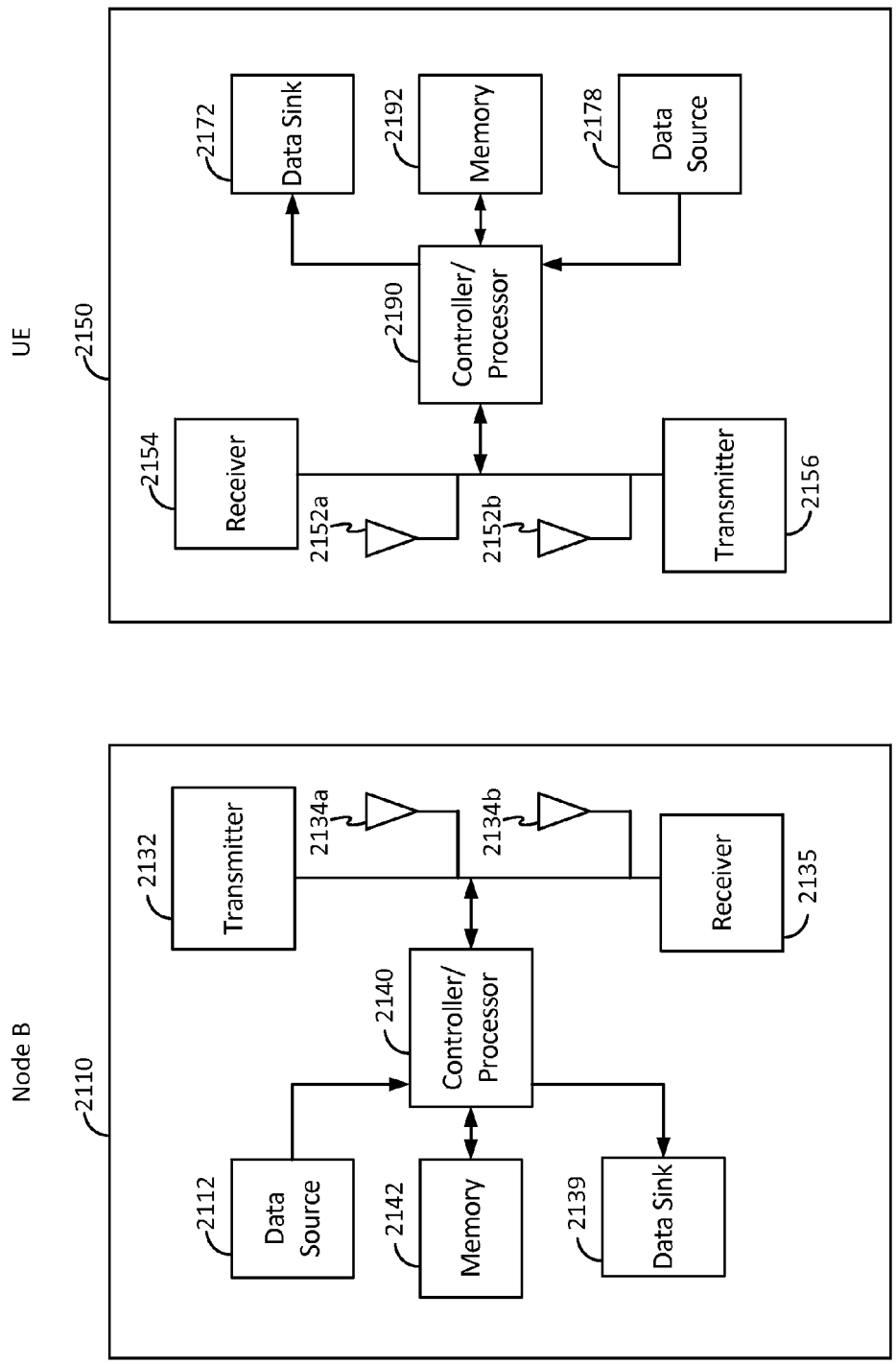
FIG. 21 is a block diagram conceptually illustrating an example of a Node B in communication with a UE in a telecommunications system.

In another example, the process 1200 may be implemented by the UE 2150 illustrated in FIG. 21. Of course, any suitable mobile or stationary user equipment 210 capable of implementing the described functions may be utilized within the scope of the present disclosure.

In block 1202, the UE 210 may transmit an uplink transmission including a primary stream 610 and a secondary stream 612. Here, the primary stream 610 may include a primary data channel E-DPDCH 624 and a primary pilot channel DPCCH 622. Further, the secondary stream 612 may include a secondary pilot channel S-DPCCH 618 and optionally a secondary data channel S-E-DPDCH 620. That is, the transmitted uplink transmission may be a rank=1 transmission that does not include the secondary data channel S-E-DPDCH 620 or a rank=2 transmission including the secondary data channel S-E-DPDCH 620.

In block 1204, the UE 210 may receive a first power control command. In some examples, as described above, the power control command may be transmitted once each transmission time interval. Here, the first power control command may be adapted for directly controlling a power of the primary stream 610. Based on the received first power control command, in block 1206, the UE 210 may accordingly adjust the power of the primary stream, for example, by adjusting the power of the primary pilot channel DPCCH 622. Thus, in block 1208 the UE 210 may transmit the primary stream 610 in accordance with the first power control command. That is, the UE 210 may utilize the adjusted primary pilot channel DPCCH 622 power determined in block 1206, while maintaining a power level of the enhanced dedicated physical control channel E-DPCCH 614 and at least one primary data channel E-DPDCH 624 at a second fixed offset relative to the power of the dedicated physical control channel DPCCH 622.

In block 1210, the UE 210 may transmit the secondary stream 612, maintaining a power level of the secondary stream 612 at a first fixed offset relative to the power of the primary stream 610. In this way, the single first power control command received in block 1204 may control the power of the primary stream 610 and the secondary stream 612.

Figure 13:
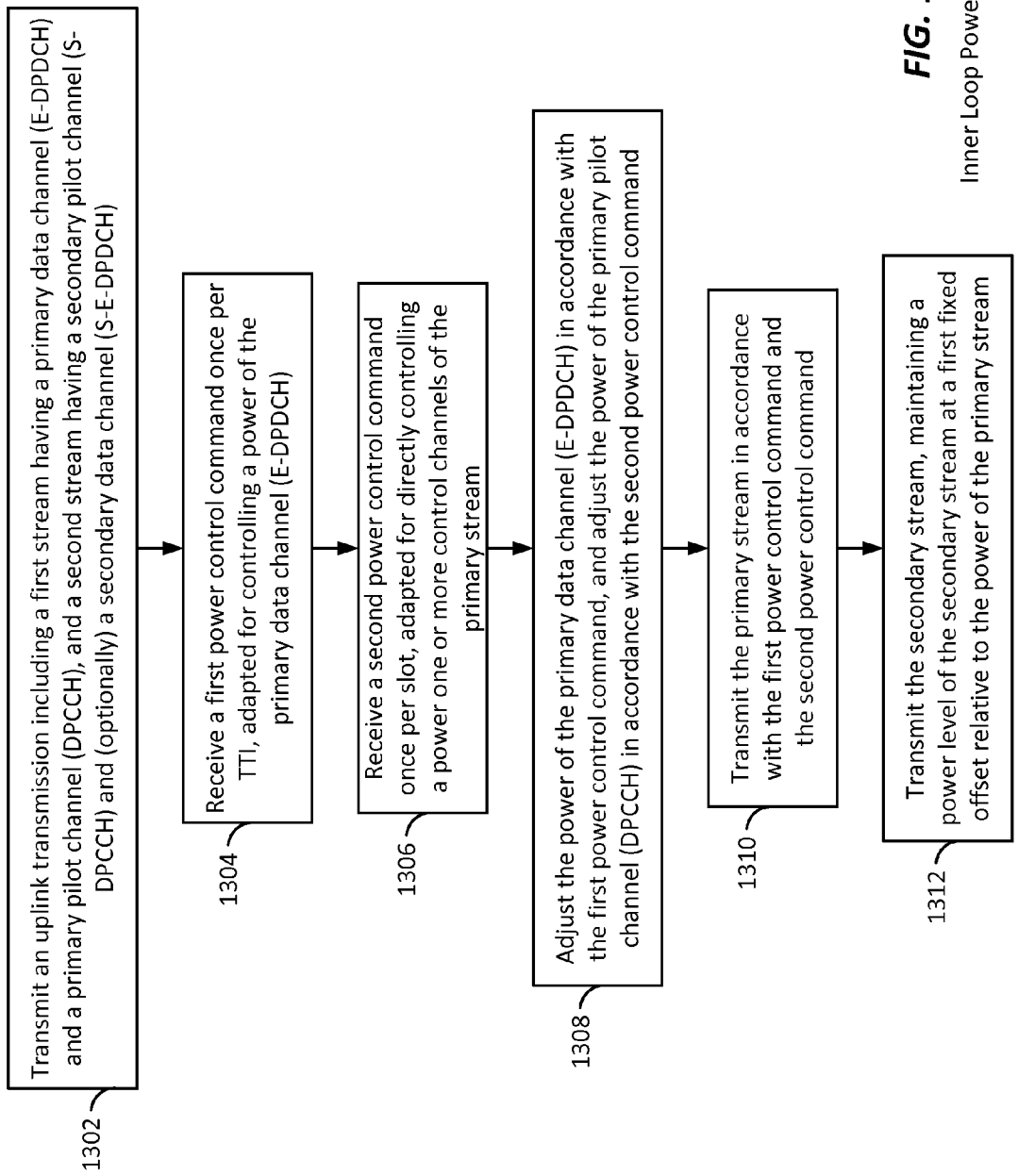
FIG. 13 is a flow chart illustrating another process operable at a user equipment for inner loop power control of uplink MIMO transmissions.

FIG. 13 illustrates another exemplary procedure similar to that one illustrated in FIG. 12, for implementation by a UE 210 in accordance with some aspects of the present disclosure. In block 1302, the UE 210 may transmit an uplink transmission including a primary stream 610 and a secondary stream 612. Here, the primary stream 610 may include a primary data channel E-DPDCH 624 and a primary pilot channel DPCCH 622. Further, the secondary stream 612 may include a secondary pilot channel S-DPCCH 618 and optionally a secondary data channel S-E-DPDCH 620. That is, the transmitted uplink transmission may be a rank=1 transmission that does not include the secondary data channel S-E-DPDCH 620 or a rank=2 transmission including the secondary data channel S-E-DPDCH 620.

In block 1304, the UE 210 may receive a first power control command once each TTI, the first power control command being adapted for controlling a power of the primary data channel E-DPDCH 624. In block 1306, the UE 210 may receive a second power control command once per slot, the second power control command adapted for controlling a power of one or more control channels carried on the primary stream 610. In block 1308, the process may adjust the power of the primary data channel E-DPDCH 624 in accordance with the first power control command, and adjust the power of the primary pilot channel DPCCH 622 in accordance with the second power control command. Thus, in block 1310, the UE 210 may transmit the primary stream 610 in accordance with the first power control command and the second power control command, as adjusted in block 1308. In block 1312, the UE 210 may transmit the secondary stream 612, maintaining a power level of the secondary stream 612 at a first fixed offset relative to the power of the primary stream 610.

Outer Loop Power Control

In addition to the inner loop power control, an HSUPA network may additionally utilize outer loop power control. As briefly described above, outer loop power control may be utilized to adjust the SIR target set point in the Node B 208 in accordance with the needs of the individual radio link. Adjustment of the SIR target by utilizing the outer loop power control may aim for transmissions to meet a certain block error rate (BLER) target. In one example, outer loop power control can be implemented by having the Node B 208 tag received uplink user data with a frame reliability indicator, such as the result of a CRC check corresponding to the user data, before sending the frame to the RNC 206. Here, if the RNC 206 determines that the transmission quality of uplink transmissions from the UE 210 is changing, the RNC 206 may command the Node B 208 to correspondingly alter its SIR target.

In an example utilizing single inner loop power control for uplink MIMO transmissions as described above, adjustment of the SIR target as a part of the outer loop power control presents additional considerations. For example, in some aspects of the disclosure, adjustment of the SIR target may be based on BLER performance and/or HARQ failure performance of the primary stream 610. This would appear to be a natural choice, given that the single inner loop power control as described above may be based on the DPCCH 622, which may also be carried on the primary stream 610. Further, adjustment of the SIR target based on BLER performance and/or HARQ failure performance of the primary stream 610 may achieve a BLER target on the secondary stream 612 by maintaining an outer loop on the rate control of the second stream 612.

In another aspect of the disclosure, adjustment of the SIR target may be based on BLER performance and/or HARQ failure performance of the secondary stream 612. Here, this approach may suffer from an issue in which the SIR target is continuously increased to overcome a deep fade associated with the weaker singular value of the MIMO channel, and could result in a situation wherein the BLER on the first stream is much lower than the BLER target, while the BLER target on the second stream may not even be achieved.

In still another aspect of the disclosure, adjustment of the SIR target may be based on BLER performance and/or HARQ failure performance of both the primary stream 610 and the secondary stream 612. For example, the SIR target may be adjusted in accordance with a suitable weighted function of the BLER performance and/or the HARQ failure performance of each MIMO stream. With appropriate weighting in such a function, the SIR target might be biased in favor of the primary stream while still paying some attention to the performance of the secondary stream, or vice-versa. This example may be helpful in a situation in which the outer loop on rate control in the Node B scheduler finds it challenging to meet a certain BLER target or HARQ failure target on one or the other stream.

Figure 14:
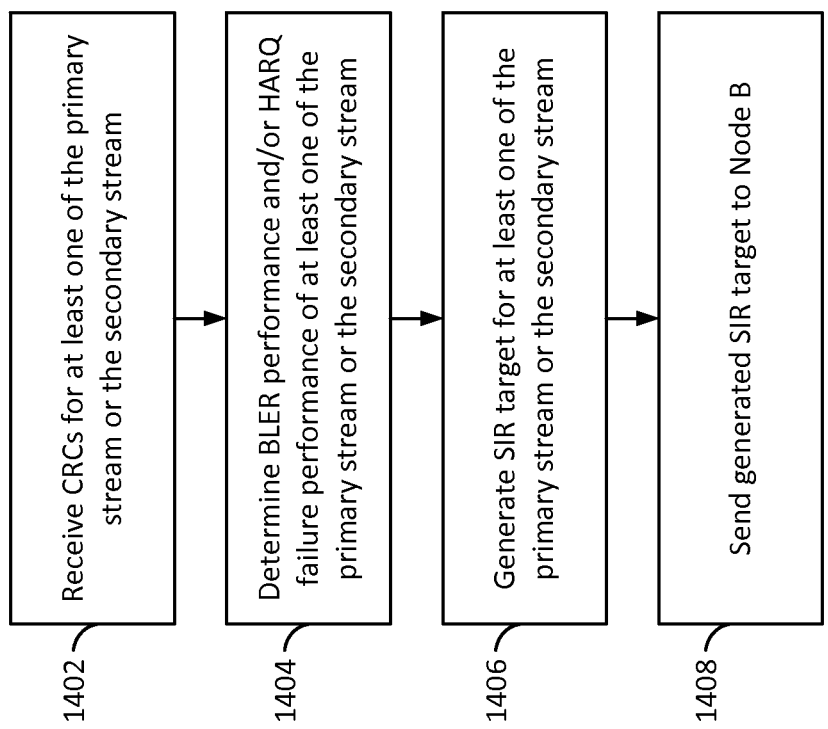
FIG. 14 is a flow chart illustrating a process operable at a network node for outer loop power control of uplink MIMO transmissions.

Particular examples in which the SIR target is adjusted based at least in part on the BLER performance and/or the HARQ failure performance of both the primary stream and the secondary stream may be implemented in accordance with the process illustrated by the flow chart of FIG. 14. Here, the process may be implemented by an RNC 206, or at any other suitable network node coupled to the Node B 208. Performance of the process at an RNC 206 or other network node other than the Node B 208 can improve performance in the case of a soft handover between respective Node Bs. However, other examples in accordance with aspects of the present disclosure may implement the illustrated process at the Node B 208.

As described above, when the Node B 208 receives uplink transmissions it may calculate a CRC and compare it to a CRC field in the data block. Thus, in block 1402, the RNC 206 may receive the results of the CRC comparisons for each stream of the uplink MIMO transmission, e.g., over a backhaul connection between the Node B 206 and the RNC 206. In block 1404, in accordance with the CRC results, the process may determine the BLER performance and/or the HARQ failure performance of at least one of the primary stream 610 or the secondary stream 612. In some examples, as described above, the metric, e.g., the BLER performance and/or the HARQ failure performance may in fact be determined for both streams. Thus, in block 1406, the process may generate a new SIR target in accordance with the BLER performance and/or the HARQ failure performance determined in block 1004, for at least one of the primary stream or the secondary stream, and in block 1408, the process may send the generated SIR target to the Node B 208. In this way, by virtue of the utilization of a single inner loop power control for both streams, the generation of a single SIR target can be sufficient for control of the power on both of the streams.

Uplink Scheduler

Yet another consideration with an uplink MIMO system in accordance with an aspect of the present disclosure relates to the design of the uplink scheduler. While an uplink scheduler has several aspects, one particular aspect of the MIMO uplink scheduler decides between scheduling single stream or dual stream uplink transmissions. Here, one metric that might be utilized in making a determination of whether to schedule the single stream or the dual stream is the throughput that can be achieved using a single stream, and the sum throughput that can be achieved using dual streams.

That is, if the UE 210 is transmitting a single stream, as described above, to reduce the overhead for the secondary pilot channel S-DPCCH 618, its power may be offset with respect to the power of the primary pilot channel DPCCH 622, by the single stream offset $\Delta_{sc}$. However, in an aspect of the present disclosure as described above, when data is transmitted on a second stream, the power of the secondary pilot channel S-DPCCH 618 may be boosted. Thus, to evaluate the dual stream throughput that might be achieved if the UE 210 is to transmit dual streams, in accordance with an aspect of the present disclosure the Node B 208 may take into account the boosting of the secondary pilot channel S-DPCCH 618 when the UE 210 is configured to transmit two streams. That is, the scheduler at the Node B 208 may estimate the traffic signal to noise ratio that would have resulted from a different transmit pilot power level than the one actually sent.

A further consideration for a scheduler that must deal with potential switching between single stream transmissions and dual stream transmissions relates to HARQ retransmissions. For example, HARQ retransmissions might not occur instantaneously after the reception of a negative HARQ acknowledgment message. Further, the HARQ retransmission may fail as well and multiple HARQ retransmissions may be transmitted. Here, the HARQ retransmission period may take some time, and during the HARQ retransmission period a decision may be taken to change between dual stream transmissions and single stream transmissions. In this case, in accordance with various aspects of the present disclosure the scheduler may consider certain factors to determine over which stream to transmit a HARQ retransmission.

In particular, there are three main scenarios that the scheduler may consider. In one scenario, if the UE 210 transmits a packet on a single stream, that packet may fail and HARQ retransmissions of the failed packet may occur one or more times. During the HARQ retransmission period, the UE 210 may receive a command to switch to dual stream transmissions, such as MIMO transmissions utilizing dual transport blocks. In another scenario, if the UE 210 transmits packets on dual streams, the packet transmitted on the weak, secondary stream 612 may fail and HARQ retransmissions of the failed packet may occur one or more times. During the HARQ retransmission period, the UE 210 may receive a command to switch to single stream transmissions, such as CLTD transmissions utilizing a single transport block. In yet another scenario, if the UE 210 transmits packets on dual streams, the packet transmitted on the stronger, primary stream 610 may fail and HARQ retransmissions of the failed packet may occur one or more times. During the HARQ retransmission period, the UE 210 may receive a command to switch to single stream transmissions, such as CLTD transmissions utilizing a single transport block. In each of these cases, the scheduler should consider whether to actually switch between single and dual streams, and if so, on which stream to send the HARQ retransmissions. Each of these scenarios is discussed in turn below.

Figure 15:
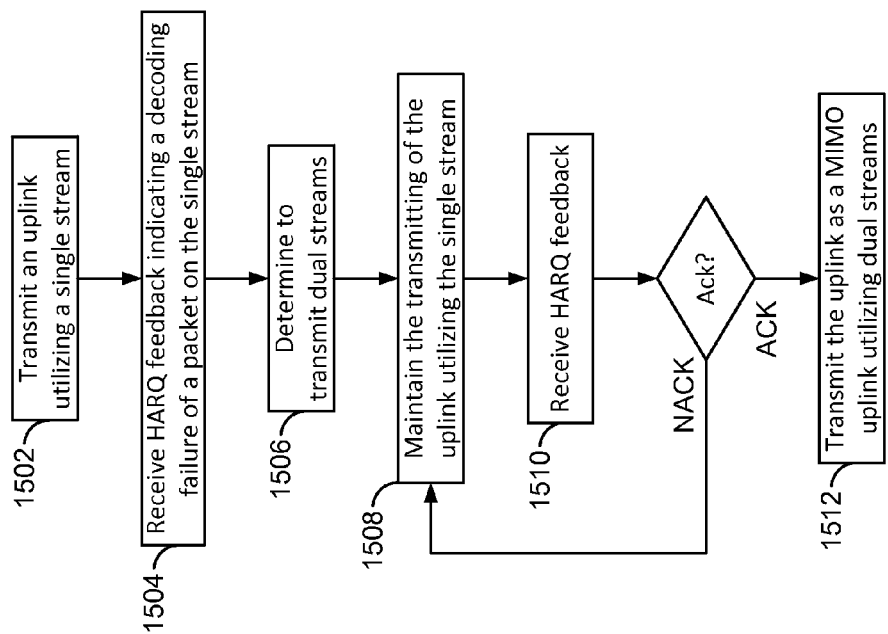
FIG. 15 is a flow chart illustrating a process operable at a user equipment for scheduling an uplink transmission in the presence of HARQ retransmissions.

FIG. 15 is a flow chart illustrating an exemplary process 1500 for an uplink scheduler to follow when the UE 210 receives a command to switch from single stream to dual stream transmissions during a HARQ retransmission period. Here, the process 1500 may take place within a processing system 2014, which may be located at the UE 210. In another aspect, the process 1500 may be implemented by the UE 2154 illustrated in FIG. 21. Of course, in various aspects within the scope of the present disclosure, the process 1500 may be implemented by any suitable apparatus capable transmitting a single stream uplink and a MIMO uplink utilizing dual streams.

In accordance with the process 1500, in block 1502 the UE 210 may transmit an uplink utilizing a single stream. For example, the UE 210 may transmit a single transport block utilizing the E-DPDCH 624 in a CLTD mode, which may utilize both physical antennas 606 and 608 to transmit the single stream. Based on the single stream transmission in block 1502, in block 1504 the UE 210 may receive HARQ feedback indicating a decoding failure of the transmission at the receiver. Here, the HARQ feedback may include ACK/NACK signaling 510 provided to the HARQ entity 506 on the E-HICH, as described above. Thus, as described above, the HARQ entity 506 may determine to retransmit the failed MAC PDU corresponding to the decoding failure. At or near this time, in block 1506 the UE 210 may determine to transmit dual streams. For example, the UE 210 may receive a command from the network to switch to a dual stream mode for MIMO transmissions. In another example, the UE 210 may determine to switch to the dual stream mode for MIMO transmissions based on suitable criteria.

Thus, during the HARQ retransmission period during which the UE 210 is attempting to retransmit the failed packet, the uplink scheduler for the UE 210 must handle the retransmission as well as switch from the single stream mode to the dual stream mode. An issue here is that the UE is power-limited, and the grant of power for a dual stream transmission must be allocated between the two streams. Thus, if a packet that was originally transmitted on a single stream is to be retransmitted on one of the dual streams, the available E-DCH power for the retransmission would need to be reduced by a factor of two to accommodate the secondary stream.

Thus, in an aspect of the present disclosure, in block 1508, the UE 210 may maintain the transmitting of the uplink utilizing the single stream. That is, despite the determination in block 1506 to switch to the dual stream mode, the UE 210 in accordance with an aspect of the present disclosure may hold off the changing to the dual stream mode until the HARQ retransmissions corresponding to the decoding failure are complete.

In block 1510, the UE 210 may receive further HARQ feedback 510 corresponding to the transmission in block 1508. Here, if the HARQ feedback 510 received in block 1510 indicates a further decoding failure of the transmission in block 1508 by sending a negative acknowledgment (NACK), then the process may return to block 1508, continuing to maintain the transmitting of the uplink utilizing the single stream. However, if the HARQ feedback 510 received in block 1510 indicates a decoding success by sending a positive acknowledgment (ACK), then in block 1512 the UE 210 may transmit the uplink utilizing dual streams, e.g., as a MIMO transmission utilizing two transport blocks.

Figure 16:
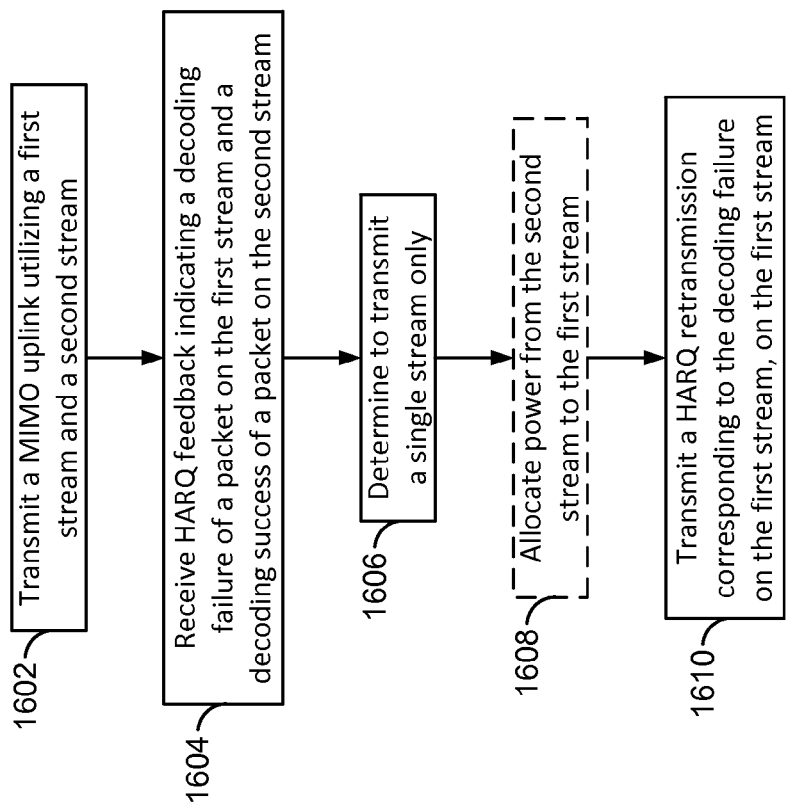
FIG. 16 is a flow chart illustrating another process operable at a user equipment for scheduling an uplink transmission in the presence of HARQ retransmissions.

FIG. 16 is a flow chart illustrating an exemplary process 1600 for an uplink scheduler to follow when the UE 210 receives a command to switch from dual stream to single stream transmissions during a HARQ retransmission period. Here, the process 1600 may take place within a processing system 2014, which may be located at the UE 210. In another aspect, the process 1600 may be implemented by the UE 2154 illustrated in FIG. 21. In yet another aspect, the process 1600 may be performed by the HARQ entity 506. Of course, in various aspects within the scope of the present disclosure, the process 1600 may be implemented by any suitable apparatus capable of transmitting a single stream uplink and a MIMO uplink utilizing dual streams.

In accordance with the process 1600, in block 1602 the UE 210 may transmit an uplink utilizing a first stream and a second stream. Here, the terms "first stream" and "second stream" are merely nominative, and either stream may correspond to one of a primary stream sent on a primary precoding vector 610 or a secondary stream sent on a secondary precoding vector 612. Additionally, as used herein, primary stream refers to a primary spatial stream, e.g., sent on a primary precoding vector or primary virtual antenna 610, and second stream refers to a secondary spatial stream, e.g., sent on a secondary precoding vector or primary virtual antenna 612. For example, one stream can include a primary transport block on the data channel E-DPDCH(s) 624, and the other stream can include a secondary transport block on the data channel S-E-DPDCH(s) 620, which may be transmitted utilizing orthogonal precoding vectors $[w_1, w_2]$ and $[w_3, w_4]$, respectively. In this example, with the configuration illustrated in FIG. 6, the primary stream is the stronger eigenmode, while the secondary stream is the weaker eigenmode.

Based on the dual stream transmission in block 1602, in block 1604 the UE 210 may receive HARQ feedback indicating a decoding failure of a packet on the first stream and a decoding success of a packet on the second stream. Here, the HARQ feedback may include ACK/NACK signaling 510 provided to the HARQ entity 506 on the E-HICH, as described above. The HARQ feedback may thus include a positive acknowledgment (ACK) for one of the streams, and a negative acknowledgment (NACK) for the other stream. Thus, as described above, the HARQ entity 506 may determine to retransmit the failed MAC PDU corresponding to the decoding failure on the secondary stream. For example, the packet transmitted utilizing the primary precoding vector 610 may fail, corresponding to the reception of a negative acknowledgment (NACK), while the packet transmitted utilizing the secondary precoding vector 612 may succeed, corresponding to the reception of a positive acknowledgment (ACK). As another example, the packet transmitted utilizing the primary precoding vector 610 may succeed, corresponding to the reception of a positive acknowledgment (ACK), while the packet transmitted utilizing the secondary precoding vector 612 may fail, corresponding to the reception of a negative acknowledgment (NACK).

At or near this time, in block 1610 the UE 210 may determine to transmit a single stream. For example, the UE 210 may receive a command from the network to switch to a single stream mode, e.g., for CLTD transmissions. In another example, the UE 210 may determine to switch to the single stream mode based on suitable criteria.

Thus, during the HARQ retransmission period during which the UE is attempting to retransmit the failed packet transmitted on the first stream, the uplink scheduler for the UE 210 must handle the retransmission as well as switch from the dual stream mode to the single stream mode.

Optionally, in one aspect of the present disclosure, in block 1608, the UE 210 may allocate at least some portion of power from the second stream, corresponding to the packet that was successfully decoded, to the first stream, corresponding to the decoding failure. In this way, the single stream transmission may have an increased power relative to a power of either of the dual streams transmitted in the dual stream mode, improving the likelihood of a successful decoding of the following retransmission. In some examples, all available power on the E-DCH may be allocated to the first stream. That is, in block 1610, the UE 210 may transmit a HARQ retransmission corresponding to the decoding failure on the first stream, on the first stream. That is, the precoding vector that was utilized for the transmission of the packet that failed may be utilized for the single stream retransmission of the packet after switching to the single stream mode.

In one aspect of the present disclosure, the available power on the E-DCH may be allocated to the first stream by implementing power scaling for multiple-stream transmissions. In one example, the power for two streams can be computed based on the primary stream (e.g., based on at least one of the T2P and TBS of a retransmission or a related scheduling grant of the primary stream, where T2P corresponds to traffic-to-pilot power ratio). Where retransmission occurs on the secondary stream, however, this may cause packet failure where the original T2P and/or TBS is large for the streams, and then the scheduling grant for the first stream results in a smaller T2P and/or TBS. In this example, the retransmission for the secondary stream may require the original T2P and/or TBS, but may be assigned the smaller T2P and/or TBS of the scheduling grant on the primary stream.

In another example, the power scaling for the streams may be computed based on the larger power computed for one of the streams. In this example, the computed power scaling for the primary stream can be based on the T2P and/or TBS for retransmission or for a received scheduling grant. The computed power scaling for the secondary stream can be based on the T2P and/or TBS of a scheduling grant for a new transmission, or for retransmission can be based on the previous power or the previous scheduling grant when the packet started. For example, if the packet is for retransmission on the secondary stream, the computed power for the secondary stream corresponds to the power on the primary stream when the packet to retransmit is originally formed. As an alternative, if the packet is for retransmission on the secondary stream, the computed power for the secondary stream corresponds to the power that would be used by the primary stream if the serving grant on the serving stream is fully utilized. As another alternative, if the packet is for retransmission on the secondary stream, the computed power for the secondary stream corresponds to the power used in the previous transmission attempt. The maximum of the computed power scaling for the primary stream and the computed power scaling for the secondary stream can be chosen as the power scaling for both streams.

In another alternative or additional example, the power scaling for the streams may be computed based on a user equipment (UE) power headroom limitation. For instance, if the power used in a previous transmission was lowered due to a UE power headroom limitation, then that limitation is more relaxed when transmitting only one stream. Therefore, the single stream power may be raised so that it is closer to the power that would be used in the absence of a power headroom limitation. Thus, the power scaling as described herein may be based on at least one of a traffic-to-pilot (T2P) power ratio of at least one of the first stream and the second stream, a transport block size (TBS) of at least one of the first stream and the second stream, and a user equipment power headroom limitation.

Figure 17:
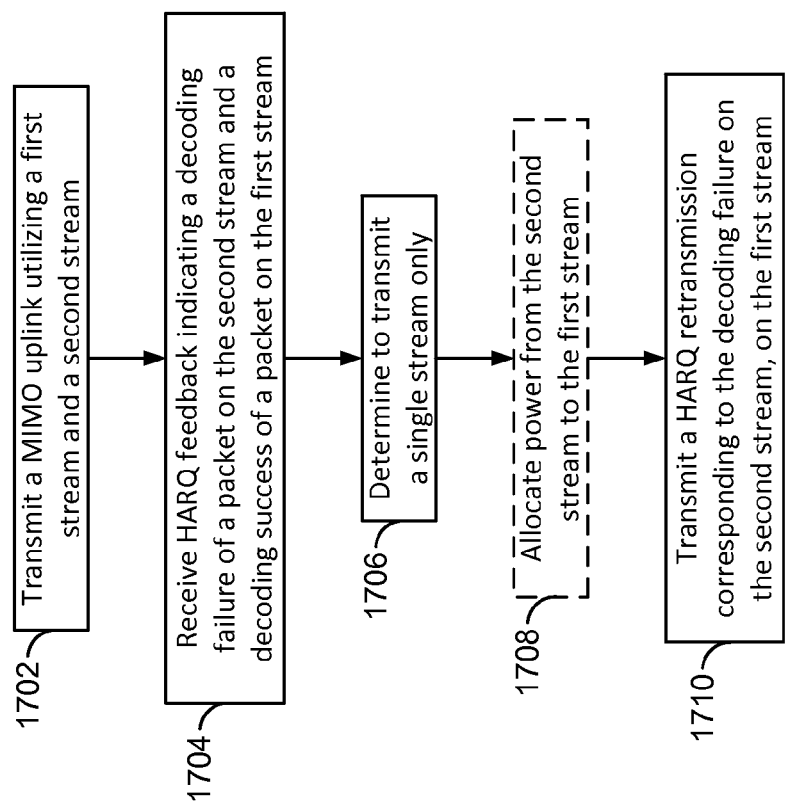
FIG. 17 is a flow chart illustrating another process operable at a user equipment for scheduling an uplink transmission in the presence of HARQ retransmissions.

FIG. 17 is a flow chart illustrating another exemplary process 1700 for an uplink scheduler to follow when the UE 210 receives a command to switch from dual stream to single stream transmissions during a HARQ retransmission period. Here, the process 1700 may take place within a processing system 2014, which may be located at the UE 210. In another aspect, the process 1700 may be implemented by the UE 2154 illustrated in FIG. 21. In a further aspect, the process 1700 may be performed by the HARQ entity 506. Of course, in various aspects within the scope of the present disclosure, the process 1700 may be implemented by any suitable apparatus capable of transmitting a single stream uplink and a MIMO uplink utilizing dual streams.

The first blocks of process 1700 are similar to process 1600 illustrated in FIG. 16. That is, block 1702, 1704, and 1706 may be substantially similar to those described above with respect to blocks 1602, 1604, and 1606, and portions of these blocks that are the same as those described above will not be repeated. However, blocks 1604 and 1704 are different in that the first and the second streams are reversed. Specifically, block 1604 describes a decoding failure on the first stream and a decoding success on the second stream, while block 1704 describes a decoding failure on the second stream and a decoding success on the first stream. Also, unlike process 1600, process 1700 may provide a retransmitted packet on a different precoding vector than the precoding vector on which the packet was previously transmitted. Thus, in block 1710, the UE 210 may transmit a HARQ retransmission corresponding to the decoding failure on the second stream, on the first stream. That is, the precoding vector that was utilized for the transmission of the packet that succeeded may be utilized for the single stream transmission of the HARQ retransmission after switching to the single stream mode. Thus, in an aspect of the present disclosure, after switching to the single stream mode, the packet that failed when transmitted utilizing one precoding vector, may be retransmitted utilizing the other precoding vector. For example, the UE 210 may transmit a HARQ retransmission corresponding to a decoding failure on the secondary stream, on the primary stream.

Optionally, in one aspect of the present disclosure, the UE 210 may allocate at least some portion of power from the second stream, corresponding to the decoding failure, to the first stream, corresponding to the packet that was successfully decoded, as shown in block 1708. In this way, similar to process 1600, the single stream transmission may have an increased power relative to a power of either of the dual streams transmitted in the dual stream mode, improving the likelihood of a successful decoding of the following retransmission. In some examples, all available power on the E-DCH may be allocated to the first stream. In one aspect of the present disclosure, the available power on the E-DCH may be allocated to the first stream by implementing power scaling for multiple-stream transmissions as described with reference to FIG. 16.

In a further aspect of the present disclosure, a decision regarding whether to change from the dual stream mode to the single stream mode may be made by the E-TFC selection entity 504. Here, the selection may correspond to various factors, such as the available power granted to the UE 210 for its next uplink transmission, how much power might be needed to carry a minimum supported transport block size for dual stream transmissions, or the channel conditions. For example, when channel conditions are poor, it may be desirable to transmit a single stream only, so as to increase the available power per stream. Further, if sufficient power to carry a particular size transport block for dual stream transmissions is not available, it may be desirable to transmit a single stream only. On the other hand, if the opportunity to utilize both streams is available, it may be generally desirable to transmit dual streams in uplink MIMO to increase the throughput.

Figure 18:
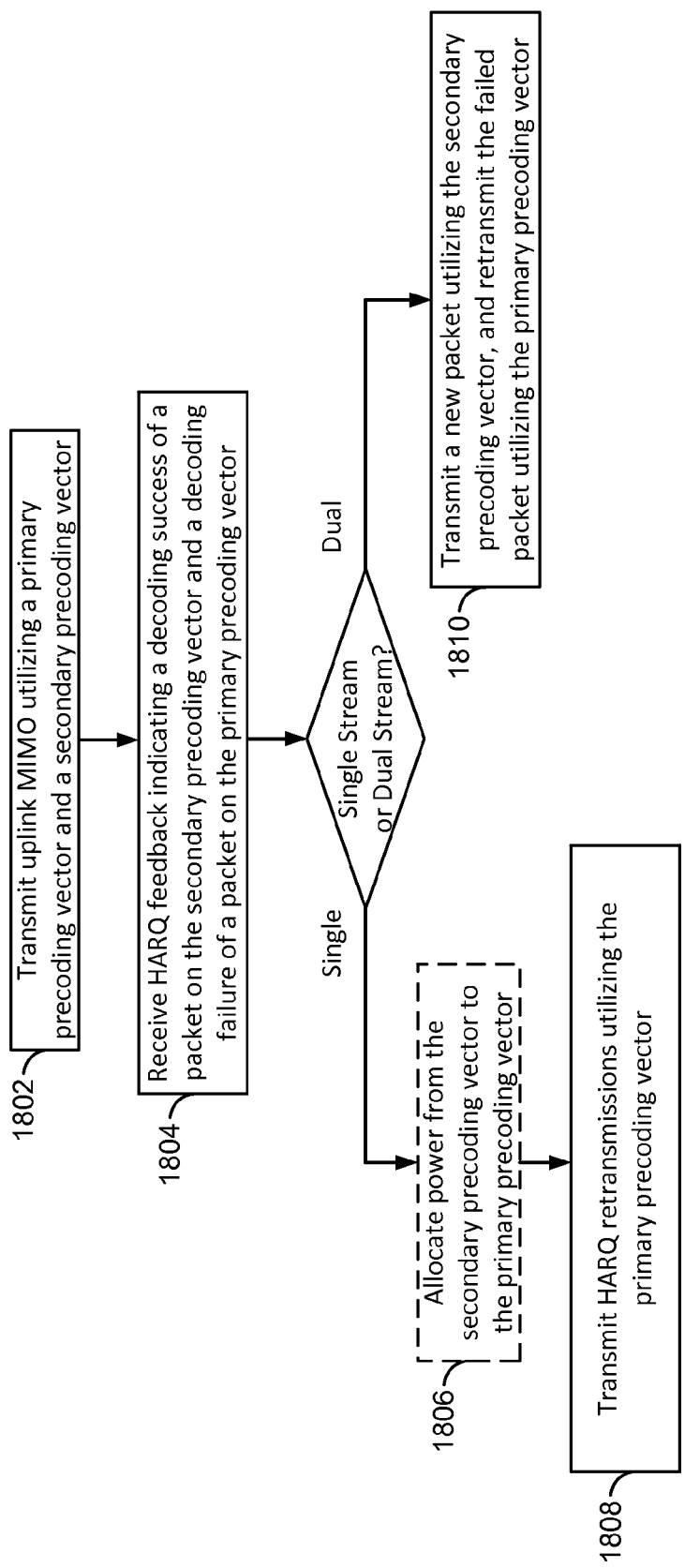
FIG. 18 is a flow chart illustrating another process operable at a user equipment for scheduling an uplink transmission in the presence of HARQ retransmissions.

FIG. 18 illustrates another exemplary process 1800 for uplink scheduling in accordance with some aspects of the present disclosure. Here, the process 1800 may take place within a processing system 2014, which may be located at the UE 210. In another aspect, the process 1800 may be implemented by the UE 2154 illustrated in FIG. 21. In a further aspect, the process 1800 may be performed by the HARQ entity 506. Of course, in various aspects within the scope of the present disclosure, the process 1800 may be implemented by any suitable apparatus capable of transmitting a single stream uplink and a MIMO uplink utilizing dual streams.

In block 1802, the UE 210 transmits dual streams in an uplink MIMO transmission. In block 1804, the UE 210 receives HARQ feedback indicating a decoding failure on the stronger, primary stream 610 and a decoding success on the weaker, secondary stream 612. In this case, in accordance with an aspect of the present disclosure, the UE 210 may determine whether to transmit a single stream or dual streams in accordance with suitable factors. If a single stream is selected, then in block 1808 the UE 210 may continue with the HARQ retransmissions of the packet utilizing the primary precoding vector 610.

Optionally, in one aspect of the present disclosure, the UE 210 may allocate at least some portion of power from the secondary precoding vector 612 to the primary precoding vector 610, as shown in block 1806. In some examples, the UE 210 may allocate all available power on the E-DCH to the primary precoding vector 610 as a single stream transmission.

In one aspect of the present disclosure, the available power on the E-DCH may be allocated to the primary precoding vector 610 by implementing power scaling for multiple-stream transmissions as described with reference to FIG. 16.

On the other hand, if dual streams are selected, then in block 1810 the UE 210 may continue with the HARQ retransmissions of the packet utilizing the primary precoding vector and begin transmission of a newly selected packet on the weaker, secondary precoding vector. That is, HARQ retransmissions of the failed packet may continue on the stream corresponding to the failed packet, and new packets may be selected for transmission on the stream corresponding to the successful packet.

Figure 19A:
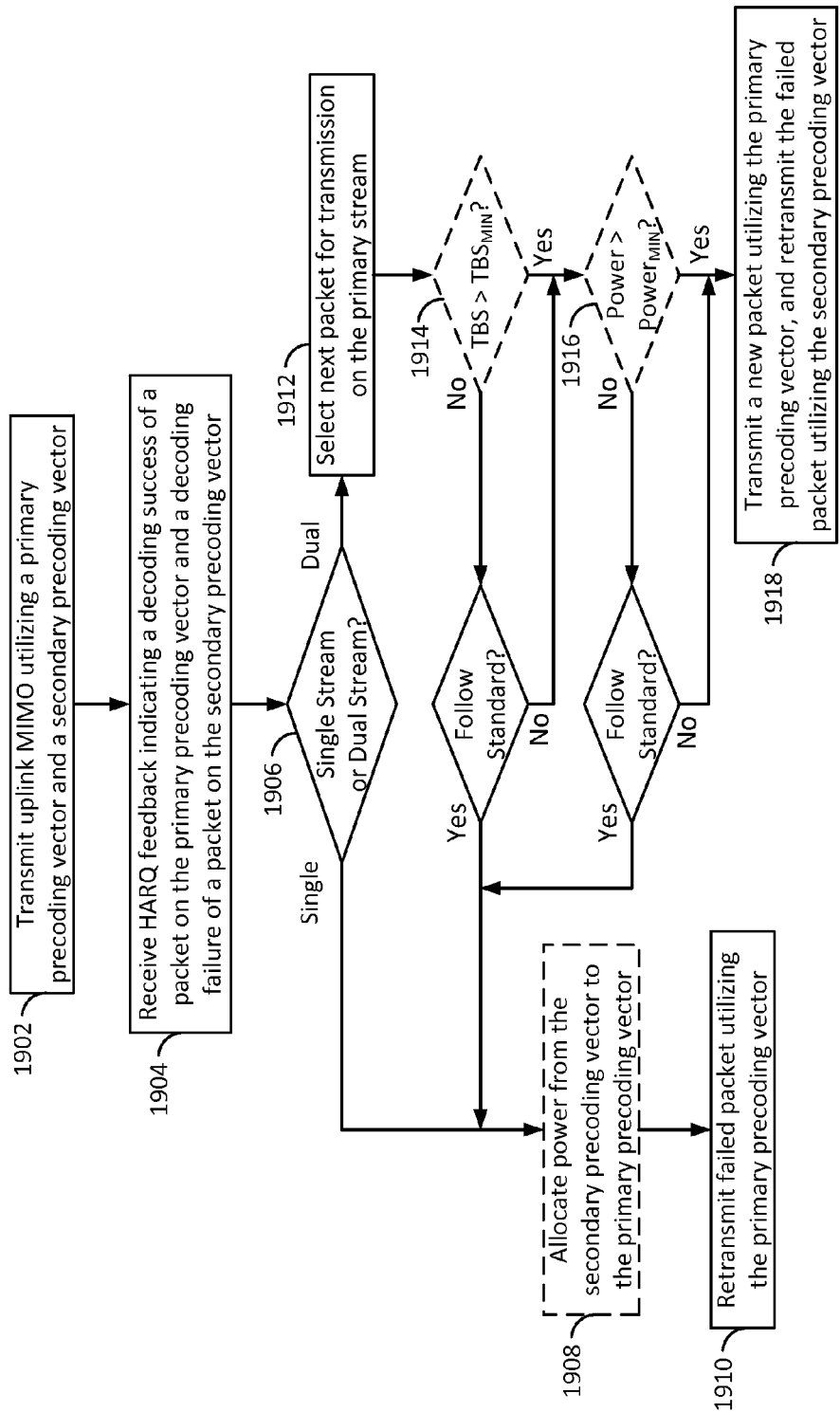
FIG. 19A is a flow chart illustrating another process operable at a user equipment for scheduling an uplink transmission in the presence of HARQ retransmissions.

FIG. 19A illustrates another exemplary process 1900 for uplink scheduling in accordance with some aspects of the present disclosure. Here, the process 1900 may take place within a processing system 2014, which may be located at the UE 210. In another aspect, the process 1900 may be implemented by the UE 2154 illustrated in FIG. 21. In yet another aspect, the process 1900 may be performed by the HARQ entity 506. Of course, in various aspects within the scope of the present disclosure, the process 1900 may be implemented by any suitable apparatus capable of transmitting a single stream uplink and a MIMO uplink utilizing dual streams.

In block 1902, the UE 210 transmits dual streams in an uplink MIMO transmission. In block 1904, the UE 210 receives HARQ feedback indicating a decoding failure on the weaker, secondary stream 612 and a decoding success on the stronger, primary stream 610. In this case, in accordance with an aspect of the present disclosure, in block 1906 the UE 210 may determine whether to transmit a single stream or dual streams in accordance with suitable factors. If a single stream is selected, then in block 1910 the UE 210 may continue with the HARQ retransmissions of the packet utilizing the primary precoding vector 610.

Optionally, in one aspect of the present disclosure, if a single stream is selected, the UE 210 may allocate at least some portion of power from the secondary precoding vector 612 to the primary precoding vector 610, as shown in block 1908. In some examples, all available power on the E-DCH may be allocated to the primary precoding vector 610 as a single stream transmission. In one aspect of the present disclosure, the available power on the E-DCH may be allocated to the primary precoding vector 610 by implementing power scaling for multiple-stream transmissions as described with reference to FIG. 16.

On the other hand, if dual streams are selected in block 1906, then the E-TFC selection entity 504 may consider additional factors in the generation of the transmission in the next transmission time interval. For example, as described above the E-TFC selection entity 504 receives scheduling signaling 508 such as an absolute grant for each of the transport blocks 610 and 612 at a certain interval. Here, the interval over which the scheduling grant is provided to the UE 210 may not be as often as every transmission time interval. Therefore, in the current scenario when deciding the packets to transmit on each stream in the next transmission time interval, the E-TFC selection entity 504 may rely upon a scheduling grant received at some time in the past. The scheduling grant provided on the E-AGCH generally provides a power for each of the streams, and a transport block size for each of the streams.

In accordance with an aspect of the present disclosure, when dual streams are selected after the receiving of the HARQ feedback in block 1904 that indicates a decoding success on the primary precoding vector 610 and a decoding failure on the secondary precoding vector 612, the E-TFC selection entity 504 may select a next packet to be transmitted on the primary precoding vector 610 along with the retransmitted packet provided by the HARQ entity 506 to be transmitted on the secondary precoding vector 612. Here, an uplink MIMO system in accordance with some aspects of the present disclosure may be constrained by a requirement that the same orthogonal variable spreading factor (OVSF), or simply spreading factor, be utilized for both streams. However, in order to utilize certain spreading factors, the transport block size in the next selected packet may be required to have at least a certain minimum bit length. For example, a minimum transport block size for the next selected packet may be 3988 bits, and if the next selected packet is to be transmitted utilizing the same spreading factor as the retransmitted packet on the secondary stream 612, the packet selected for the primary stream 610 must be greater than 3988 bits in length.

In a further aspect of the present disclosure, the E-TFC selection entity 504 may take into account the power available for primary stream 610 for the next transmission. That is, because the scheduling grant utilized for a particular transmission time interval that is to include a HARQ retransmission on the secondary stream 612 may have been granted at some previous time, the selection of the following packet to transmit on the primary stream 610 may present issues with the uplink power headroom. Thus, the E-TFC selection entity 504 may consider whether the available power for the primary stream 610 is greater than a minimum power to carry a minimum supported transport block size on the primary stream 610 for dual stream (e.g., rank=2 MIMO) transmissions.

Thus, returning to FIG. 19A, if in block 1906 the UE 210 determines that conditions may be favorable for dual stream rank=2 MIMO transmission, then in block 1912 the E-TFC selection entity 504 may select the next packet for transmission on the primary stream 610, and the process may proceed to block 1918, wherein the UE 210 may transmit a new packet utilizing the primary precoding vector 610, and retransmit the failed packet utilizing the secondary precoding vector 612.

Optionally, in one aspect of the present disclosure, in block 1914, the E-TFC selection entity 504 may determine whether the transport block size (TBS) of the packet selected in block 1912 is greater than a minimum transport block size. If not, then if the process is constrained by the minimum transport block size requirement, then the process may return to block 1908, and allocate at least some portion of power from the secondary precoding vector 612 to the primary precoding vector 610, and block 1910 to retransmit the failed packet utilizing the primary precoding vector 610 in a single stream rank=1 transmission.

However, in an aspect of the present disclosure, the UE 210 may be enabled to violate the general requirement for the minimum transport block size. That is, despite the selected transport block size being smaller than the minimum transport block size, the E-TFC selection entity 504 may nevertheless transmit the selected transport block on the primary stream 610. Here, the transmission of the selected transport block on the primary stream 610 may utilize a different spreading factor than the retransmission on the secondary stream 612; or the spreading factor of the retransmission on the secondary stream 612 may be changed to match that one utilized for the new transport block to be transmitted on the primary stream 610, in accordance with a suitable design decision.

Optionally, in one aspect of the present disclosure, in block 1916, the E-TFC selection entity 504 may determine whether the available power for the primary stream 610 is greater than a minimum power to carry a minimum supported transport block size for dual stream transmissions. Here, the minimum available power requirement may in fact be the same requirement described above, i.e., the minimum transport block size requirement. That is, the available power may be insufficient to support the minimum transport block size. If the available power is not greater than the minimum power, then if the process is constrained by the minimum transport block size requirement, the E-TFC selection entity 504 may return to blocks 1908 and 1910, as described above, retransmitting the failed packet utilizing a single stream.

However, in an aspect of the present disclosure, the UE 210 may be enabled to violate the general requirement for the minimum power. That is, despite the available power for the primary stream 610 not being greater than the minimum power to carry the minimum supported transport block size for the dual stream transmissions, the process may proceed to block 1918, wherein the UE 210 may transmit a new packet utilizing the primary precoding vector 610, and retransmit the failed packet utilizing the secondary precoding vector 612. Here, the transmitted packet may have a smaller transport block size than generally required by the minimum transport block size requirement, but at the smaller transport block size the available power may be sufficient. In this case, as above, the transmission of the selected transport block on the primary stream 610 may utilize a different spreading factor than the retransmission on the secondary stream 612; or the spreading factor of the retransmission on the secondary stream 612 may be changed to match that one utilized for the new transport block to be transmitted on the primary stream 610, in accordance with a suitable design decision.

Figure 19B:
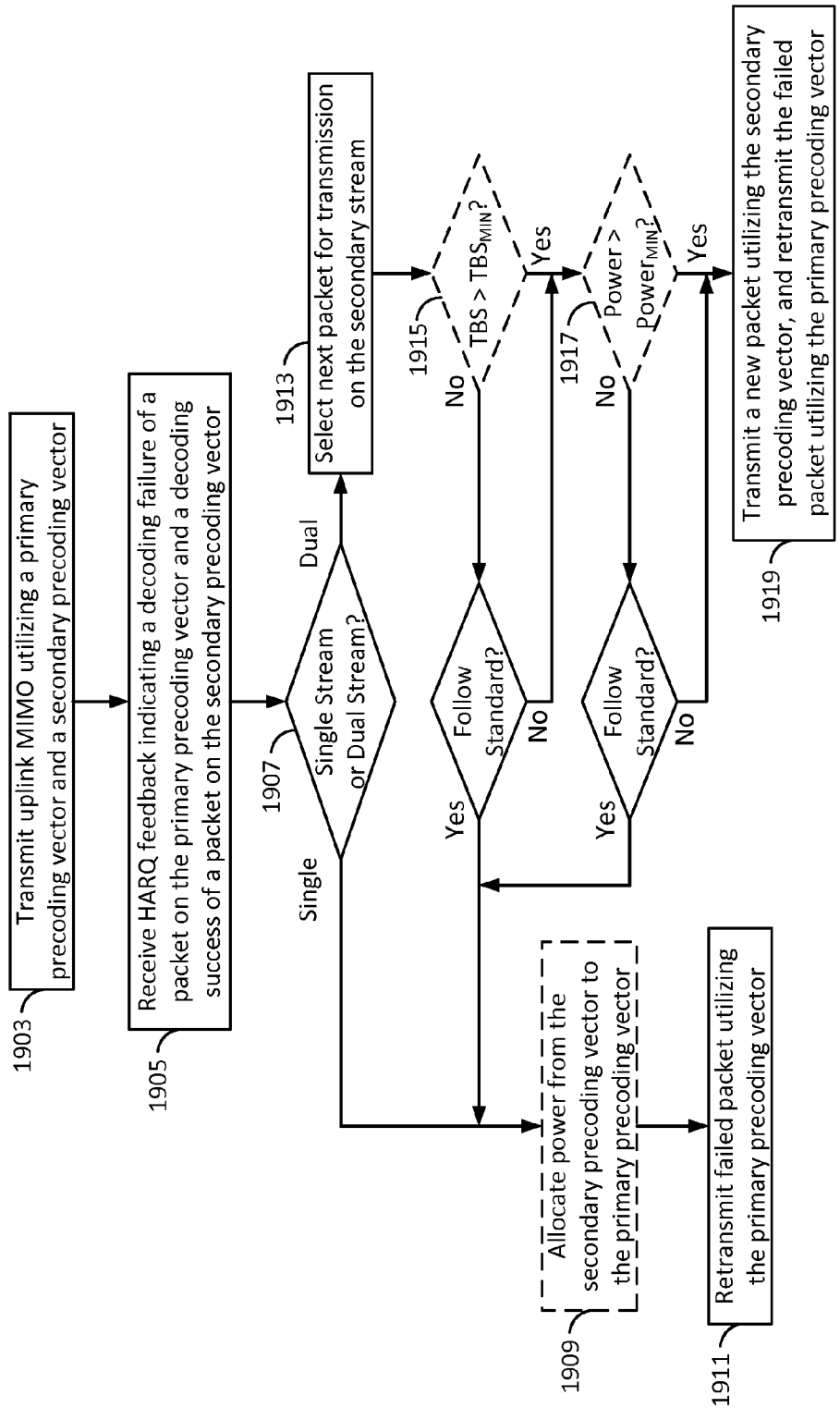
FIG. 19B is a flow chart illustrating another process operable at a user equipment for scheduling an uplink transmission in the presence of HARQ retransmissions.

FIG. 19B illustrates another exemplary process 1901 for uplink scheduling in accordance with some aspects of the present disclosure. Here, the process 1901 may take place within a processing system 2014, which may be located at the UE 210. In another aspect, the process 1901 may be implemented by the UE 2154 illustrated in FIG. 21. In yet another aspect, the process 1901 may be performed by the HARQ entity 506. Of course, in various aspects within the scope of the present disclosure, the process 1901 may be implemented by any suitable apparatus capable of transmitting a single stream uplink and a MIMO uplink utilizing dual streams.

In block 1903, the UE 210 transmits dual streams in an uplink MIMO transmission. In block 1905, the UE 210 receives HARQ feedback indicating a decoding success on the weaker, secondary stream 612 and a decoding failure on the stronger, primary stream 610. In this case, in accordance with an aspect of the present disclosure, in block 1907 the UE 210 may determine whether to transmit a single stream or dual streams in accordance with suitable factors. If a single stream is selected, then in block 1911 the UE 210 may continue with the HARQ retransmissions of the packet utilizing the primary precoding vector 610.

Optionally, in one aspect of the present disclosure, if a single stream is selected, the UE 210 may allocate at least some portion of power from the secondary precoding vector 612 to the primary precoding vector 610, as shown in block 1909. In some examples, all available power on the E-DCH may be allocated to the primary precoding vector 610 as a single stream transmission. In one aspect of the present disclosure, the available power on the E-DCH may be allocated to the primary precoding vector 610 by implementing power scaling for multiple-stream transmissions as described with reference to FIG. 16.

On the other hand, if dual streams are selected in block 1907, then the E-TFC selection entity 504 may consider additional factors in the generation of the transmission in the next transmission time interval, as described with reference to block 1906 of FIG. 19A.

In accordance with an aspect of the present disclosure, when dual streams are selected after the receiving of the HARQ feedback in block 1904 that indicates a decoding failure on the primary precoding vector 610 and a decoding success on the secondary precoding vector 612, the E-TFC selection entity 504 may select a next packet to be transmitted on the secondary precoding vector 612 along with the retransmitted packet provided by the HARQ entity 506 to be transmitted on the primary precoding vector 610. Here, an uplink MIMO system in accordance with some aspects of the present disclosure may be constrained by a requirement that the same orthogonal variable spreading factor (OVSF), or simply spreading factor, be utilized for both streams. However, in order to utilize certain spreading factors, the transport block size in the next selected packet may be required to have at least a certain minimum bit length. For example, a minimum transport block size for the next selected packet may be 3988 bits, and if the next selected packet is to be transmitted utilizing the same spreading factor as the retransmitted packet on the primary stream 610, the packet selected for the secondary stream 612 must be greater than 3988 bits in length.

In a further aspect of the present disclosure, the E-TFC selection entity 504 may take into account the power available for secondary stream 612 for the next transmission. That is, because the scheduling grant utilized for a particular transmission time interval that is to include a HARQ retransmission on the primary stream 610 may have been granted at some previous time, the selection of the following packet to transmit on the secondary stream 612 may present issues with the uplink power headroom. Thus, the E-TFC selection entity 504 may consider whether the available power for the secondary stream 612 is greater than a minimum power to carry a minimum supported transport block size on the secondary stream 612 for dual stream (e.g., rank=2 MIMO) transmissions.

Thus, returning to FIG. 19B, if in block 1907 the UE 210 determines that conditions may be favorable for dual stream rank=2 MIMO transmission, then in block 1913 the E-TFC selection entity 504 may select the next packet for transmission on the secondary stream 612, and the process may proceed to block 1919, wherein the UE 210 may transmit a new packet utilizing the secondary precoding vector 612, and retransmit the failed packet utilizing the primary precoding vector 610.

Optionally, in one aspect of the present disclosure, in block 1915, the E-TFC selection entity 504 may determine whether the transport block size (TBS) of the packet selected in block 1913 is greater than a minimum transport block size. If not, then if the process is constrained by the minimum transport block size requirement, then the process may return to block 1909, and allocate at least some portion of power from the secondary precoding vector 612 to the primary precoding vector 610, and block 1911 to retransmit the failed packet utilizing the primary precoding vector 610 in a single stream rank=1 transmission.

However, in an aspect of the present disclosure, the UE 210 may be enabled to violate the general requirement for the minimum transport block size. That is, despite the selected transport block size being smaller than the minimum transport block size, the E-TFC selection entity 504 may nevertheless transmit the selected transport block on the secondary stream 612. Here, the transmission of the selected transport block on the secondary stream 612 may utilize a different spreading factor than the retransmission on the primary stream 610; or the spreading factor of the retransmission on the primary stream 610 may be changed to match that one utilized for the new transport block to be transmitted on the secondary stream 612, in accordance with a suitable design decision.

Optionally, in one aspect of the present disclosure, in block 1917, the E-TFC selection entity 504 may determine whether the available power for the secondary stream 612 is greater than a minimum power to carry a minimum supported transport block size for dual stream transmissions. Here, the minimum available power requirement may in fact be the same requirement described above, i.e., the minimum transport block size requirement. That is, the available power may be insufficient to support the minimum transport block size. If the available power is not greater than the minimum power, then if the process is constrained by the minimum transport block size requirement, the E-TFC selection entity 504 may return to blocks 1909 and 1911, as described above, retransmitting the failed packet utilizing a single stream.

However, in an aspect of the present disclosure, the UE 210 may be enabled to violate the general requirement for the minimum power. That is, despite the available power for the secondary stream 612 not being greater than the minimum power to carry the minimum supported transport block size for the dual stream transmissions, the process may proceed to block 1919, wherein the UE 210 may transmit a new packet utilizing the secondary precoding vector 612, and retransmit the failed packet utilizing the primary precoding vector 610. Here, the transmitted packet may have a smaller transport block size than generally required by the minimum transport block size requirement, but at the smaller transport block size the available power may be sufficient. In this case, as above, the transmission of the selected transport block on the secondary stream 612 may utilize a different spreading factor than the retransmission on the primary stream 610; or the spreading factor of the retransmission on the primary stream 610 may be changed to match that one utilized for the new transport block to be transmitted on the secondary stream 612, in accordance with a suitable design decision.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 20 is a conceptual diagram illustrating an example of a hardware implementation for an apparatus 2000 employing a processing system 2014. In this example, the processing system 2014 may be implemented with a bus architecture, represented generally by the bus 2002. The bus 2002 may include any number of interconnecting buses and bridges depending on the specific application of the processing system 2014 and the overall design constraints. The bus 2002 links together various circuits including one or more processors, represented generally by the processor 2004, a memory 2005, and computer-readable media, represented generally by the computer-readable medium 2006. The bus 2002 may also link various other circuits such as timing sources, peripherals, voltage regulators, and power management circuits, which are well known in the art, and therefore, will not be described any further. A bus interface 108 provides an interface between the bus 2002 and a transceiver 2010. The transceiver 2010 provides a means for communicating with various other apparatus over a transmission medium. Depending upon the nature of the apparatus, a user interface 2012 (e.g., keypad, display, speaker, microphone, joystick) may also be provided.

The processor 2004 is responsible for managing the bus 2002 and general processing, including the execution of software stored on the computer-readable medium 2006. The software, when executed by the processor 2004, causes the processing system 2014 to perform the various functions described infra for any particular apparatus. The computer-readable medium 2006 may also be used for storing data that is manipulated by the processor 104 when executing software.

FIG. 21 is a block diagram of an exemplary Node B 2110 in communication with an exemplary UE 2150, where the Node B 2110 may be the Node B 208 in FIG. 2, and the UE 2150 may be the UE 210 in FIG. 2. In the downlink communication, a controller or processor 2140 may receive data from a data source 2112. Channel estimates may be used by a controller/processor 2140 to determine the coding, modulation, spreading, and/or scrambling schemes for the transmit processor 2120. These channel estimates may be derived from a reference signal transmitted by the UE 2150 or from feedback from the UE 2150. A transmitter 2132 may provide various signal conditioning functions including amplifying, filtering, and modulating frames onto a carrier for downlink transmission over a wireless medium through one or more antennas 2134. The antennas 2134 may include one or more antennas, for example, including beam steering bidirectional adaptive antenna arrays, MIMO arrays, or any other suitable transmission/reception technologies.

At the UE 2150, a receiver 2154 receives the downlink transmission through one or more antennas 2152 and processes the transmission to recover the information modulated onto the carrier. The information recovered by the receiver 2154 is provided to a controller/processor 2190. The processor 2190 descrambles and despreads the symbols, and determines the most likely signal constellation points transmitted by the Node B 2110 based on the modulation scheme. These soft decisions may be based on channel estimates computed by the processor 2190. The soft decisions are then decoded and deinterleaved to recover the data, control, and reference signals. The CRC codes are then checked to determine whether the frames were successfully decoded. The data carried by the successfully decoded frames will then be provided to a data sink 2172, which represents applications running in the UE 2150 and/or various user interfaces (e.g., display). Control signals carried by successfully decoded frames will be provided to a controller/processor 2190. When frames are unsuccessfully decoded, the controller/processor 2190 may also use an acknowledgement (ACK) and/or negative acknowledgement (NACK) protocol to support retransmission requests for those frames.

In the uplink, data from a data source 2178 and control signals from the controller/processor 2190 are provided. The data source 2178 may represent applications running in the UE 2150 and various user interfaces (e.g., keyboard). Similar to the functionality described in connection with the downlink transmission by the Node B 2110, the processor 2190 provides various signal processing functions including CRC codes, coding and interleaving to facilitate FEC, mapping to signal constellations, spreading with OVSFs, and scrambling to produce a series of symbols. Channel estimates, derived by the processor 2190 from a reference signal transmitted by the Node B 2110 or from feedback contained in a midamble transmitted by the Node B 2110, may be used to select the appropriate coding, modulation, spreading, and/or scrambling schemes. The symbols produced by the processor 2190 will be utilized to create a frame structure. The processor 2190 creates this frame structure by multiplexing the symbols with additional information, resulting in a series of frames. The frames are then provided to a transmitter 2156, which provides various signal conditioning functions including amplification, filtering, and modulating the frames onto a carrier for uplink transmission over the wireless medium through the one or more antennas 2152.

The uplink transmission is processed at the Node B 2110 in a manner similar to that described in connection with the receiver function at the UE 2150. A receiver 2135 receives the uplink transmission through the one or more antennas 2134 and processes the transmission to recover the information modulated onto the carrier. The information recovered by the receiver 2135 is provided to the processor 2140, which parses each frame. The processor 2140 performs the inverse of the processing performed by the processor 2190 in the UE 2150. The data and control signals carried by the successfully decoded frames may then be provided to a data sink 2139. If some of the frames were unsuccessfully decoded by the receive processor, the controller/processor 2140 may also use an acknowledgement (ACK) and/or negative acknowledgement (NACK) protocol to support retransmission requests for those frames.

The controller/processors 2140 and 2190 may be used to direct the operation at the Node B 2110 and the UE 2150, respectively. For example, the controller/processors 2140 and 2190 may provide various functions including timing, peripheral interfaces, voltage regulation, power management, and other control functions. The computer readable media of memories 2142 and 2192 may store data and software for the Node B 2110 and the UE 2150, respectively.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
transmitting a MIMO uplink utilizing a first stream and a second stream in a dual stream mode;
receiving HARQ feedback indicating a decoding failure of a packet on the second stream and a decoding success of a packet on the first stream;
receiving a command to switch from the dual stream mode to a single stream mode;
determining to only transmit the first stream in response to the command;
allocating at least some portion of power from the second stream to the first stream when a determination is made to only transmit the first stream; and
transmitting, on the first stream, a HARQ retransmission corresponding to the decoding failure of the packet on the second stream.

2. The method of claim 1, wherein the first stream comprises a primary stream and the second stream comprises a secondary stream.

3. The method of claim 1, wherein
allocating the at least some portion of power from the second stream to the first stream is according to a power scaling, and
the power scaling is based on at least one of
a traffic-to-pilot (T2P) power ratio of at least one of the first stream and the second stream,
a transport block size (TBS) of at least one of the first stream and the second stream, or
a user equipment power headroom limitation.

4. A method of wireless communication, comprising:
transmitting a MIMO uplink utilizing a first stream and a second stream in a dual stream mode;
receiving HARQ feedback indicating a decoding failure of a packet on the first stream and a decoding success of a packet on the second stream;
receiving a command to switch from the dual stream mode to a single stream mode;
determining to only transmit the first stream in response to the command;
allocating at least some portion of power from the second stream to the first stream when a determination is made to only transmit the first stream; and
transmitting, on the first stream, a HARQ retransmission corresponding to the decoding failure of the packet on the first stream.

5. The method of claim 4, wherein the first stream comprises a primary stream and the second stream comprises a secondary stream.

6. The method of claim 4, further comprising:
allocating at least some portion of power from the second stream to the first stream.

7. The method of claim 6, wherein
allocating the at least some portion of power from the second stream to the first stream is according to a power scaling, and
the power scaling is based on at least one of
a traffic-to-pilot (T2P) power ratio of at least one of the first stream and the second stream,
a transport block size (TBS) of at least one of the first stream and the second stream, or
a user equipment power headroom limitation.

8. A method of wireless communication, comprising:
transmitting a MIMO uplink utilizing a first stream and a second stream;
receiving HARQ feedback indicating a decoding failure of a packet on the second stream and a decoding success of a packet on the first stream;
receiving one of a first command to transmit a single stream or a second command to transmit dual streams;
determining to transmit the first stream in response to the first command;
allocating at least some portion of power from the second stream to the first stream when a determination is made to transmit the first stream; and
transmitting, on the first stream, a HARQ retransmission corresponding to the decoding failure of the packet on the second stream.

9. The method of claim 8, wherein the first stream comprises a primary stream and the second stream comprises a secondary stream.

10. The method of claim 8, wherein
allocating, upon reception of the first command, the at least some portion of power from the second stream to the first stream is according to a power scaling, and
the power scaling is based on at least one of
a traffic-to-pilot (T2P) power ratio of at least one of the first stream and the second stream,
a transport block size (TBS) of at least one of the first stream and the second stream, or a user equipment power headroom limitation.

11. The method of claim 8, further comprising:
selecting, upon reception of the second command, a next packet for transmission on the first stream; and
determining one or more of
whether a transport block size (TBS) of the next packet is greater than a pre-determined block size, or
whether an available power for the first stream is greater than a pre-determined power value.

12. The method of claim 11, further comprising:
transmitting a new packet on the first stream and the HARQ retransmission corresponding to the decoding failure of the packet on the second stream, on the second stream when
the TBS of the next packet is greater than the pre-determined block size and the available power for the first stream is greater than the pre-determined power value,
the TBS of the next packet is equal to or less than the pre-determined block size and a corresponding TBS constraint can be violated, or
the available power for the first stream is equal to or less than the pre-determined power value and a corresponding power constraint can be violated.

13. The method of claim 11, further comprising:
transmitting the HARQ retransmission corresponding to the decoding failure of the packet on the second stream, on the first stream, when
the TBS of the next packet is equal to or less than the pre-determined block size and a corresponding TBS constraint is followed, or
the available power for the first stream is equal to or less than the pre-determined power value and a corresponding power constraint is followed.

14. A method of wireless communication, comprising:
transmitting a MIMO uplink utilizing a first stream and a second stream;
receiving HARQ feedback indicating a decoding failure of a packet on the first stream and a decoding success of a packet on the second stream;
receiving one of a first command to transmit a single stream or a second command to transmit dual streams;
determining to transmit the first stream in response to the first command;
allocating at least some portion of power from the second stream to the first stream when a determination is made to transmit the first stream; and
transmitting, on the first stream, a HARQ retransmission corresponding to the decoding failure of the packet on the first stream.

15. The method of claim 14, wherein the first stream comprises a primary stream and the second stream comprises a secondary stream.

16. The method of claim 15, further comprising:
allocating, upon reception of the first command, at least some portion of power from the second stream to the first stream.

17. The method of claim 16, wherein
allocating, upon reception of the first command, the at least some portion of power from the second stream to the first stream is according to a power scaling, and the power scaling is based on at least one of
    a traffic-to-pilot (T2P) power ratio of at least one of the first stream and the second stream,
    a transport block size (TBS) of at least one of the first stream and the second stream, or
    a user equipment power headroom limitation.

18. The method of claim 14, further comprising:
selecting, upon reception of the second command, a next packet for transmission on the second stream; and
determining one or more of
    whether a transport block size (TBS) of the next packet is greater than a pre-determined block size, or
    whether an available power for the first stream is greater than a pre-determined power value.

19. The method of claim 18, further comprising:
transmitting a new packet on the second stream and the HARQ retransmission corresponding to the decoding failure of the packet on the first stream, on the first stream when
    the TBS of the next packet is greater than the pre-determined block size and the available power for the second stream is greater than the pre-determined power value,
    the TBS of the next packet is equal to or less than the pre-determined block size and a corresponding TBS constraint can be violated, or
    the available power for the second stream is equal to or less than the pre-determined power value and a corresponding power constraint can be violated.

20. The method of claim 18, further comprising:
transmitting the HARQ retransmission corresponding to the decoding failure of the packet on the first stream, on the first stream, when
    the TBS of the next packet is equal to or less than the pre-determined block size and a corresponding TBS constraint is followed, or
    the available power for the second stream is equal to or less than the pre-determined power value and a corresponding power constraint is followed.

21. A non-transitory computer-readable medium storing executable code for wireless communication, comprising:
code for transmitting a MIMO uplink utilizing a first stream and a second stream;
code for receiving HARQ feedback indicating a decoding failure of a packet on the first stream and a decoding success of a packet on the second stream;
code for receiving one of a first command to transmit a single stream or a second command to transmit dual streams;
code for determining to transmit the first stream in response to the first command;
code for allocating at least some portion of power from the second stream to the first stream when a determination is made to transmit the first stream; and
code for transmitting on the first stream, a HARQ retransmission corresponding to the decoding failure of the packet on the first stream.

22. An apparatus for wireless communication, comprising:
means for transmitting a MIMO uplink utilizing a first stream and a second stream;
means for receiving HARQ feedback indicating a decoding failure of a packet on the first stream and a decoding success of a packet on the second stream;
means for receiving one of a first command to transmit a single stream or a second command to transmit dual streams;
means for determining to transmit the first stream in response to the first command;
means for allocating at least some portion of power from the second stream to the first stream when a determination is made to transmit the first stream; and
means for transmitting, on the first stream, a HARQ retransmission corresponding to the decoding failure of the packet on the first stream.

23. A wireless user equipment, comprising:
a transmitter for transmitting a primary virtual antenna and a secondary virtual antenna;
at least one processor for controlling the transmitter; and
a memory coupled to the at least one processor,
wherein the at least one processor is configured to:
    transmit a MIMO uplink utilizing a first stream and a second stream;
    receive HARQ feedback indicating a decoding failure of a packet on the first stream and a decoding success of a packet on the second stream;
    receive one of a first command to transmit a single stream or a second command to transmit dual streams;
    determine to transmit the first stream in response to the first command;
allocate at least some portion of power from the second stream to the first stream when a determination is made to transmit the first stream; and
    transmit, on the first stream, a HARQ retransmission corresponding to the decoding failure of the packet on the first stream.

24. The wireless user equipment of claim 23, wherein the first stream comprises a primary stream and the second stream comprises a secondary stream.

25. The wireless user equipment of claim 23, wherein the at least one processor is further configured to:
allocate, upon reception of the first command, at least some portion of power from the second stream to the first stream.

26. The wireless user equipment of claim 25, wherein
allocating, upon reception of the first command, the at least some portion of power from the second stream to the first stream is according to a power scaling, and
the power scaling is based on at least one of
    a traffic-to-pilot (T2P) power ratio of at least one of the first stream and the second stream,
    a transport block size (TBS) of at least one of the first stream and the second stream, or
    a user equipment power headroom limitation.

27. The wireless user equipment of claim 23, wherein the at least one processor is further configured to:
select, upon reception of the second command, a next packet for transmission on the second stream; and
determine one or more of
    whether a transport block size (TBS) of the next packet is greater than a pre-determined block size, or
    whether an available power for the first stream is greater than a pre-determined power value.

28. The wireless user equipment of claim 27, wherein the at least one processor is further configured to:
transmit a new packet on the second stream and the HARQ retransmission corresponding to the decoding failure of the packet on the first stream, on the first stream when
    the TBS of the next packet is greater than the pre-determined block size and the available power for the second stream is greater than the pre-determined power value, the TBS of the next packet is equal to or less than the pre-determined block size and a corresponding TBS constraint can be violated, or the available power for the second stream is equal to or less than the pre-determined power value and a corresponding power constraint can be violated.

29. The wireless user equipment of claim 27, wherein the at least one processor is further configured to:

transmit the HARQ retransmission corresponding to the decoding failure of the packet on the first stream, on the first stream, when the TBS of the next packet is equal to or less than the pre-determined block size and a corresponding TBS constraint is followed, or the available power for the second stream is equal to or less than the pre-determined power value and a corresponding power constraint is followed.

* * * * *